US008467356B2

(12) United States Patent
Maeda

(10) Patent No.: US 8,467,356 B2
(45) Date of Patent: Jun. 18, 2013

(54) WIRELESS COMMUNICATION SYSTEM AND BASE STATION

(75) Inventor: Masaya Maeda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 539 days.

(21) Appl. No.: 12/673,086

(22) PCT Filed: Aug. 6, 2008

(86) PCT No.: PCT/JP2008/064148
§ 371 (c)(1), (2), (4) Date: Feb. 11, 2010

(87) PCT Pub. No.: WO2009/022610
PCT Pub. Date: Feb. 19, 2009

(65) Prior Publication Data

US 2010/0195635 A1 Aug. 5, 2010

(30) Foreign Application Priority Data

Aug. 10, 2007 (JP) ................................ 2007-210020

(51) Int. Cl.
*H04W 4/00* (2009.01)

(52) U.S. Cl.
USPC ........................................................ 370/338

(58) Field of Classification Search
USPC ........................................................ 370/338
See application file for complete search history.

(56) References Cited

U.S. PATENT DOCUMENTS

| | | | | |
|---|---|---|---|---|
| 6,760,588 | B2 | 7/2004 | Okajima et al. | |
| 2001/0018346 | A1 | 8/2001 | Okajima et al. | |
| 2009/0011795 | A1* | 1/2009 | Fukui et al. | 455/561 |
| 2011/0243062 | A1* | 10/2011 | Wang et al. | 370/315 |

FOREIGN PATENT DOCUMENTS

| | | | |
|---|---|---|---|
| CN | 1311609 | A | 9/2001 |
| JP | 2002 345015 | | 11/2002 |
| JP | 2003 258704 | | 9/2003 |
| JP | 2004 207851 | | 7/2004 |
| JP | 2005 79797 | | 3/2005 |
| JP | 2005 354549 | | 12/2005 |
| JP | 2006 279261 | | 10/2006 |
| JP | 2007 20026 | | 1/2007 |
| WO | WO 2007091598 | A1 * | 8/2007 |

OTHER PUBLICATIONS

3GPP TS 36.300 V8.0.0, "3rd Generation Partnership Project; Technical Specification Group Radio Access Network; Evolved Universal Terrestrial Radio Access (E-UTRA) and Evolved Universal Terrestrial Radio Access Network (E-UTRA); Overall description; Stage 2, (Release 8)", pp. 11-12, (Mar. 2007).

(Continued)

*Primary Examiner* — Yuwen Pan
*Assistant Examiner* — Ankur Jain
(74) *Attorney, Agent, or Firm* — Oblon, Spivak, McClelland, Maier & Neustadt, L.L.P.

(57) ABSTRACT

A wireless communication system including a gateway device that connects a core network and a wireless access network. The wireless access network includes a virtual base station that includes a representative base station connected to the gateway device and a plurality of unrepresentative base stations, which are subordinate to the representative base station. The presence of the unrepresentative base stations is hidden from the gateway device and an adjacent base station.

16 Claims, 44 Drawing Sheets

OTHER PUBLICATIONS

Draft3GPP TR 25.897 V0.3.1, "3rd Generation Partnership Project; Technical Specification Group Radio Access Network; Feasibility Study on the Evolution of UTRAN Architecture; (Release 6)", pp. 10-14, (Aug. 2003).

Chinese Search Report issued in Application No. 2008801029669 mailed on Jun. 19, 2012.

* cited by examiner

| NODE ID | NODE NUMBER | MESSAGE TYPE | DESTINATION IP ADDRESS | DESTINATION PORT |
|---|---|---|---|---|
| WIRELESS ACCESS NETWORK NODE | n1 | INDIVIDUAL CONTROL | Ic,d,n1 | Pc,d,n1 |
| | | COMMON CONTROL | Ic,c,n1 | Pc,c,n1 |
| WIRELESS ACCESS NETWORK NODE | n5 | INDIVIDUAL CONTROL | Ic,d,n5 | Pc,d,n5 |
| | | COMMON CONTROL | Ic,c,n5 | Pc,c,n5 |

FIG.3

| NODE ID | NODE NUMBER | MESSAGE TYPE | DESTINATION IP ADDRESS | DESTINATION PORT |
|---|---|---|---|---|
| CORE NODE | n3 | INDIVIDUAL CONTROL | Ic,d,n3 | Pc,d,n3 |
| | | COMMON CONTROL | Ic,c,n3 | Pc,c,n3 |
| ADJACENT NODE | n1 | INDIVIDUAL CONTROL | In,d,n1 | Pn,d,n1 |
| | | COMMON CONTROL | In,c,n1 | Pn,c,n1 |

FIG.4

| NODE ID | NODE NUMBER | MESSAGE TYPE | DESTINATION IP ADDRESS | DESTINATION PORT |
|---|---|---|---|---|
| CORE NODE | n3 | INDIVIDUAL CONTROL | Ic,d,n3 | Pc,d,n3 |
| | | COMMON CONTROL | Ic,c,n3 | Pc,c,n3 |
| ADJACENT NODE | n5 | INDIVIDUAL CONTROL | In,d,n5 | Pn,d,n5 |
| | | COMMON CONTROL | In,c,n5 | Pn,c,n5 |
| UN | n2 | INDIVIDUAL CONTROL | Iv,d,n2 | Pv,d,n2 |
| | | COMMON CONTROL | Iv,c,n2 | Pv,c,n2 |
| | n4 | INDIVIDUAL CONTROL | Iv,d,n4 | Pv,d,n4 |
| | | COMMON CONTROL | Iv,c,n4 | Pv,c,n4 |

FIG.5

| CELL ID | NODE ID |
| --- | --- |
| c1 | n1 |
| c2 | n1 |
| c3 | n5 |

FIG.6

| CELL ID | NODE ID |
| --- | --- |
| c1 | n2 |
| c2 | n4 |
| c3 | n5 |

FIG.7

| CELL ID | NODE ID |
|---|---|
| c1 | n2 |

FIG.8

| CELL ID | NODE ID |
|---|---|
| c2 | n4 |

FIG.9

| LOCATION AREA ID | NODE ID |
|---|---|
| RA1 | n1 |
| RA2 | n1, n5 |

FIG.10

| LOCATION AREA ID | NODE ID |
|---|---|
| RA1 | n2 |
| RA2 | n4 |

| NODE ID | NODE NUMBER | MESSAGE TYPE | DESTINATION IP ADDRESS | DESTINATION PORT |
|---|---|---|---|---|
| CORE NODE | n1 | INDIVIDUAL CONTROL | Iv,d,n1 | Pv,d,n1 |
| | | COMMON CONTROL | Iv,c,n1 | Pv,c,n1 |

FIG.13

| UE ID | UE CONTEXT INFORMATION | CORE NODE CONTEXT INFORMATION | | | | | ADJACENT NODE CONTEXT INFORMATION | | | | |
|---|---|---|---|---|---|---|---|---|---|---|---|
| | | NODE'S OWN CONTEXT ID | NODE'S OWN DATA PATH | CORE NODE NODE ID | CORE NODE CONTEXT ID | CORE NODE DATA PATH | NODE'S OWN CONTEXT ID | NODE'S OWN DATA PATH | ADJACENT NODE NODE ID | ADJACENT NODE CONTEXT ID | ADJACENT NODE DATA PATH |
| u1 | UE'S CONTEXT ID, UE'S CAPABILITY, ETC. | u | ... | n1 | r1 | ... | ... | ... | ... | ... | ... |
| ... | | | | | | | | | | | |

FIG.14

| UE ID | INTERFACE TYPE | NODE #1 CONTEXT INFORMATION | | | | | NODE #2 CONTEXT INFORMATION | | | | |
|---|---|---|---|---|---|---|---|---|---|---|---|
| | | NODE'S OWN CONTEXT ID | NODE'S OWN DATA PATH | NODE #1 NODE ID | NODE #1 CONTEXT ID | NODE #1 DATA PATH | NODE'S OWN CONTEXT ID | NODE'S OWN DATA PATH | NODE #2 NODE ID | NODE #2 CONTEXT ID | NODE #2 DATA PATH |
| u1 | 1 | r1 | ... | n2 | u | ... | r2 | ... | n3 | a | ... |
| | 2 | ... | ... | ... | ... | ... | ... | ... | ... | ... | ... |
| ... | | | | | | | | | | | |

FIG.16

| UE ID | INTERFACE TYPE | NODE #1 CONTEXT INFORMATION | | | | | NODE #2 CONTEXT INFORMATION | | | | |
|---|---|---|---|---|---|---|---|---|---|---|---|
| | | NODE'S OWN CONTEXT ID | NODE'S OWN DATA PATH | NODE #1 NODE ID | NODE #1 CONTEXT ID | NODE #1 DATA PATH | NODE'S OWN CONTEXT ID | NODE'S OWN DATA PATH | NODE #2 NODE ID | NODE #2 CONTEXT ID | NODE #2 DATA PATH |
| u1 | 1 | r1 | [Ir1, Pr1, Fr1] | n2 | u | [Iu, Pu, Fu] | r2 | [Ir2, Pr2, Fr2] | n3 | a | [Ia, Pa, Fa] |
| | 2 | … | … | … | … | … | … | … | … | … | … |
| … | | | | | | | | | | | |

FIG.17

| UE ID | UE CONTEXT INFORMATION | CORE NODE CONTEXT INFORMATION | | | | | ADJACENT NODE CONTEXT INFORMATION | | | | |
|---|---|---|---|---|---|---|---|---|---|---|---|
| | | NODE'S OWN CONTEXT ID | NODE'S OWN DATA PATH | CORE NODE NODE ID | CORE NODE CONTEXT ID | CORE NODE DATA PATH | NODE'S OWN CONTEXT ID | NODE'S OWN DATA PATH | ADJACENT NODE NODE ID | ADJACENT NODE CONTEXT ID | ADJACENT NODE DATA PATH |
| u1 | UE'S CONTEXT ID, UE'S CAPABILITY, ETC. | u | [Iu, Pu, Fu] | n1 | r1 | [Ir1, Pr1, Fr1] | ... | ... | ... | ... | ... |
| ... | | | | | | | | | | | |

FIG.21

| UE ID | UE CONTEXT INFORMATION | CORE NODE CONTEXT INFORMATION | | | | | ADJACENT NODE CONTEXT INFORMATION | | | | |
|---|---|---|---|---|---|---|---|---|---|---|---|
| | | NODE'S OWN CONTEXT ID | NODE'S OWN DATA PATH | CORE NODE NODE ID | CORE NODE CONTEXT ID | CORE NODE DATA PATH | NODE'S OWN CONTEXT ID | NODE'S OWN DATA PATH | ADJACENT NODE NODE ID | ADJACENT NODE CONTEXT ID | ADJACENT NODE DATA PATH |
| u1 | UE'S CONTEXT ID, UE'S CAPABILITY, ETC. | u | [Iu, Pu, Fu] | n1 | r1 | [Ir1, Pr1, Fr1] | ub | [Iub, Pub, Fub] | n1 | r3 | [Ir3, Pr3, Fr3] |
| ... | | | | | | | | | | | |

FIG.22

| UE ID | INTERFACE TYPE | NODE #1 CONTEXT INFORMATION | | | | | NODE #2 CONTEXT INFORMATION | | | | |
|---|---|---|---|---|---|---|---|---|---|---|---|
| | | NODE'S OWN CONTEXT ID | NODE'S OWN DATA PATH | NODE #1 NODE ID | NODE #1 CONTEXT ID | NODE #1 DATA PATH | NODE'S OWN CONTEXT ID | NODE'S OWN DATA PATH | NODE #2 NODE ID | NODE #2 CONTEXT ID | NODE #2 DATA PATH |
| u1 | 1 | r1 | [Ir1, Pr1, Fr1] | n2 | u | [Iu, Pu, Fu] | r2 | [Ir2, Pr2, Fr2] | n3 | a | [Ia, Pa, Fa] |
| | 2 | r3 | [Ir3, Pr3, Fr3] | n2 | ub | [Iub, Pub, Fub] | r4 | [Ir4, Pr4, Fr4] | n4 | uc | [Iuc, Puc, Fuc] |
| ... | | | | | | | | | | | |

FIG.23

| UE ID | UE CONTEXT INFORMATION | CORE NODE CONTEXT INFORMATION | | | | | ADJACENT NODE CONTEXT INFORMATION | | | | |
|---|---|---|---|---|---|---|---|---|---|---|---|
| | | NODE'S OWN CONTEXT ID | NODE'S OWN DATA PATH | CORE NODE NODE ID | CORE NODE CONTEXT ID | CORE NODE DATA PATH | NODE'S OWN CONTEXT ID | NODE'S OWN DATA PATH | ADJACENT NODE NODE ID | ADJACENT NODE CONTEXT ID | ADJACENT NODE DATA PATH |
| u1 | UE'S CONTEXT ID, UE'S CAPABILITY, ETC. | u' | [Iu', Pu', Fu'] | n1 | r1 | [Ir1, Pr1, Fr1] | uc | [Iuc, Puc, Fuc] | n1 | r4 | [Ir4, Pr4, Fr4] |
| ... | | | | | | | | | | | |

FIG.24

| UE ID | INTERFACE TYPE | NODE #1 CONTEXT INFORMATION | | | | | NODE #2 CONTEXT INFORMATION | | | | |
|---|---|---|---|---|---|---|---|---|---|---|---|
| | | NODE'S OWN CONTEXT ID | NODE'S OWN DATA PATH | NODE #1 NODE ID | NODE #1 CONTEXT ID | NODE #1 DATA PATH | NODE'S OWN CONTEXT ID | NODE'S OWN DATA PATH | NODE #2 NODE ID | NODE #2 CONTEXT ID | NODE #2 DATA PATH |
| u1 | 1 | r1 | [Ir1, Pr1, Fr1] | n4 | u' | [Iu' , Pu' , Fu' ] | r2 | [Ir2, Pr2, Fr2] | n3 | a | [Ia, Pa, Fa] |
| | 2 | ... | ... | ... | ... | ... | ... | ... | ... | ... | ... |
| ... | | | | | | | | | | | |

FIG.26

| UE ID | INTERFACE TYPE | NODE #1 CONTEXT INFORMATION | | | | | NODE #2 CONTEXT INFORMATION | | | | |
|---|---|---|---|---|---|---|---|---|---|---|---|
| | | NODE'S OWN CONTEXT ID | NODE'S OWN DATA PATH | NODE #1 NODE ID | NODE #1 CONTEXT ID | NODE #1 DATA PATH | NODE'S OWN CONTEXT ID | NODE'S OWN DATA PATH | NODE #2 NODE ID | NODE #2 CONTEXT ID | NODE #2 DATA PATH |
| u1 | 1 | r1 | [Ir1, Pr1, Fr1] | n2 | u | [Iu, Pu, Fu] | r2 | [Ir2, Pr2, Fr2] | n3 | a | [Ia, Pa, Fa] |
| | 2 | r3 | [Ir3, Pr3, Fr3] | n2 | ub | [Iub, Pub, Fub] | r4 | [Ir4, Pr4, Fr4] | n5 | t2 | [It2, Pt2, Ft2] |
| ... | | | | | | | | | | | |

FIG.27

| UE ID | UE CONTEXT INFORMATION | CORE NODE CONTEXT INFORMATION | | | | | ADJACENT NODE CONTEXT INFORMATION | | | | |
|---|---|---|---|---|---|---|---|---|---|---|---|
| | | NODE'S OWN CONTEXT ID | NODE'S OWN DATA PATH | CORE NODE NODE ID | CORE NODE CONTEXT ID | CORE NODE DATA PATH | NODE'S OWN CONTEXT ID | NODE'S OWN DATA PATH | ADJACENT NODE NODE ID | ADJACENT NODE CONTEXT ID | ADJACENT NODE DATA PATH |
| u1 | UE'S CONTEXT ID, UE'S CAPABILITY, ETC. | t1 | [It1, Pt1, Ft1] | n3 | a | [Ia, Pa, Fa] | t2 | [It2, Pt2, Ft2] | n1 | r4 | [Ir4, Pr4, Fr4] |
| ... | | | | | | | | | | | |

FIG.29

| UE ID | UE CONTEXT INFORMATION | CORE NODE CONTEXT INFORMATION | | | | | ADJACENT NODE CONTEXT INFORMATION | | | | |
|---|---|---|---|---|---|---|---|---|---|---|---|
| | | NODE'S OWN CONTEXT ID | NODE'S OWN DATA PATH | CORE NODE NODE ID | CORE NODE CONTEXT ID | CORE NODE DATA PATH | NODE'S OWN CONTEXT ID | NODE'S OWN DATA PATH | ADJACENT NODE NODE ID | ADJACENT NODE CONTEXT ID | ADJACENT NODE DATA PATH |
| u1 | UE'S CONTEXT ID, UE'S CAPABILITY, ETC. | t1 | [It1, Pt1, Ft1] | n3 | a | [Ia, Pa, Fa] | … | … | … | … | … |
| … | | | | | | | | | | | |

FIG.30

| UE ID | UE CONTEXT INFORMATION | CORE NODE CONTEXT INFORMATION | | | | | ADJACENT NODE CONTEXT INFORMATION | | | | |
|---|---|---|---|---|---|---|---|---|---|---|---|
| | | NODE'S OWN CONTEXT ID | NODE'S OWN DATA PATH | CORE NODE NODE ID | CORE NODE CONTEXT ID | CORE NODE DATA PATH | NODE'S OWN CONTEXT ID | NODE'S OWN DATA PATH | ADJACENT NODE NODE ID | ADJACENT NODE CONTEXT ID | ADJACENT NODE DATA PATH |
| u1 | UE'S CONTEXT ID, UE'S CAPABILITY, ETC. | u | [Iu, Pu, Fu] | n1 | r1 | [Ir1, Pr1, Fr1] | ub | [Iub, Pub, Fub] | n1 | r3 | [Ir3, Pr3, Fr3] |
| ... | | | | | | | | | | | |

FIG.31

| UE ID | INTERFACE TYPE | NODE #1 CONTEXT INFORMATION | | | | | NODE #2 CONTEXT INFORMATION | | | | |
|---|---|---|---|---|---|---|---|---|---|---|---|
| | | NODE'S OWN CONTEXT ID | NODE'S OWN DATA PATH | NODE #1 NODE ID | NODE #1 CONTEXT ID | NODE #1 DATA PATH | NODE'S OWN CONTEXT ID | NODE'S OWN DATA PATH | NODE #2 NODE ID | NODE #2 CONTEXT ID | NODE #2 DATA PATH |
| u1 | 1 | r1 | [Ir1, Pr1, Fr1] | ... | ... | ... | r2 | [Ir2, Pr2, Fr2] | n3 | a | [Ia, Pa, Fa] |
| | 2 | r4 | [Ir4, Pr4, Fr4] | n5 | t2 | [It2, Pt2, Ft2] | r3 | [Ir3, Pr3, Fr3] | n2 | ub | [Iub, Pub, Fub] |
| ... | | | | | | | | | | | |

FIG.32

| UE ID | INTERFACE TYPE | NODE #1 CONTEXT INFORMATION | | | | | NODE #2 CONTEXT INFORMATION | | | | |
|---|---|---|---|---|---|---|---|---|---|---|---|
| | | NODE'S OWN CONTEXT ID | NODE'S OWN DATA PATH | NODE #1 NODE ID | NODE #1 CONTEXT ID | NODE #1 DATA PATH | NODE'S OWN CONTEXT ID | NODE'S OWN DATA PATH | NODE #2 NODE ID | NODE #2 CONTEXT ID | NODE #2 DATA PATH |
| u1 | 1 | r1 | [Ir1, Pr1, Fr1] | n2 | u | [Iu, Pu, Fu] | r2 | [Ir2, Pr2, Fr2] | n3 | a | [Ia, Pa, Fa] |
| | 2 | r4 | [Ir4, Pr4, Fr4] | n5 | t2 | [It2, Pt2, Ft2] | r3 | [Ir3, Pr3, Fr3] | n2 | ub | [Iub, Pub, Fub] |
| ... | | | | | | | | | | | |

| NODE TYPE | NODE NUMBER | MESSAGE TYPE | DESTINATION IP ADDRESS | DESTINATION PORT |
|---|---|---|---|---|
| CORE NODE | n3 | INDIVIDUAL CONTROL | ... | ... |
| | | COMMON CONTROL | Ic,c,n3 | Pc,c,n3 |
| RN-D | n1-2 | INDIVIDUAL CONTROL | Iv,d,n1-2 | Pv,d,n1-2 |
| | | COMMON CONTROL | Iv,c,n1-2 | Pv,c,n1-2 |
| RN-N | n1-3 | INDIVIDUAL CONTROL | Iv,d,n1-3 | Pv,d,n1-3 |
| | | COMMON CONTROL | Iv,c,n1-3 | Pv,c,n1-3 |
| UN | n2 | INDIVIDUAL CONTROL | ... | ... |
| | | COMMON CONTROL | Iv,c,n2 | Pv,c,n2 |
| | n4 | INDIVIDUAL CONTROL | ... | ... |
| | | COMMON CONTROL | Iv,c,n4 | Pv,c,n4 |

FIG.36

| NODE TYPE | NODE NUMBER | MESSAGE TYPE | DESTINATION IP ADDRESS | DESTINATION PORT |
|---|---|---|---|---|
| CORE NODE | n3 | INDIVIDUAL CONTROL | Ic,d,n3 | Pc,d,n3 |
| | | COMMON CONTROL | ... | ... |
| RN-C | n1-1 | INDIVIDUAL CONTROL | Iv,d,n1-1 | Pv,d,n1-1 |
| | | COMMON CONTROL | Iv,c,n1-1 | Pv,c,n1-1 |
| RN-N | n1-3 | INDIVIDUAL CONTROL | Iv,d,n1-3 | Pv,d,n1-3 |
| | | COMMON CONTROL | Iv,c,n1-3 | Pv,c,n1-3 |
| UN | n2 | INDIVIDUAL CONTROL | Iv,d,n2 | Pv,d,n2 |
| | | COMMON CONTROL | ... | ... |
| | n4 | INDIVIDUAL CONTROL | Iv,d,n4 | Pv,d,n4 |
| | | COMMON CONTROL | ... | ... |

FIG.37

| NODE TYPE | NODE NUMBER | MESSAGE TYPE | DESTINATION IP ADDRESS | DESTINATION PORT |
|---|---|---|---|---|
| RN-C | n1-1 | INDIVIDUAL CONTROL | Iv,d,n1-1 | Pv,d,n1-1 |
| | | COMMON CONTROL | Iv,c,n1-1 | Pv,c,n1-1 |
| RN-D | n1-2 | INDIVIDUAL CONTROL | Iv,d,n1-2 | Pv,d,n1-2 |
| | | COMMON CONTROL | Iv,c,n1-2 | Pv,c,n1-2 |
| ADJACENT NODE | n5 | INDIVIDUAL CONTROL | In,d,n5 | Pn,d,n5 |
| | | COMMON CONTROL | In,c,n5 | Pn,c,n5 |
| UN | n2 | INDIVIDUAL CONTROL | Iv,d,n2 | Pv,d,n2 |
| | | COMMON CONTROL | Iv,c,n2 | Pv,c,n2 |
| | n4 | INDIVIDUAL CONTROL | Iv,d,n4 | Pv,d,n4 |
| | | COMMON CONTROL | Iv,c,n4 | Pv,c,n4 |

FIG.38

| NODE TYPE | NODE NUMBER | MESSAGE TYPE | DESTINATION IP ADDRESS | DESTINATION PORT |
|---|---|---|---|---|
| COMMON CONTROL CORE NODE | n1-1 | INDIVIDUAL CONTROL | 1v,d,n1-1 | Pv,d,n1-1 |
| | | COMMON CONTROL | 1v,c,n1-1 | Pv,c,n1-1 |
| INDIVIDUAL CONTROL CORE NODE | n1-2 | INDIVIDUAL CONTROL | 1v,d,n1-2 | Pv,d,n1-2 |
| | | COMMON CONTROL | 1v,c,n1-2 | Pv,c,n1-2 |
| MOBILITY CONTROL CORE NODE | n1-3 | INDIVIDUAL CONTROL | 1v,d,n1-3 | Pv,d,n1-3 |
| | | COMMON CONTROL | 1v,c,n1-3 | Pv,c,n1-3 |

FIG.39

| UE ID | UE CONTEXT INFORMATION | CORE NODE CONTEXT INFORMATION | | | | | ADJACENT NODE CONTEXT INFORMATION | | | | |
|---|---|---|---|---|---|---|---|---|---|---|---|
| | | NODE'S OWN CONTEXT ID | NODE'S OWN DATA PATH | CORE NODE NODE ID | CORE NODE CONTEXT ID | CORE NODE DATA PATH | NODE'S OWN CONTEXT ID | NODE'S OWN DATA PATH | ADJACENT NODE NODE ID | ADJACENT NODE CONTEXT ID | ADJACENT NODE DATA PATH |
| u1 | UE'S CONTEXT ID, UE'S CAPABILITY, ETC. | u | [Iu, Pu, Fu] | n1-2 | r1 | [Ir1, Pr1, Fr1] | ... | ... | ... | ... | ... |
| ... | | | | | | | | | | | |

FIG.41

| UE ID | UE CONTEXT INFORMATION | CORE NODE CONTEXT INFORMATION | | | | | ADJACENT NODE CONTEXT INFORMATION | | | | |
|---|---|---|---|---|---|---|---|---|---|---|---|
| | | NODE'S OWN CONTEXT ID | NODE'S OWN DATA PATH | CORE NODE NODE ID | CORE NODE CONTEXT ID | CORE NODE DATA PATH | NODE'S OWN CONTEXT ID | NODE'S OWN DATA PATH | ADJACENT NODE NODE ID | ADJACENT NODE CONTEXT ID | ADJACENT NODE DATA PATH |
| u1 | UE'S CONTEXT ID, UE'S CAPABILITY, ETC. | u' | [Iu', Pu', Fu'] | n1-2 | r1 | [Ir1, Pr1, Fr1] | uc | [Iuc, Puc, Fuc] | n1-3 | r4 | [Ir4, Pr4, Fr4] |
| ... | | | | | | | | | | | |

FIG.42

| UE ID | INTERFACE TYPE | NODE #1 CONTEXT INFORMATION | | | | | NODE #2 CONTEXT INFORMATION | | | | |
|---|---|---|---|---|---|---|---|---|---|---|---|
| | | NODE'S OWN CONTEXT ID | NODE'S OWN DATA PATH | NODE #1 NODE ID | NODE #1 CONTEXT ID | NODE #1 DATA PATH | NODE'S OWN CONTEXT ID | NODE'S OWN DATA PATH | NODE #2 NODE ID | NODE #2 CONTEXT ID | NODE #2 DATA PATH |
| u1 | 1 | … | … | … | … | … | … | … | … | … | … |
| | 2 | r3 | [Ir3, Pr3, Fr3] | n2 | ub | [Iub, Pub, Fub] | r4 | [Ir4, Pr4, Fr4] | n4 | uc | [Iuc, Puc, Fuc] |
| … | | | | | | | | | | | |

FIG.43

| UE ID | UE CONTEXT INFORMATION | CORE NODE CONTEXT INFORMATION | | | | | ADJACENT NODE CONTEXT INFORMATION | | | | |
|---|---|---|---|---|---|---|---|---|---|---|---|
| | | NODE'S OWN CONTEXT ID | NODE'S OWN DATA PATH | CORE NODE NODE ID | CORE NODE CONTEXT ID | CORE NODE DATA PATH | NODE'S OWN CONTEXT ID | NODE'S OWN DATA PATH | ADJACENT NODE NODE ID | ADJACENT NODE CONTEXT ID | ADJACENT NODE DATA PATH |
| u1 | UE'S CONTEXT ID, UE'S CAPABILITY, ETC. | u | [Iu, Pu, Fu] | n1-2 | r1 | [Ir1, Pr1, Fr1] | ub | [Iub, Pub, Fub] | n1-3 | r3 | [Ir3, Pr3, Fr3] |
| ⋮ | | | | | | | | | | | |

FIG.44

| UE ID | INTERFACE TYPE | NODE #1 CONTEXT INFORMATION | | | | | NODE #2 CONTEXT INFORMATION | | | | |
|---|---|---|---|---|---|---|---|---|---|---|---|
| | | NODE'S OWN CONTEXT ID | NODE'S OWN DATA PATH | NODE #1 NODE ID | NODE #1 CONTEXT ID | NODE #1 DATA PATH | NODE'S OWN CONTEXT ID | NODE'S OWN DATA PATH | NODE #2 NODE ID | NODE #2 CONTEXT ID | NODE #2 DATA PATH |
| u1 | 1 | r1 | [Ir1, Pr1, Fr1] | n4 | u' | [Iu', Pu', Fu'] | r2 | [Ir2, Pr2, Fr2] | n3 | a | [Ia, Pa, Fa] |
| | 2 | … | … | … | … | … | … | … | … | … | … |
| … | | | | | | | | | | | |

FIG.46

| UE ID | INTERFACE TYPE | NODE #1 CONTEXT INFORMATION | | | | | NODE #2 CONTEXT INFORMATION | | | | |
|---|---|---|---|---|---|---|---|---|---|---|---|
| | | NODE'S OWN CONTEXT ID | NODE'S OWN DATA PATH | NODE #1 NODE ID | NODE #1 CONTEXT ID | NODE #1 DATA PATH | NODE'S OWN CONTEXT ID | NODE'S OWN DATA PATH | NODE #2 NODE ID | NODE #2 CONTEXT ID | NODE #2 DATA PATH |
| u1 | 1 | r5 | … | n1-2 | r1 | … | … | … | n3 | a | [Ia, Pa, Fa] |
| | 2 | r3 | [Ir3, Pr3, Fr3] | n2 | ub | [Iub, Pub, Fub] | r4 | [Ir4, Pr4, Fr4] | n5 | t2 | [It2, Pt2, Ft2] |
| … | | | | | | | | | | | |

FIG.48

| UE ID | INTERFACE TYPE | NODE #1 CONTEXT INFORMATION | | | | | NODE #2 CONTEXT INFORMATION | | | | |
|---|---|---|---|---|---|---|---|---|---|---|---|
| | | NODE'S OWN CONTEXT ID | NODE'S OWN DATA PATH | NODE #1 NODE ID | NODE #1 CONTEXT ID | NODE #1 DATA PATH | NODE'S OWN CONTEXT ID | NODE'S OWN DATA PATH | NODE #2 NODE ID | NODE #2 CONTEXT ID | NODE #2 DATA PATH |
| u1 | 1 | … | … | n3 | a | … | r5 | … | n1-2 | r1 | [Ir1, Pr1, Fr1] |
| | 2 | r4 | [Ir4, Pr4, Fr4] | n5 | t2 | [It2, Pt2, Ft2] | r3 | [Ir3, Pr3, Fr3] | n2 | ub | [Iub, Pub, Fub] |
| … | | | | | | | | | | | |

FIG.49

| UE ID | INTERFACE TYPE | NODE #1 CONTEXT INFORMATION | | | | | NODE #2 CONTEXT INFORMATION | | | | |
|---|---|---|---|---|---|---|---|---|---|---|---|
| | | NODE'S OWN CONTEXT ID | NODE'S OWN DATA PATH | NODE #1 NODE ID | NODE #1 CONTEXT ID | NODE #1 DATA PATH | NODE'S OWN CONTEXT ID | NODE'S OWN DATA PATH | NODE #2 NODE ID | NODE #2 CONTEXT ID | NODE #2 DATA PATH |
| u1 | 1 | r1 | [Ir1, Pr1, Fr1] | n2 | u | [Iu, Pu, Fu] | r2 | [Ir2, Pr2, Fr2] | n3 | a | [Ia, Pa, Fa] |
| | 2 | … | … | … | … | … | … | … | … | … | … |
| … | | | | | | | | | | | |

FIG.52

| UE ID | INTERFACE TYPE | NODE #1 CONTEXT INFORMATION ||||| NODE #2 CONTEXT INFORMATION ||||
|---|---|---|---|---|---|---|---|---|---|---|
| | | NODE'S OWN CONTEXT ID | NODE'S OWN DATA PATH | NODE #1 NODE ID | NODE #1 CONTEXT ID | NODE #1 DATA PATH | NODE'S OWN CONTEXT ID | NODE'S OWN DATA PATH | NODE #2 NODE ID | NODE #2 CONTEXT ID | NODE #2 DATA PATH |
| u1 | 1 | r1 | pr1, pr@np, [Ir1, Pr1, Fr1] | n2 | u | [Iu, Pu, Fu] | r2 | pr2, p2@np, [Ir2, Pr2, Fr2] | n3 | a | [Ia, Pa, Fa] |
| | 2 | ... | ... | ... | ... | ... | ... | ... | ... | ... | ... |
| ... | | | | | | | | | | | |

WIRELESS COMMUNICATION SYSTEM AND BASE STATION

TECHNICAL FIELD

The present invention relates to a wireless communication system in which base stations are disposed so as to be subordinate to a gateway device provided between a core network and a wireless access network.

BACKGROUND ART

In recent years, various techniques for increasing the speed of wireless access have been proposed and standardized, with the intention of realizing faster wireless packet communications. It has been said that, in a "Beyond 3G/4G" cellular system, it is possible to achieve a wireless transmission speed of hundreds of megabits per second (Mbps) to 1 gigabits per second (Gbps). When wireless transmission is realized at such a high speed, the transmission power becomes an issue. Thus, it is predicted that an area covered by each cell will become smaller than an area covered by each conventional cell. Also, because each cell will become smaller, it is predicted that the number of base stations that perform wireless communications with terminals will further increase in the future.

The number of base stations and the number of cells that a base station control device is able to accommodate are limited due to constraints related to control specifications and the capacity of the device. As a result, there is a situation in which, even if a base station control device is supposed to be able to accommodate base stations according to the processing capacity thereof, the base station control device is not able to accommodate some of the base stations due to the limitations regarding the number of accommodated base stations and the number of accommodated cells mentioned above. In such a situation, there is a problem in that base station accommodating efficiency of the base station control device is low.

A technique disclosed in Patent Document 1 listed below solves the problem discussed above. In specifically, according to the disclosed technique, a base station line concentrator is provided between a plurality of base stations and a base station control device that controls the base stations. The base station line concentrator converts and transmits control data and user data between the base station control device and the base stations. According to this technique, the base station control device is able to operate while regarding the plurality of base stations as one virtual base station. Consequently, by connecting a plurality of base station line concentrators to a base station control device, it becomes possible to accommodate a larger number of base stations without introducing a new base station control device that is expensive.

The Third Generation Partnership Project (3GPP) has been researching a next-generation wireless access method called Evolved Universal Terrestrial Radio Access (E-UTRA) and a wireless access network called Evolved Universal Terrestrial Radio Access Network (E-UTRAN) that are obtained by optimizing a third-generation wireless access method and a wireless access network called Universal Terrestrial Radio Access Network (UTRAN) for wireless packet communications so as to achieve a lower delay and a higher data rate (see Non-patent Document 1 listed below). In an architecture adopted by E-UTRAN, a wireless network control device called a "Radio Network Controller (RNC)" that controls base stations called "Node B's" is eliminated and base stations called "Evolved Node B's (eNodeB's)" each having the functions of the RNC are directly accommodated while being subordinate to a gateway device called a "System Architecture Evolution Gateway (SAE-GW)" that is provided between a core network and a wireless access network. In this arrangement, because the architecture in which hierarchical structures have been eliminated is adopted into the wireless access network, E-UTRAN is able to achieve advantageous effects where end-to-end delays are reduced and where the network configuration is simplified.

Patent Document 1: Japanese Patent Application Laid-open No. 2006-279261

Non-patent Document 1: 3GPP Technical Specification (TS) 36.300 "Evolved Universal Terrestrial Radio Access (E-UTRA) and Evolved Universal Terrestrial Radio Access (E-UTRAN); Overall description; Stage 2," Version 8.0.0 (2007-03)

DISCLOSURE OF INVENTION

Problem to be Solved by the Invention

In a wireless access network architecture like E-UTRAN described above in which each of the base stations has such functions of a wireless access control, call processing, management of moving of mobile devices, and the like, while each of the base stations is directly connected to a core network, same problem as the problem occurs in the conventional wireless access network in which a base station control device controls a plurality of base stations can occur. More specifically, there is a situation in which, even if a core network device accommodating a plurality of base stations is supposed to be able to accommodate base stations according to the processing capacity thereof, the core network device is not able to accommodate some of the base stations due to the limitation regarding the number of accommodated base stations and the number of accommodated cells because of the constraints related to the control specifications of the core network device and/or a capacity of the device based on such as a circuit interface. As s result, there is a problem where base station accommodating efficiency of the core network device is low.

However, the conventional technique described above is a technique for improving the base station accommodating efficiency of the base station control device by such an arrangement in which the base station line concentrator causes a plurality of base stations to be virtually regarded as one base station. Thus, no technique is disclosed for improving the base station accommodating efficiency in a case where a plurality of base stations is directly connected to a core network device.

In view of such circumstances described above, an object of the present invention is to obtain a wireless communication system that makes it possible to improve the base station accommodating efficiency of a core network device in the case where a plurality of base stations included in a wireless access network are directly connected to the core network device.

Further, another object of the present invention is to obtain a wireless communication system in which an operation to dynamically disconnect a specific one of a plurality of base stations and an operation to dynamically add a new base station to the wireless access network are defined.

Means for Solving Problem

In order to solve the problem and achieve the object, an wireless communication system according to the present invention includes a gateway device that connects a core network and a wireless access network, wherein the wireless access network comprises a virtual base station that includes at least one representative base station connected to the gateway device and a plurality of unrepresentative base stations that is subordinate to the representative base station, and presence of the unrepresentative base stations is hidden from the gateway device and an adjacent base station that is located adjacent to the virtual base station.

Effect of the Invention

According to an aspect of the present invention, an advantageous effect is achieved where, even if there is a limitation regarding the number of accommodated base stations and the number of accommodated cells on the core network side, it is possible to improve the base station accommodating efficiency by using the configuration described above.

BRIEF DESCRIPTION OF DRAWINGS

FIG. 3 is a drawing showing an example of a path table of a Neighbor Base Station (NBS).

FIG. 4 is a drawing showing an example of a path table of a Representative Node (RN).

FIG. 5 is a drawing showing an example of a cell ID/node ID mapping table of the NBS.

FIG. 6 is a drawing showing an example of a cell ID/node ID mapping table of the RN.

FIG. 7 is a drawing showing an example of a cell ID/node ID mapping table of a UN.

FIG. 8 is a drawing showing an example of a cell ID/node ID mapping table of another UN.

FIG. 9 is a drawing showing an example of a table that is used when a destination node of a paging message is determined on a core network side, based on a location area ID.

FIG. 10 is a drawing showing an example of a table that is used when the RN distributes paging messages that have been received from the core network, to UNs that are subordinate to the RN.

FIG. 13 is a drawing showing an example of a context ID mapping table of a UN.

FIG. 14 is a drawing showing an example of a context ID mapping table of the RN.

FIG. 16 is a drawing showing an example of a context ID mapping table of the RN.

FIG. 17 is a drawing showing an example of a context ID mapping table of a UN.

FIG. 21 is a drawing showing an example of a context ID mapping table of a UN.

FIG. 22 is a drawing showing an example of a context ID mapping table of the RN.

FIG. 23 is a drawing showing an example of a context ID mapping table of a UN.

FIG. 24 is a drawing showing an example of a context ID mapping table of the RN.

FIG. 26 is a drawing showing an example of a context ID mapping table of the RN.

FIG. 27 is a drawing showing an example of a context ID mapping table of the NBS.

FIG. 29 is a drawing showing an example of a context ID mapping table of the NBS.

FIG. 30 is a drawing showing an example of a context ID mapping table of a UN.

FIG. 31 is a drawing showing an example of a context ID mapping table of the RN.

FIG. 32 is a drawing showing an example of a context ID mapping table of the RN.

FIG. 36 is a drawing showing an example of a path table of an RN-D.

FIG. 37 is a drawing showing an example of a path table of an RN-N.

FIG. 38 is a drawing showing an example of a path table of each of UNs.

FIG. 39 is a drawing showing an example of a context ID mapping table of a UN.

FIG. 41 is a drawing showing an example of a context ID mapping table of a UN.

FIG. 42 is a drawing showing an example of a context ID mapping table of the RN-N.

FIG. 43 is a drawing showing an example of a context ID mapping table of a UN.

FIG. 44 is a drawing showing an example of a context ID mapping table of the RN-D.

FIG. 46 is a drawing showing an example of a context ID mapping table of the RN-N.

FIG. 48 is a drawing showing an example of a context ID mapping table of the RN-N.

FIG. 49 is a drawing showing an example of a context ID mapping table of the RN-D.

FIG. 52 is a drawing showing an example of a context ID mapping table of the RN.

EXPLANATIONS OF LETTERS OR NUMERALS

1: core network
2: Wireless access network
3: Access Gateway (AGW)
4: Servers
5: Neighbor Base Station (NBS)
6: Virtual Base Station (VBS)
6*a*: Representative Node (RN)
6*b*, 6*c*: Unrepresentative Node (UN)
6*a*-1: RN-C
6*a*-2: RN-D
6*a*-3: RN-N

BEST MODE(S) FOR CARRYING OUT THE INVENTION

Exemplary embodiments of a wireless communication system of the present invention will be described in detail, with reference to the accompanying drawings. The present invention is not limited to these exemplary embodiments.

First Embodiment

Figures 1, 2:
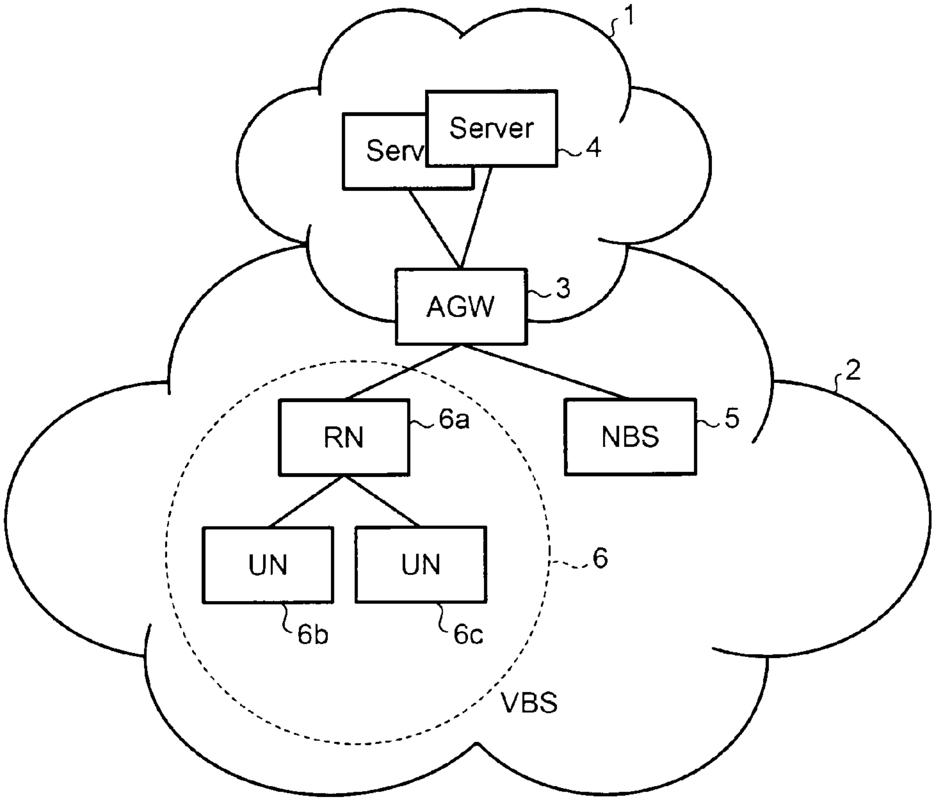
FIG. 1 is a diagram showing an exemplary configuration of a wireless communication system according to a first embodiment of the present invention.
FIG. 2 is a drawing showing an example of a path table of an Access Gateway (AGW).

FIG. 1 is a diagram showing an exemplary configuration of a wireless communication system according to a first embodiment of the present invention. In the wireless communication system according to the first embodiment, an Access Gateway (AGW) 3 is a gateway device that connects a core network 1 and a wireless network 2 together. In the core network 1, servers 4 that include a database that stores therein information of users who have contracted for service and that perform billing operation are present. All the base stations included in the wireless access network 2 perform communications with the core network 1 via the AGW 3. In the following sections, the communications performed between the AGW 3 and the base stations in the wireless access network 2 will be explained. The wireless access network 2 is assumed to be an Internet Protocol (IP) network.

Base stations 5, 6*a*, 6*b*, and 6*c* are present in the wireless access network 2. The base station 5 and the base station 6*a* are connected to the AGW 3. The presence of the base station 6*b* and the base station 6*c* is hidden from the AGW 3 and an adjacent base station called a Neighbor Base Station (NBS) 5. The base station 6*a* will be referred to as a Representative Node (RN), and the base stations 6*b* and 6*c* are connected thereto while being subordinate thereto. The base stations 6*a*, 6*b*, and 6*c* together form one Virtual Base Station (VBS) 6. The RN 6*a* included in the VBS 6 exchanges control messages and user data with the AGW 3 and the NBS 5 on behalf of the base stations 6*b* and 6*c*. The base stations that are included in the VBS 6, other than the RN 6*a*, will be referred to as Unrepresentative Nodes (UNs). Functions of the RN 6*a* may be provided by one of the base stations included in the VBS 6. Alternatively, the RN 6*a* may be configured with a dedicated device called a Dedicated Node (DN) that provides only the functions of the RN, without performing wireless communications with mobile devices. In the following sections, it is assumed that the RN is a Dedicated Node (DN) having the RN functions.

<Network Settings>

In the first embodiment, for the purpose of hiding the presence of the UNs 6*b* and 6*c* included in the VBS 6 from the AGW 3 and the NBS 5, the network settings are configured in the following manner so that cells of which the UNs 6*b* and 6*c* are in charge are regarded by the AGW 3 and the NBS 5 as cells of which the RN 6*a* is in charge.

(1) Correspondent Node Information

In the wireless access network 2, each of the nodes stores therein information of nodes that transmit and receive signaling messages and user data, for the purpose of performing handovers and communications with the core network 1. In the following sections, tables storing such information therein will be referred to as path tables.

FIG. 2 is a drawing showing a path table of the AGW 3. FIG. 3 is a drawing showing a path table of the NBS 5. FIG. 4 is a drawing showing a path table of the RN 6*a*. In each of the path tables, types of correspondent nodes, node IDs, destination IP addresses and destination ports of signaling messages, and the like are shown. Generally speaking, inter-node signaling messages can be divided into: individual control messages used for managing the state (i.e., a context) of each of the mobile devices called User Equipments (UE) that have established wireless connections and for exercising control over each of the UEs; and common control messages used for exercising control that is not limited by the context of a specific UE within a specific node during, for example, information exchanging processes and paging processes between the nodes. In consideration of distributing loads and achieving fault tolerance during IP packet processing, the inter-node signaling messages are configured so that the destination IP addresses and the destination ports vary depending on the types of control messages or so that a plurality of destination IP addresses and a plurality of destination ports are assigned to mutually the same type of control messages. In the following sections, to simplify the explanation, it is assumed that a pair made up of a destination IP address and a destination port is assigned to each individual control message and to each common control message.

For example, let us assume that node IDs of the RN 6*a* and the NBS 5 are n1 and n5, respectively. Correspondent nodes of the AGW 3 are the RN 6*a* and the NBS 5 provided in the wireless access network 2. Accordingly, based on FIG. 2, the AGW 3 transmits an individual control message for the RN 6*a* to an IP address Ic, d, n1 and a destination port Pc, d, n1, transmits a common control message for the RN 6*a* to an IP address Ic, c, n1 and a destination port Pc, c, n1, transmits an individual control message for the NBS 5 to an IP address Ic, d, n5 and a destination port Pc, d, n5, and transmits a common control message for the NBS 5 to an IP address Ic, c, n5 and a destination port Pc, c, n5.

Further, let us assume that a node ID of the AGW 3 is n3. Correspondent nodes of the NBS 5 are the AGW 3 and the RN 6*a*. Accordingly, based on FIG. 3, the NBS 5 transmits an individual control message for the AGW 3 to an IP address Ic, d, n3 and a destination port Pc, d, n3, transmits a common control message for the AGW 3 to an IP address Ic, c, n3 and a destination port Pc, c, n3, transmits an individual control message for the RN 6*a* to an IP address In, d, n1 and a destination port Pn, d, n1, and transmits a common control message for the RN 6*a* to an IP address In, c, n1 and a destination port Pn, c, n1.

In the path table of the RN 6*a*, which is shown in FIG. 4, node information of the UNs 6*b* and 6*c* that are connected to the RN 6*a* while being subordinate thereto is recorded, in addition to node information of the AGW 3 and node information of the NBS 5 that are the same as the ones described above. For example, let us assume that node IDs of the UN 6*b* and the UN 6*c* are n2 and n4, respectively. In that situation, the RN 6*a* transmits an individual control message for the UN 6*b* to an IP address Iv, d, n2 and a destination port Pv, d, n2, transmits a common control message for the UN 6*b* to an IP address Iv, c, n2 and a destination port Pv, c, n2, transmits an individual control message for the UN 6*c* to an IP address Iv, d, n4 and a destination port Pv, d, n4, and transmits a common control message for the UN 6*c* to an IP address Iv, c, n4 and a destination port Pv, c, n4. As described later, the node information of the UN 6*b* and the UN 6*c* is dynamically determined by the RN 6*a* when the UNs 6*b* and 6*c* are activated or statically determined before the UNs 6*b* and 6*c* are activated and connected to the RN 6*a*.

(2) Adjacent Cell Information

When the communication quality of a cell to which a UE is connected has degraded, the UE measures the communication quality of each of neighboring cells of the communicating cell either autonomously or according to an instruction from the base station, and reports a result of the measuring process to the base station. The base station determines a handover target cell for the UE, based on the reported information. This handover method is called as Mobile Assisted HandOver (MAHO).

According to the MAHO, the UE reports a cell having good communication quality to the base station, together with cell identification information such as a cell ID. The base station identifies the base station that is in charge of the cell which is a handover target, based on the cell identification information such as the cell ID that has been received from the UE. Subsequently, for example, the following processes are performed: a process to provide information on services that the UE has been receiving at the handover source base station and the wireless transmission speed; a process to exchange a signaling message for, for example, reserving a wireless resource at the handover target base station; and a process to determine an IP address and a destination port that are used in a data transfer for transferring user data that has been delivered to the handover source base station during the handover process, to the handover target base station.

For this reason, each of the base stations needs to have a means for determining information about the handover target base station to which the signaling message is to be transmitted, based on the cell identification information such as the cell ID that has been reported by the UE as a part of the report of the wireless communication quality. In the following sections, it is assumed that a cell ID is used as the information of a handover candidate cell that is notified by the UE according to the MAHO. It is also assumed that each of the base stations has a mapping table showing cell IDs and node IDs (i.e., a cell ID/node ID mapping table).

In each cell ID/node ID mapping table, corresponding relationships between cell IDs and node IDs of the base stations each of which is in charge of a different one of the cells is recorded. The NBS 5, the UN 6*b*, and the UN 6*c* are in charge of cells c3, c1, and c2, respectively. In FIGS. 5 to 8, examples of cell ID/node ID mapping tables that have respectively been set into the NBS 5, the RN 6*a*, the UN 6*b*, and the UN 6*c* are shown. For example, the cell c1 of the UN 6*b* and the cell c2 of the UN 6*c* are positioned adjacent to the cell 3 of the NBS 5. However, the NBS 5 is not able to recognize the presence of the UNs 6*b* and 6*c* and treats the cells thereof as cells of the VBS 6. Thus, as shown in FIG. 5, the NBS 5 recognizes the cells c1 and c2 as cells of which the RN 6*a* is in charge and sets the node ID of the RN 6*a* as the control message destination.

In actuality, the RN 6*a* is not a base station, and the actual handover process is performed by the UNs 6*b* and 6*c* that are subordinate thereto. Thus, the RN 6*a* has stored therein a cell ID/node ID mapping table shown in FIG. 6. In FIG. 6, the cell ID/node ID mapping table is set so that a control message for the cell c1 is transmitted to the UN 6*b* of which the node ID is n2, whereas a control message for the cell c2 is transmitted to the UN 6*c* of which the node ID is n4.

Further, as shown in FIGS. 7 and 8, each of the UNs 6*b* and 6*c* included in the VBS 6 sets only the information related to the cell of which the UN is in charge, into the cell ID/node ID mapping table stored therein.

(3) Location Registration Area Information

With each of the cells, a location registration area used by the core network for tracking an approximate position of the corresponding UE has been set. Because of an arrangement in which a UE notifies the core network of a location area ID, the core network is able to give a call for an incoming communication to the UE.

The location registration area and the cell are not in a one-to-one corresponding. Generally speaking, one location area ID is assigned to a series of a plurality of cells. With this arrangement, each UE does not need to perform a location registration process every time the UE moves from one cell to another. As a result, it is possible to reduce location registration traffic. Further, when the plurality of cells are arranged to be in mutually the same location registration area, a paging message that is used when an incoming communication occurs is transmitted in a considerably wide area. As a result, it is possible to deliver, with a high possibility, the paging message also to a UE moving at a high speed.

When there is an incoming communication for a UE, the core network 1 refers to a database and searches for the location area ID of an area in which the UE is located. The core network 1 then transmits a paging message for the UE to all the base stations that are in charge of the cells to which the obtained location area ID is assigned. FIG. 9 is a drawing showing an example of a table that is used when the destination node of a paging message is determined on the core network 1 side, based on the location area ID. In the example shown in FIG. 9, a location area ID "RA 1" is assigned to the cell c1 of the UN 6*b*, whereas a location area ID "RA 2" is assigned to the cell c2 of the UN 6*c* and to the cell c3 of the NBS 5. In actuality, the base stations that are in charge of the cells c1 and c2 are the UNs 6*b* and 6*c*, respectively; however, all the paging messages for these cells are configured so as to be received by the RN 6*a*, so that the presence of the UNs 6*b* and 6*c* is hidden by the RN 6*a*.

FIG. 10 is a drawing showing a table that is used when the RN 6*a* distributes the paging messages that have been received from the core network 1, to the UNs that are subordinate to the RN 6*a*. Paging messages for the location area ID "RA 1" are transmitted to the UN 6*b* that is in charge of the cell c1 to which the location area ID has been assigned. Similarly, messages for the location area ID "RA 2" are transmitted to the UN 6*c*. The table is dynamically generated when the UNs 6*b* and 6*c* are activated or statically generated before the UNs 6*b* and 6*c* are activated.

<Dynamic Configurations of the VBS>

In the VBS 6, whether each of the UNs is activated or not is shown as whether each of the cells of the VBS 6 is in a state where the communication is enabled or disabled, so that the presence of the UNs is hidden from superordinate nodes. Thus, the RN 6*a* is activated first and until the RN 6*a* completes a normal activation procedure with the other nodes, all the cells of the VBS 6 are in a state where communication is disabled. The cell IDs and the location area IDs that are assigned to the cells of the VBS 6 are either obtained as a part of the normal activation procedure when the RN 6*a* is activated or stored, in advance, in the RN 6*a* as a system parameter.

(1) Participation of the UNs

Let us assume that each of the UNs has stored therein the information about the RN 6*a* to which the UNs should be connected when being activated. When a UN is connected to the RN 6*a*, the RN 6*a* notifies the UN of the cell ID and the location area ID that are used in the VBS cell of which the UN is in charge. The RN 6*a* further causes the VBS cell of which the activated UN is in charge to be in a state where communication is enabled.

(2) Withdrawals of the UNs

When the RN 6*a* has recognized that a UN has performed a proper stopping procedure or when the RN 6*a* has recognized stopping or an abnormality of a UN during a state monitoring process, the RN 6*a* causes the cell of which the UN is in charge to be in a state where communication is disabled.

(3) State Monitoring Process for the VBS

A state monitoring process for the VBS is performed only between the core network 1 and the RN 6*a*. When the RN 6*a* itself is in an abnormal state or where a predetermined number of UNs have abnormalities and it is not possible to resume communications, the core network 1 detects an abnormality of the VBS. In other situations (i.e., when each of the UNs has stopped by taking the proper procedure or when the quantity of UNs are smaller than the predetermined number have abnormalities), the RN 6*a* treats the situations as if the cells of which the UNs are in charge were in a state where communication is disabled, and the RN 6*a* does not notify the core network 1 of the abnormalities.

<Location Registration>

With each of the cells, the location registration area used by the core network 1 for tracking the position of the corresponding UE has been set. When the power of a mobile device has been turned on or when a mobile device moves from one cell to another while on stand-by and the location registration area of the original cell is different from the location registration area of the destination cell, the mobile device performs a location registration process with the core network 1. The location registration process is performed by, for example, notifying the core network 1 of the ID that has been set to corresponding one of the location registration areas, together with the ID of the UE, as explained below.

Figures 11, 12:
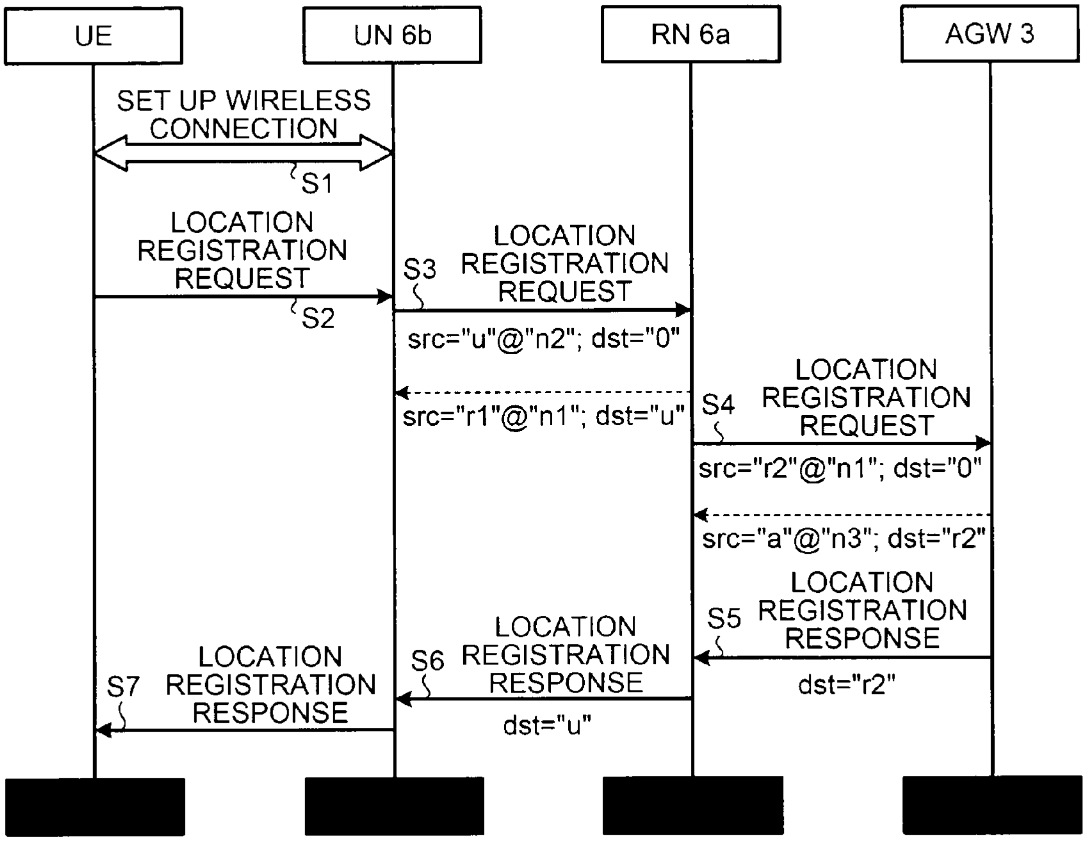
FIG. 11 is a diagram showing an example of a simplified operational sequence that is used when a UE performs a location registration process.
FIG. 12 is a drawing showing an example of a path table.

FIG. 11 is a diagram showing a simplified sequence that is performed when a UE performs the location registration process. In the following sections, a procedure in the location registration process will be explained in detail, while assuming that the ID of the UE is u1.

First, the UE establishes a wireless connection with the UN 6*b* (step S1). Subsequently, the UE transmits a location registration request message storing therein the location area ID of the cell on which the location registration process is to be performed and the ID "u1" of the UE to the UN 6*b*, as a message for the core network 1 (step S2). Because the message that has been received from the UE is a message for the core network 1, the UN 6*b* generates a signaling message for the core network 1, based on the received message. Because the location registration request message is related to control exercised over the individual UE, the location registration request message is classified as an individual control message. With respect to an individual control message, it is requisite that the control target UE is identified by using a context ID assigned to each of different contexts. For this reason, when a signaling message regarding a UE is exchanged between nodes for the first time, a context ID used for identifying the signaling messages regarding the UE is exchanged between the nodes, as explained below in the description of steps S3 and S4.

When the UN 6*b* generates the location registration request message to be transmitted to the core network 1, the UN 6*b* first determines the destination of the signaling message. To determine the destination, the UN 6*b* uses, for example, a path table shown in FIG. 12. According to the path table of the UN 6*b*, the node having the node number "n1" (i.e., the RN 6*a*) is a core node, whereas an individual control message for the core node should be transmitted to an IP address Iv, d, n1 and a destination port Pv, d, n1. Thus, the UN 6*b* transmits the generated location registration request message to these IP address and destination port (step S3). When transmitting the location registration request message, the UN 6*b* sets context IDs into the message so that UE contexts can be identified. The context IDs include two IDs that are namely an ID on the UN 6*b* side and an ID on the RN 6*a* side. The UN 6*b* assigns a context ID "u", which is unique within the UN, to the context of the UE that performs the location registration process. The UN 6*b* also sets an ID (e.g., "0") indicating a new context as the context ID on the RN 6*a* side, which is the message destination.

When the RN 6*a* has recognized that the destination context ID that has been set into the location registration request message received in the process at step S3 is the ID (ID="0") implying that a new context should be assigned, the RN 6*a* newly assigns a context ID "r1", sets the assigned context ID into a response message, which is simply indicated by an arrow with a broken line in FIG. 11, and transmits the response message to the UN 6*b*. In this situation, the RN 6*a* designates the context ID "r1" on the RN 6*a* side as a source context ID of the response message and designates the context ID "u" on the UN 6*b* side, which has been received from the UN 6*b*, as a destination context ID of the response message.

Subsequently, the RN 6*a* first assigns a context ID "r2" that is used for exchanging individual control messages with the AGW 3. After that, the RN 6*a* rewrites the source context ID "u" contained in the location registration request message received from the UN 6*b* with the context ID "r2" and transmits the location registration request message to the AGW 3 (step S4). The information such as the IP address and the destination port of the AGW 3 to which the location registration request message is transmitted is managed in the path table of the RN 6*a* (see FIG. 4). According to the path table, the destination is the IP address Ic, d, n3 and the destination port Pc, d, n3 of the AGW 3 that serves as a core node and of which the node number is "n3".

The AGW 3 receives the location registration request message in the process at step S4 and assigns a context ID "a". The AGW 3 then sets the destination context ID to "r2" and the source context ID to "a" in a response message, which is simply indicated by another arrow with a broken line in FIG. 11, and notifies the RN 6*a* of the response message. After that, the AGW 3 executes processes that are performed within the core network 1 regarding the location registration process and performs, for example, a process to authenticate the UE that has made the location registration request and a process to register information indicating that the UE is located in the location registration area notified in the location registration request.

Through the context ID generating and exchanging processes performed at steps S3 and S4 described above, each of the base stations has generated a context ID mapping table therein.

FIG. 13 is a drawing showing the context ID mapping table of the UN 6*b*. The context ID mapping table stores therein, for each of IDs of different UEs, a corresponding relationship between the context IDs used by the nodes related to the control exercised over the UE and the UE context ID used in the node UN 6*b* itself. In the example shown in FIG. 13, areas indicated as "UE context information" are the areas each storing therein an ID used for identifying a context when a wireless connection control is exercised in the node itself and information about, for example, the wireless access capability of the UE. Areas indicated as "core node context information" are the areas storing therein the corresponding relationship between the context ID for the UE used by the core node (i.e., the RN 6*a*) and the context ID assigned by the UN 6*b*. Thus, the context ID "u" on the UN 6*b* side that has been transmitted at step S3 and the context ID "r1" on the RN 6*a* side that has been obtained from the response message transmitted in response to the location registration request message at step S3 are stored. The core node's node ID in the information is used to determine the context ID on the core node side uniquely in the case where there is a plurality of candidates that is accessible as core nodes. Also, the node ID is used to obtain the IP address and the destination port of the core node to be accessed from the path table (see FIG. 12). In the present example, it is assumed that the core node's node ID is known. Further, other pieces of information in the table such as "node's own data path", "core node's data path", and "adjacent node context information" are not used during the location registration process. Thus, the explanation thereof is omitted for now.

FIG. 14 is a drawing showing a context ID mapping table stored in the RN 6*a*. According to interface types, the records in the context ID mapping table of the RN 6*a* are divided into two parts that are namely first sub-records and second sub-records. The first sub-records and the second sub-records have the same structure as each other and each include a node #1 context information section and a node #2 context information section. The node #1 context information section of the first sub-records is an area storing therein a corresponding relationship between the context IDs used by the RN and the UN. This area has the same contents as the core node context information section within the context ID mapping table of the UN. It should be noted, however, that the node ID of the UN used for identifying the target UN out of the plurality of UNs is stored as the node #1's node ID. The node #2 context information section of the first sub-records is an area storing therein a corresponding relationship between the context IDs used by the RN 6*a* and the AGW3. In the present example, in the node #2 context information section, the context ID on the RN 6*a* side is stored as the node's own context ID, whereas the node ID of the AGW 3 and the context ID on the AGW 3 side are stored as the node #2's node ID and the node #2's context ID, respectively. Also, the node ID of the AGW 3 serving as the core node is stored as the node #2's node ID in the node #2 context information section. Like the core node's node ID shown in the context ID mapping table of the UN, the node #2's node ID is used when the context ID used by the core node should be determined uniquely in the case where there is a plurality of core node candidates that is accessible from the RN 6*a* and when the IP address and the destination port of the core node to be accessed are obtained from the path table (see FIG. 4). The other parts of the context ID mapping table of the RN 6*a* are not used during the location registration process. Thus, the explanation thereof is omitted for now.

After that, by using the context ID mapping table (see FIG. 14), the RN 6*a* relays a signaling message between the AGW 3 and the UN 6*b* in the manner described below.

(C-I) A Signaling Message from the AGW 3 to the UN 6*b*

(a) The AGW 3 transmits a signaling message by using the node ID "n1" of the VBS 6 (i.e., the RN 6*a*) that has been obtained at step S4 and the context ID "r2" used for identifying the context of the UE within the RN 6*a*. By searching for the node ID "n1" in the path table (see FIG. 2), the AGW 3 designates Ic, d, n1 and Pc, d, n1 as the destination IP address and the destination port of the signaling message, respectively.

(b) The signaling message that has been transmitted at step (a) described above is received by the RN 6*a*. The RN 6*a* extracts the destination context ID "r2" from the signaling message and searches for a record in which the node's own context ID is listed as "r2" from the node #2 context information section of the first sub-records within the context ID mapping table (see FIG. 14). After that, the RN 6*a* extracts the node #1's node ID shown in the node #1 context information section of the first sub-record in the record that has been found in the search. Further, based on the node #1's context ID, the RN 6*a* extracts the node ID "n2" of the node to which the signaling message is to be transferred (i.e., the UN 6*b*) and the context ID "u" that is used within the UN 6*b*. Subsequently, the RN 6*a* rewrites the node's own context ID "r2" that has been set as the destination context ID of the signaling message with the context ID "u" that is used within the forwarding destination node of the signaling message (i.e., within the UN 6*b*) and transmits the signaling message to the IP address and the destination port for the UN 6*b*. The RN 6*a* conducts a search in the path table (see FIG. 4) by using the node ID "n2" of the UN 6*b* that has been extracted from the context ID mapping table and designates Iv, d, n2 and Pv, d, n2 as the destination IP address and the destination port, respectively.

(c) The UN 6*b* Receives the Signaling Message from the AGW 3.

(C-II) A Signaling Message from the UN 6*b* to the AGW 3

(a) The UN 6*b* transmits a signaling message by using the node ID "n1" of the RN 6*a* that has been obtained at step S3 and the context ID "r1" used for identifying the context of the UE within the RN 6*a*. By searching for the node ID "n1" in the path table (see FIG. 12), the UN 6*b* designates Iv, d, n1 and Pv, d, n1 as the destination IP address and the destination port of the signaling message, respectively.

(b) The signaling message that has been transmitted at step (a) described above is received by the RN 6*a*. The RN 6*a* extracts the destination context ID "r1" from the signaling message and searches for a record in which the node's own context ID is listed as "r1" from the node #1 context information section of the first sub-records within the context ID mapping table (see FIG. 14). After that, the RN 6*a* extracts the node #2's node ID shown in the node #2 context information section of the first sub-record in the record that has been found in the search. Further, based on the node #1's context ID, the RN 6*a* extracts the node ID "n3" of the node to which the signaling message is to be transferred (i.e., the AGW 3) and the context ID "a" that is used within the AGW 3. Subsequently, the RN 6*a* rewrites the node's own context ID "r1" that has been set as the destination context ID of the signaling message with the context ID "a" that is used within the forwarding destination node of the signaling message (i.e., within the AGW 3) and transmits the signaling message to the IP address and the destination port for the AGW 3. The RN 6*a* conducts a search in the path table (see FIG. 4) by using the node ID "n3" of the AGW 3 that has been extracted from the context ID mapping table and designates Ic, d, n3 and Pc, d, n3 as the destination IP address and the destination port, respectively.

(c) The AGW 3 Receives the Signaling Message from the UN 6*b*.

The AGW 3 receives the location registration request in the process at step S4 and, when a location registration operation has been completed within the core network 1, the AGW 3 transmits a location registration response to the RN 6*a* (step S5). The response message is transferred by the RN 6*a* to the UN 6*b* according to the procedure described in (C-I) above (step S6).

When the UN 6*b* has received the location registration response message from the RN 6*a*, the UN 6*b* searches for a record in which the node's own context ID is listed as "u" from the core node context information section within the context ID mapping table (see FIG. 13) and identifies the UE context used within the UN 6*b* itself. Based on the UE context, the UN 6*b* obtains a parameter such as a channel used in the wireless communication and transmits a location registration response to the UE (step S7).

After the location registration process has been completed, the wireless connection is released. Because the UE shifts to a stand-by state again, the records that have been registered under the UE ID "u1" in FIGS. 13 and 14 are deleted when the wireless connection is released. In the description above, the example in which the context IDs embedded in the signaling messages are used to identify the contexts is explained. However, as a context identifying method, it is also acceptable to use a destination port that is different for each of the users, in each individual control message. In that situation, the destination ports are managed in the context ID mapping tables shown in FIGS. 13 and 14, instead of the context IDs.

<Outgoing Communication>

Figure 15:
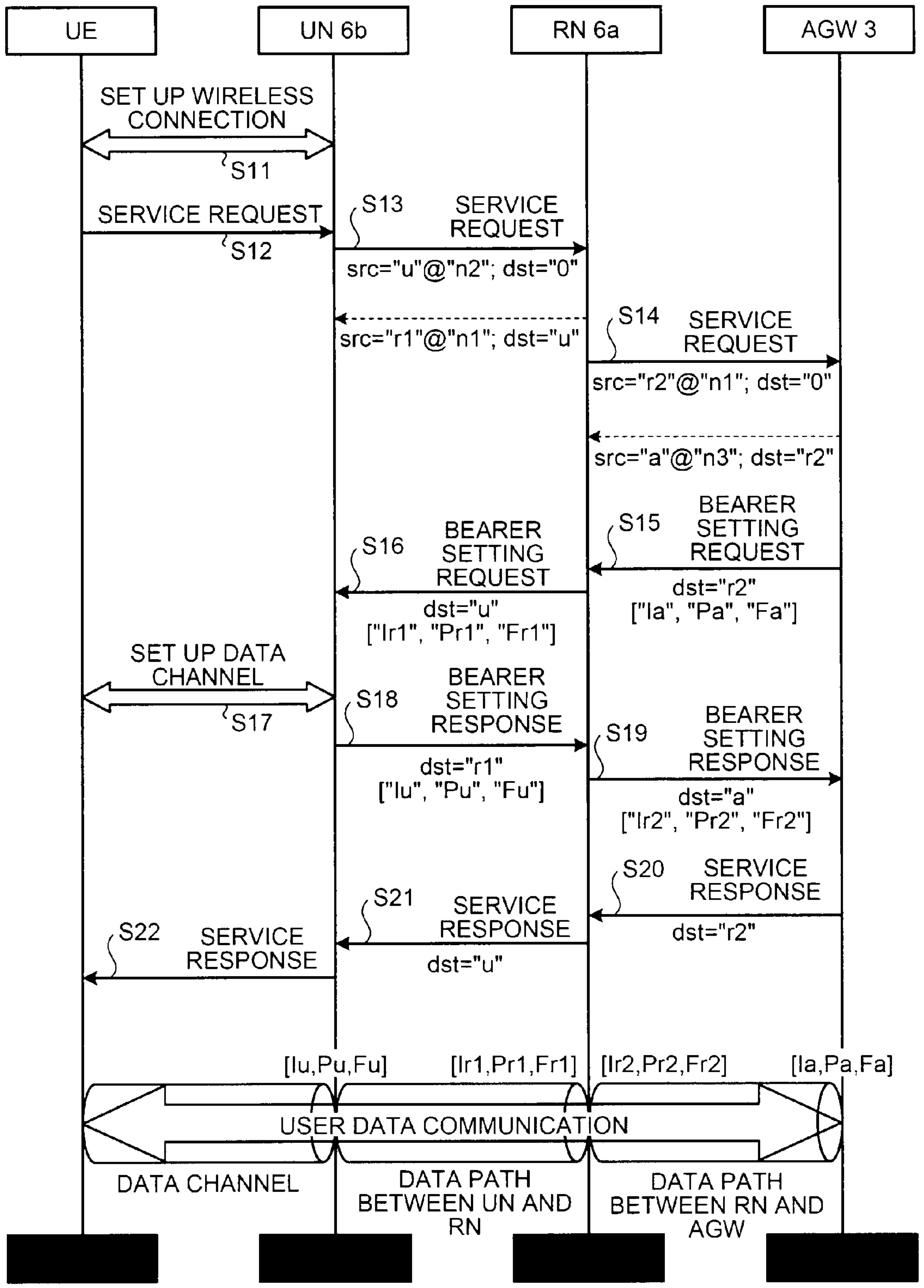
FIG. 15 is a diagram showing an example of a simplified operational sequence that is used when a UE starts voice communication or data communication from a cell that is subordinate to a UN.

FIG. 15 is a diagram showing a simplified operational sequence that is used when the UE starts voice communication or data communication from a cell that is subordinate to the UN 6*b*. The outgoing communication sequence is different from the location registration sequence in that it is necessary to set a wireless channel used for the voice communication or the data communication and to set a data path in the wireless access network 2. Also, the outgoing communication sequence is different in that a service request message, instead of a location registration request, is transmitted for the purpose of requesting an outgoing communication service; however, because the service request is also an individual control message, the operations (e.g., notifying the context IDs) that are performed by the RN 6*a* and the UN 6*b* when transmitting the signaling messages are the same as the operations in the location registration sequence.

The operations performed at steps S11 through S14 shown in FIG. 15 is the same as the operation at steps S1 through S4 in the location registration sequence. It is assumed that, when the operation at step S4 has been completed, the context ID mapping tables have been generated in the UN 6*b* (as shown in FIG. 13) and in the RN 6*a* (as shown in FIG. 14), respectively.

When the AGW 3 has received the service request at step S14, the AGW 3 transmits, after taking a predetermined procedure such as an authentication process, a bearer setting request message to the RN 6*a* for the purpose of setting a wireless channel and setting a data path in the wireless access network (step S15). In the bearer setting request message, the AGW 3 designates "r2" as the destination context ID of the signaling message, for the purpose of designating the context that corresponds to the UE ID "u1" for the RN 6*a*. Also, the signaling message contains an IP address Ia and a destination port Pa at which the AGW 3 receives user data (i.e., voice data or data packets, both of which are encapsulated in IP packets) as well as a data flow identifier Fa used in an encapsulating process, with regard to the data path that is used when the user data is transmitted and received between the RN 6*a* and the AGW 3. The RN 6*a* stores these pieces of information as a node #2's data path shown in the node #2 context information section of the first sub-record within the context ID mapping table (see FIG. 16) and references these pieces of information as destination information when transmitting the user data received from the UN 6*b* to the AGW 3. In the following sections, a set made up of an IP address "Ix", a destination port "Px", and a data flow identifier "Fx" that are included in the destination information with regard to a data path will be expressed as [Ix, Px, Fx] and will be referred to as data path information.

Subsequently, by referring to the context ID mapping table (see FIG. 16), the RN 6*a* specifies the UN (identified with the node ID "n2") to which the message is to be transferred by using the context ID "r2" that has been set in the bearer setting request message received from the AGW 3 as a key and obtains the destination IP address and the destination port for the message. In the bearer setting request message to be transmitted, the RN 6*a* designates "u" as the destination context ID, rewrites the data path information used when the RN 6*a* receives the user data from the UN 6*b* with [Ir1, Pr1, Fr1], and transmits the bearer setting request message to the UN 6*b* (step S16).

In addition, the RN 6*a* stores the transmitted data path information as a node's own data path in the node #1 context information of the first sub-record within the context ID mapping table (see FIG. 16).

Like the RN 6*a*, the UN 6*b* stores the received information as a core node's data path in the core node context information within the context ID mapping table (see FIG. 17) and references the stored information as the destination when transmitting the user data received from the UE to the RN 6*a*. Also, by referring to the table and using the context ID "u" that has been set in the bearer setting request message received from the RN 6*a* as a key, the UN 6*b* specifies the UE context for which a wireless data transmission channel is to be set up. The specified UE context contains information such as a data transmission rate. After checking to see if it is possible to provide a user data communication at the requested speed and with the requested quality, the UN 6*b* sets up a wireless channel between the UN 6*b* and the UE (step S17).

After the wireless data transmission channel has been established between the UE and the UN 6*b*, the UN 6*b* transmits a bearer setting response message to the RN 6*a* (step S18). By referring to the context ID mapping table (see FIG. 17), the UN 6*b* sets the context ID "r1" of the UN that corresponds to the UE ID "u1" into the bearer setting response message to be transmitted. Further, the UN 6*b* assigns and sets data path information [Iu, Pu, Fu] that is used when the UN 6*b* receives the user data from the RN 6*a* and stores the assigned information as a node's own data path in the core node context information within the context ID mapping table (see FIG. 17).

When having received the bearer setting response message, the RN 6*a* stores those pieces of information as a node #1's data path in the node #1 context information section of the first sub-record within the context ID mapping table (see FIG. 16) and references the stored information as the destination when transmitting the user data received from the AGW 3 to the UN 6*b*.

After having received the bearer setting response message from the UN 6*b*, the RN 6*a* refers to the context ID mapping table (see FIG. 16) and rewrites the destination context ID contained in the message with the node #2's context ID "a" that corresponds to the context ID "r1" of its own. Further, the RN 6*a* sets data path information [Ir2, Pr2, Fr2] that is used for receiving the user data from the AGW 3 and transmits the bearer setting response message to the AGW 3 (step S19). At the same time, the RN 6*a* stores the transmitted data path information as a node's own data path in the node #2 context information section of the first sub-record within the context ID mapping table (see FIG. 16).

The AGW 3 stores the data path information therein and uses the data path information as the destination when the AGW 3 transmits the user data to the RN 6*a*. After the data path for transmitting and receiving the user data has been established, the AGW 3, the RN 6*a*, and the UN 6*b* perform operations at steps S20 through S22. The operations performed at steps S20 through S22 are the same as the operations performed at steps S5 through S7 in the location registration sequence shown in FIG. 11.

After the outgoing communication sequence described above has been performed, the RN 6*a* relays the user data between the AGW 3 and the UN 6*b* in the manner described below, by using the context ID mapping table (see FIG. 16).

(C-III) The User Data from the AGW 3 to the UN 6*b*

(a) The user data to be delivered from the AGW 3 to the UN 6*b* is transmitted by using the data path [Ir2, Pr2, Fr2] as the destination.

(b) The user data that has been transmitted at step (a) is received by the RN 6*a*. The RN 6*a* extracts the destination data path information from the received user data and searches for a record in which the node's own data path is listed as [Ir2, Pr2, Fr2] in the node #2 context information section of the first sub-records within the context ID mapping table (see FIG. 16). The RN 6*a* then extracts the node #1's data path [Iu, Pu, Fu] shown in the node #1 context information section of the first sub-record in the record that has been found in the search and transfers the user data while setting the extracted information as the forwarding destination data path information for the received user data.

(c) The UN 6*b* Receives the User Data from the AGW 3.

(C-IV) The User Data from the UN 6*b* to the AGW 3

(a) User data that has been received from the UE is transmitted from the UN 6*b* by using the data path [Ir1, Pr1, Fr1] as the destination.

(b) The user data that has been transmitted at step (a) is received by the RN 6*a*. The RN 6*a* extracts the destination data path information from the received user data and searches for a record in which the node's own data path is listed as [Ir1, Pr1, Fr1] from the node #1 context information section of the first sub-records within the context ID mapping table (see FIG. 16). The RN 6*a* then extracts the node #2's data path [Ia, Pa, Fa] shown in the node #2 context information section of the first sub-record in the record that has been found in the search and transfers the user data while setting the extracted information as the forwarding destination data path information for the received message.

(c) The AGW 3 Receives the User Data from the UN 6*b*.

After the user data communication has been completed, the wireless connection is released. When the UE has shifted to a stand-by state again, the records that correspond to the UE ID "u1" in the context ID mapping tables shown in FIGS. 16 and 17 are deleted.

In the explanation above, the user data for each UE is identified by using the set made up of the IP address, the destination port, and the data flow identifier used in the IP packet encapsulating process. However, in the case where user data is identified by using only an IP address and a data flow identifier that has been set in a header portion of capsule data while the destination port is fixed, like in the General Packet Radio Service [GPRS] Tunneling Protocol (GTP) defined in the "GPRS; GPRS Tunneling Protocol (GTP) across the Gn an Gp interface" described in the "3GPP TS 29.060", it is not necessary to store the destination ports in the context ID mapping tables.

Also, in the case where the user data for only one UE is encapsulated and transmitted to and received at each IP address/destination port, there is no need to identify the data flow in the capsule data. Thus, there is no need to store the data flow identifiers in the context ID mapping tables. Further, when the RN 6*a* provides the function to relay the signaling messages and the user data between the AGW 3 and the UN 6*b*, the context IDs and the pieces of data path information that are individually supplied to the AGW 3 and to the UN 6*b* for the relay purposes may be the same as one another. In other words, r1=r2; Ir1=Ir2; Pr1=Pr2; and Fr1=Fr2 may be satisfied. Furthermore, as for the user data, it is acceptable to configure such that the user data to be directly transmitted and received between the AGW 3 and the UN 6*b* by having an arrangement in which Ir1=Iu; Pr1=Pu; Fr1=Fu; Ir2=Ia; Pr2=Pa; and Fr2=Fa are satisfied.

<Incoming Communication>

Figure 18:
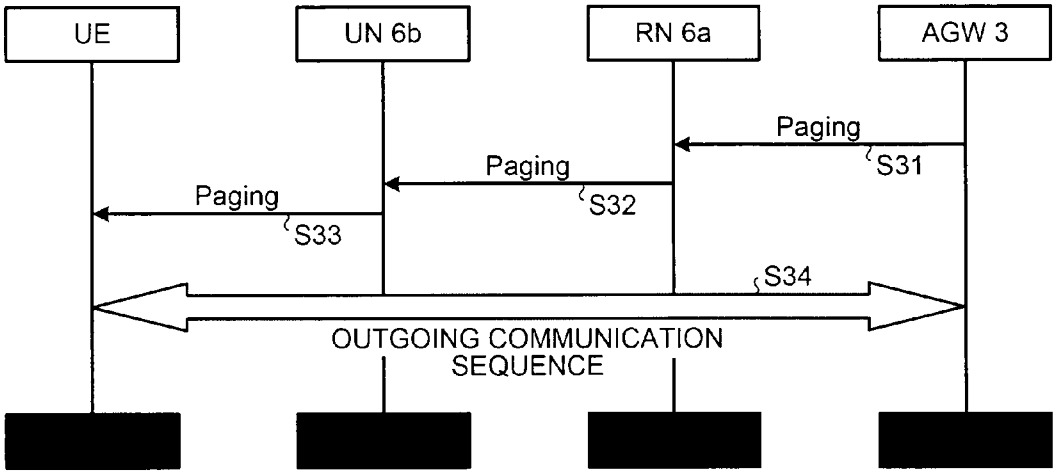
FIG. 18 is a diagram showing an example of a simplified operational sequence that is performed by a UE located in a cell subordinate to a UN, for receiving an incoming communication of voice communication or data communication.

FIG. 18 is a diagram showing a simplified operational sequence that is used by the UE located in a cell subordinate to the UN 6*b*, for receiving an incoming communication of voice communication or data communication.

The AGW 3 obtains the location registration area in which the UE for which a voice communication request or a data communication request has been received is located, from a server provided within the core network 1 and transmits a paging message to each of all the base stations that are in charge of the cells to which the obtained location registration area is assigned (step S31). The relationships between the location registration areas and the base stations to which paging messages are transmitted are managed in the location registration area table shown in FIG. 9. Each of the paging messages contains a location area ID and a UE ID that are paged; however, because the control is not exercised over a specific UE context within a specific base station, the paging message is classified as a common control message.

FIG. 10 is a location registration area table managed by the RN 6*a*. The location area ID "RA 1" is the location area ID that has been assigned to the cell of which the UN 6*b* identified with the node ID "n2" is in charge. The location area ID "RA 2" is the location area ID that has been assigned to the cell of which the UN 6*c* identified with the node ID "n4" is in charge. In this situation, in the case where, for example, the location area ID "RA 1" and the called UE ID "u1" have been set in the paging message received by the RN 6*a* at step S31 described above, the RN 6*a* conducts a search in the location registration area table shown in FIG. 10 by using the location area ID "RA 1" that has been set in the received paging message as a key and obtains the ID "n2" of the node to which the paging message is to be transferred. After that, the RN 6a conducts a search in the path table (see FIG. 4) for the purpose of obtaining the destination IP address and the destination port that are used for transmitting the paging message to the node identified with the node ID "n2". As a result of the search, the RN 6a obtains an IP address Iv, c, n2 and a destination port Pv, c, n2 to which the common control message is to be transmitted. Thus, the RN 6a transfers the paging message that has been received from the AGW 3 to the IP address and the destination port that have been obtained (step S32).

When having received the paging message from the RN 6a, the UN 6b performs a normal paging process and pages the UE in the cells to which the location area ID designated in the paging message has been assigned (step S33). The location registration area is defined corresponding on the plurality of cells, and the paged UE may not be necessarily located in one of the cells on which the paging process has been performed; however, in the case where the paged UE is located in one of the cells, a sequence that is similar to the sequence in the outgoing communication is performed (step S34).

<Handovers>

Figure 19:
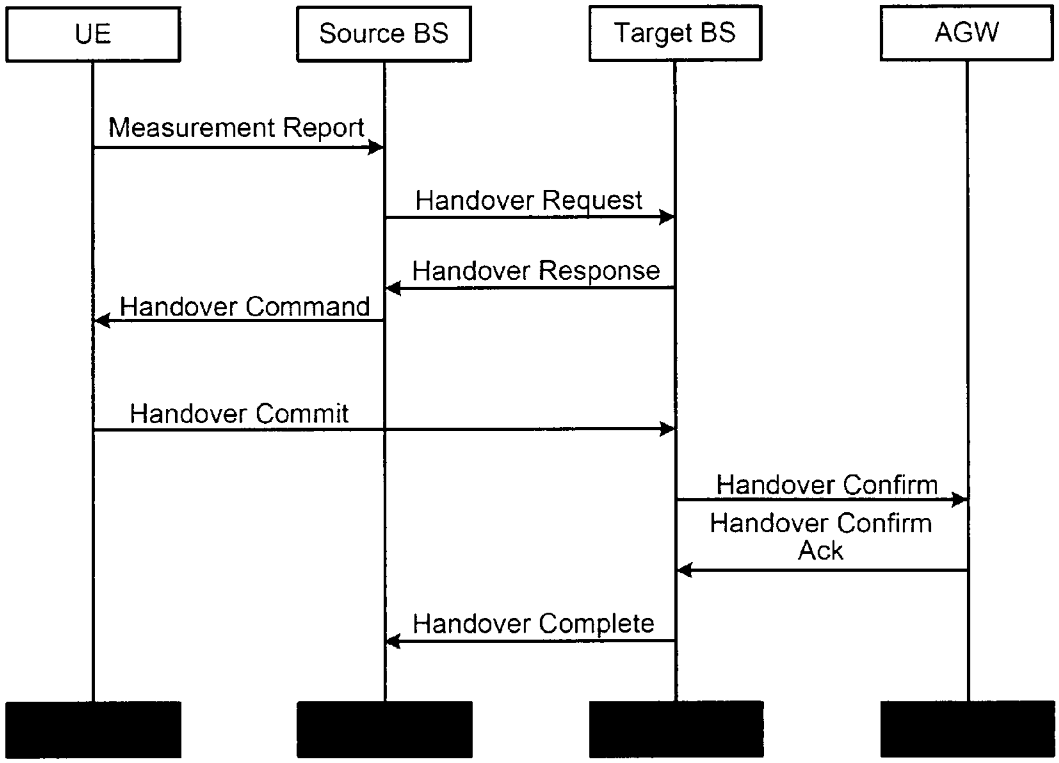
FIG. 19 is a diagram showing an example of an operational sequence that is performed when a handover is performed according to the first embodiment.

FIG. 19 is a diagram showing an operational sequence that is used when a handover is performed according to the first embodiment. A Source Base Station (BS) is a base station to which a UE has been connected before a handover is performed. A Target BS is a handover target base station. In the following sections, three situations such as a handover between the UNs within the VBS 6, a handover from the VBS 6 to the NBS 5, and a handover from the NBS 5 to the VBS 6 will be explained in detail.

(1) Handover Between the UNs within the VBS 6

In the following sections, operations performed by the VBS 6 when a handover from the UN 6b to the UN 6c is performed will be explained in detail, with reference to FIGS. 20 to 24.

Figure 20:
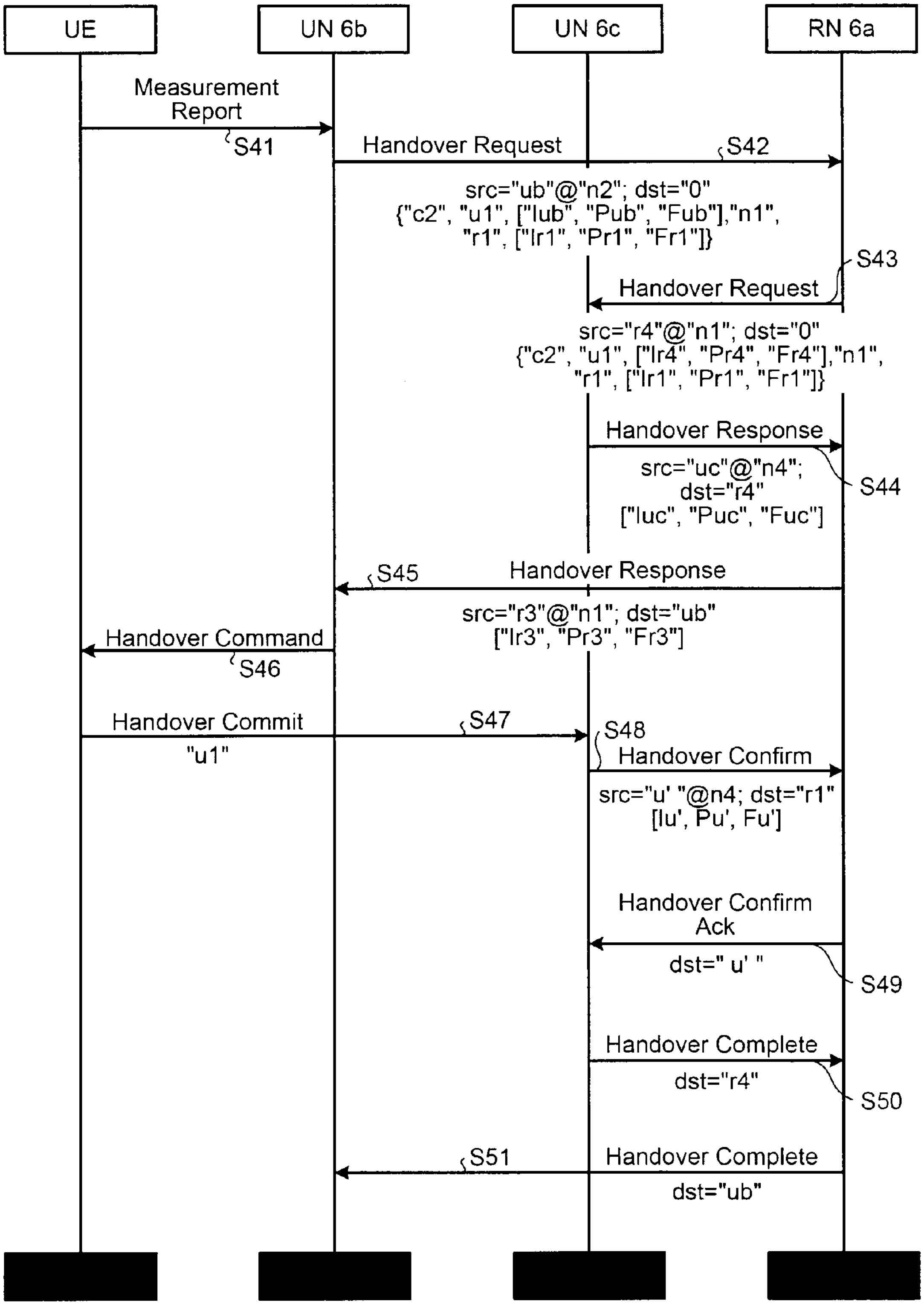
FIG. 20 is a diagram showing an example of an operational sequence that is used when a handover is performed between UNs within a Virtual Base Station (VBS).

FIG. 20 is a diagram showing an operational sequence that is used when a handover is performed between the UNs within the VBS 6. The handover source base station is the UN 6b, whereas the handover target base station is the UN 6c. Also, it is assumed that the UE is currently performing communication while being subordinate to the UN 6b and that the UN 6b and the RN 6a have performed the outgoing communication sequence and the context ID mapping tables have been generated therein as shown in FIGS. 17 and 16, respectively.

When the communication quality of the cell of which the UN 6b is in charge has degraded, the UE searches for a neighboring cell and notifies the UN 6b of the ID of a cell that has good communication quality and can be a handover candidate as well as a measured result of the communication quality thereof as measurement information (indicated as a "Measurement Report") (step S41). Based on the measured result that has been received, the UN 6b first selects the cell (identified with the cell ID "c2") of which the UN 6c is in charge as the handover target. Subsequently, the UN 6b determines the IP address and the destination port of the base station to which a handover request is to be transmitted, based on the ID "c2" of the handover target cell contained in the measured result; however, the UN 6b has only the information about the cell of its own in the cell ID/node ID mapping table (see FIG. 7). Thus, the UN 6b presumes that the handover target cell is subordinate to another core node and determines an IP address and a destination port to be used as a handover request destination at the RN 6a, which serves as a core node for the UN 6b. The handover request is related to control exercised over a specific UE context and is therefore classified as an individual control message. Consequently, the UN 6b obtains the IP address Iv, d, n1 and the destination port Pv, d, n1 that are to be used as the destination of the individual control message for the RN 6a, out of the path table (see FIG. 12).

Subsequently, the UN 6b assigns the context ID and the data path information on the UN 6b side that are required by the handover target base station when signaling messages are exchanged between the UN 6b and the handover target base station during the handover process or when the UN 6b transfers the user data received from the core node (i.e., the RN 6a) to the handover target base station. The UN 6b then stores these pieces of information therein as adjacent node context information within the context ID mapping table. As shown in FIG. 21, these pieces of information are stored as a node's own context ID and a node's own data path in the adjacent node context information within the context ID mapping table.

After that, the UN 6b stores the handover target cell ID "c2", the context ID "ub" of its own, the node ID "n2" of its own, and the data path information [Iub, Pub, Fub] for the handover target base station, as well as the node ID "n1", the context ID "r1", and the data path information [Ir1, Pr1, Fr1] of the core node RN 6a into a handover request message (indicated as a "Hanover Request"), and transmits the handover request message to the IP address and the destination port at the RN 6a that have been determined as described above (step S42).

When having received the handover request message at step S42 described above, the RN 6a first determines the handover target base station to which the message is to be transferred based on the ID "c2" of the handover target cell contained in the handover request message that has been received. The RN 6a refers to the cell ID/node ID mapping table (see FIG. 6). According to the table, the handover target cell "c2" is the cell of the node ID "n4". Thus, the RN 6a further refers to the path table (see FIG. 4) and determines the IP address Iv, d, n4 and the destination port Pv, d, n4 as the destination of the handover request message.

After that, as shown in FIG. 22, the RN 6a stores the node ID "n2", the context ID "ub", and the data path information [Iub, Pub, Fub] of the handover source base station that are contained in the handover request message, as a node #1's node ID, a node #1's context ID, and a node #1's data path, respectively, in the node #1 context information of the second sub-record within the context ID mapping table stored therein. Similarly, the RN 6a stores the node ID "n4" as a node #2's node ID in the node #2 context information of the second sub-record within the same table, as the node ID of the handover target base station. The RN 6a specifies the entries into which these pieces of information are stored by using the UE ID stored in the handover request message that has been received.

For the purpose of operating as a relay point for the signaling messages and the user data that are transmitted and received between the UN 6b and the UN 6c, the RN 6a supplies a context ID "r3" and data path information [Ir3, Pr3, Fr3] to the UN 6b and stores the context ID and the data path information as a node's own context ID and a node's own data path in the node #1 context information section of the second sub-record within the context ID mapping table, respectively. Similarly, the RN 6a supplies a context ID "r4" and data path information [Ir4, Pr4, Fr4] to the UN 6c and stores the context ID and the data path information as a node's own context ID and a node's own data path in the node #1 context information section of the second sub-record within the context ID mapping table (see FIG. 22), respectively. Further, the RN 6*a* rewrites the node ID "n2", the context ID "ub", and the data path information [Iub, Pub, Fub] of the UN 6*b* that are contained in the received handover request message with the node ID "n1" of its own as well as the context ID "r4" and the data path information [Ir4, Pr4, Fr4] that have been supplied to the UN 6*c* and transmits the handover request message to the destination IP address and the destination port of the UN 6*c* (step S43).

When having received the handover request message from the RN 6*a* at step S43 described above, the handover target base station UN 6*c* extracts the node ID "n1", the context ID "r4", and the data path information [Ir4, Pr4, Fr4] of the handover source base station out of the message and stores the extracted information as an adjacent node's node ID, an adjacent node's context ID, and an adjacent node's data path, respectively, in the adjacent node context information within the context ID mapping table. The entry into which these parameters are stored is determined based on the UE ID "u1" that has been set in the received handover request message, as described above.

Further, the UN 6*c* extracts the node ID "n1", the context ID "r1", and the data path information [Ir1, Pr1, Fr1] of the core node from the handover request message and stores the extracted information as a core node's node ID, a core node's context ID, and a core node's data path, respectively, in the core node context information within the context ID mapping table.

Subsequently, the UN 6*c* supplies a context ID "uc" and data path information [Iuc, Puc, Fuc] that are used when the UN 6*c* exchanges signaling messages with the handover source base station during the handover process and receives transfer data from the handover source base station. The UN 6*c* then stores the supplied parameters as a node's own context ID and a node's own data path in the adjacent node context information within the context ID mapping table. Similarly, the UN 6*c* supplies a context ID "u'" and data path information [Iu', Pu', Fu'] to the core node for the purpose of transmitting and receiving signaling messages and user data after the handover process has been completed. The UN 6*c* then stores the context ID and the data path information as a node's own context ID and a node's own data path in the core node context information.

FIG. 23 is a drawing showing the context ID mapping table of the UN 6*c* after the parameters extracted from the received handover request message and the parameters supplied by the UN 6*c* have been set therein.

When the update of the context ID mapping table has been completed, the UN 6*c* generates a handover response message (indicated as a "Handover Response"). In this situation, the UN 6*c* sets the node's own context ID "uc" shown in the adjacent node context information stored in the context ID mapping table as the source context ID and sets the adjacent node's context ID "r4" shown in the adjacent node context information as the destination context ID. After that, the UN 6*c* sets the node's own data path [Iuc, Puc, Fuc] shown in the adjacent node context information into the handover response message and transmits the generated handover response message to the node identified with the node ID "n1". In this situation, the UN 6*c* obtains the destination IP address Iv, d, n1 and the destination port Pv, d, n1 for individual control messages corresponding to the node ID "n1" out of the path table (see FIG. 12) and transmits the handover response message that has been generated as described above to the RN 6*a* (step S44).

When the RN 6*a*, which is operating as the core node for the handover target base station UN 6*c*, has received the handover response message from the UN 6*c* at step S44 described above, the RN 6*a* extracts the context ID "uc" and the data path information [Iuc, Puc, Fuc] of the UN 6*c* out of the received message and stores the extracted information into the context ID mapping table stored therein. The positions of the entries in the table into which the extracted pieces of information are stored are in the node #2 context information section of the second sub-record that is used when the handover source base station and the handover target base station exchange signaling messages. More specifically, the positions of the entries are the node #2's context ID and the node #2's data path in the node #2 context information section of the second sub-record in the record in which the node's own context ID matches the destination context ID "r4" contained in the handover response message.

After that, the RN 6*a* obtains the node's own context ID "r3" and the node #1's context ID "ub" out of the node #1 context information section of the second sub-record within the matching record that has been found in the search above. The RN 6*a* then rewrites the source context ID "uc" and the destination context ID "r4" contained in the received handover response message with the obtained pieces of information, respectively. Further, the RN 6*a* rewrites the data path information [Iuc, Puc, Fuc] on the UN 6*c* side contained in the handover response message with the data path information [Ir3, Pr3, Fr3] on the RN 6*a* side that has been stored as the node's own data path in the node #1 context information section of the second sub-record. Subsequently, after rewriting the destination IP address and the destination port with the destination IP address Iv, d, n2 and the destination port Pv, d, n2 corresponding to individual control messages for the UN 6*b*, which is identified with the node #1's node ID "n2", the RN 6*a* transmits the handover response message (step S45).

When having received the handover response message from the RN 6*a* at step S45 described above, the handover source base station UN 6*b* extracts the node ID "n1", the context ID "r3", and the data path information [Ir3, Pr3, Fr3] of the RN 6*a* out of the message and stores the extracted information into the context ID mapping table stored therein. The positions of the entries in the table into which the extracted pieces of information are stored are the adjacent node's node ID, the adjacent node's context ID, and the adjacent node's data path in the record in which the node's own context ID in the adjacent node context information section matches the destination context ID "ub" contained in the handover response message. FIG. 21 is a drawing showing the context ID mapping table of the UN 6*b* after the parameters extracted from the received handover response message and the parameters stored when the handover request was transmitted at step S42 described above have been set therein.

According to the context ID mapping tables that have been generated through the procedures performed at steps S42 through S45 described above, the handover source base station UN 6*b* and the handover target base station UN 6*c* transmit and receive signaling messages and transfer user data as described below during the handover process.

(R-I) Signaling from the UN 6*b* to the UN 6*c*.

(a) The UN 6*b* searches for the node ID "n1" and the context ID "r3" of the node designated as the destination of the signaling message, in the adjacent node context information in the context ID mapping table (see FIG. 21) of the UN 6*b*. Further, the UN 6*b* searches for the IP address Iv, d, n1 and the destination port Pv, d, n1 designated as the destination node out of the path table (see FIG. 12), sets a destination context ID "r3", and transmits the signaling message to the IP address and the destination port.

(b) The signaling message that has been transmitted at step (a) is received by the RN 6*a*. The RN 6*a* searches for a record in which the node's own context ID is listed as "r3" in the node #1 context information section of the second sub-records within the context ID mapping table (see FIG. 22). The RN 6*a* then extracts the node #2's node ID "n4" and the node #2's context ID "uc" from the node #2 context information section of the second sub-record in the record that has been found in the search. Further, the RN 6*a* searches for a node for which the node ID of the destination node is listed as "n4" out of the path table (see FIG. 4) and obtains the IP address Iv, d, n4 and the destination port Pv, d, n4 that are used as the forwarding destination for the received signaling message. Lastly, the RN 6*a* rewrites the destination context ID in the received signaling message with "uc" and transmits the signaling message to the IP address and the destination port.

(c) The UN 6*c* Receives the Signaling Message from the UN 6*b*.

(R-II) Signaling from the UN 6*c* to the UN 6*b*

(a) The UN 6*c* searches for the node ID "n1" and the context ID "r4" of the node designated as the destination of the signaling message and, in the adjacent node context information within the context ID mapping table of the UN 6*c* (see FIG. 23). Further, the UN 6*c* searches for the IP address Iv, d, n1 and the destination port Pv, d, n1 designated as the destination node out of the path table (see FIG. 12), sets a destination context ID "r4", and transmits the signaling message to the IP address and the destination port.

(b) The signaling message that has been transmitted at step (a) is received by the RN 6*a*. The RN 6*a* searches for a record in which the node's own context ID is listed as "r4" in the node #2 context information section of the second sub-records within the context ID mapping table (see FIG. 22). The RN 6*a* then extracts the node #1's node ID "n2" and the node #1's context ID "ub" from the node #1 context information section of the second sub-record in the record that has been found in the search. Further, the RN 6*a* searches for a node for which the node ID of the destination node is listed as "n2" out of the path table (see FIG. 4) and obtains the IP address Iv, d, n2 and the destination port Pv, d, n2 that are used as the forwarding destination for the received signaling message. Lastly, the RN 6*a* rewrites the destination context ID in the received signaling message with "ub" and transmits the signaling message to the IP address and the destination port.

(c) The UN 6*b* Receives the Signaling Message from the UN 6*c*.

(R-III) User Data Transfer from the UN 6*b* to the UN 6*c*

When having received data to be delivered to the user that is currently performing a handover process from the RN 6*a* operating as the core node, the UN 6*b* transfers the received data to the UN 6*c*. The transfer process is done as described below.

(a) The UN 6*b* transmits the user data that has been received from the core node and is to be delivered to [Iu, Pu, Fu], to the data path [Ir3, Pr3, Fr3] that is listed as the adjacent node's data path in the adjacent node context information within the context ID mapping table (see FIG. 21).

(b) The RN 6*a* receives the user data and transfers the received user data to the data path [Iuc, Puc, Fuc] that is listed as the node #2's data path in the node #2 context information section of the second sub-record within the context ID mapping table (see FIG. 22).

(c) The UN 6*c* Receives the User Data from the RN 6*a*.

(R-IV) Data Transmitted from the UN 6*c* to the UN 6*b*

With respect to the transfer data that has been received from the UN 6*b*, the UN 6*c* transmits a flow control signal and a confirmation signal. These signals are transmitted to the UN 6*b* as described below.

(a) The UN 6*c* transmits the control signal to the data path [Ir4, Pr4, Fr4] that is listed as the adjacent node's data path in the adjacent node context information within the context ID mapping table (see FIG. 23).

(b) The RN 6*a* receives the data described above and transfers the received data to the data path [Iub, Pub, Fub] listed as the node #1's data path in the node #1 context information section of the second sub-record within the context ID mapping table (see FIG. 22).

(c) The UN 6*b* Receives the Control Signal from the RN 6*a*.

After the transfer path used for transferring the signaling messages and the user data during the handover process has been established between the handover source base station UN 6*b* and the handover target base station UN 6*c* as described above, the handover source base station UN 6*b* transmits a handover execution command, (indicated as a "Handover Command") to the UE (step S46).

When having received the handover execution command, the UE changes the connection target thereof from the UN 6*a* to the UN 6*c* and, after a wireless connection has been established, the UE notifies the UN 6*c* that the handover has been completed (indicated as a "Handover Commit") (step S47).

When having been notified by the UE that the handover has been completed at step S47 described above, the handover target base station UN 6*c* conducts a search in the context ID mapping table (see FIG. 23) by using the UE ID stored in the received notification or by using the UE ID that has indirectly been derived from a wireless resource being used such as a reception frequency or a slot. The UN 6*c* then extracts the core node's node ID "n1" and the core node's context ID "r1" from the core node context information in the record that has been found in the search. Further, the UN 6*c* obtains the IP address Iv, d, n1 and the destination port Pv, d, n1 out of the path table (see FIG. 12). Subsequently, the UN 6*c* sets a destination context ID "r1" as well as the node's own context ID "u'" and the node's own data path [Iu', Pu', Fu'] in the core node context information that have been found in the search into the message (indicated as a "Handover Confirm") that has been transmitted to notify that the UE had completed the handover. Then the UN 6*c* transmits the message to the IP address and the destination port described above (step S48).

When having received the handover completion notification with the UE at step S48 described above, the RN 6*a* extracts the node ID "n4", the context ID "u'", and the data path information [Iu', Pu', Fu'] of the handover target base station UN 6*c* out of the message. The RN 6*a* then rewrites the node #1's node ID, the node #1's context ID, and the node #1's data path that are listed in the node #1 context information section of the first sub-record within the context ID mapping table, with the extracted pieces of information, respectively. Further, the RN 6*a* deletes the entirety of the second sub-record. The record that is to be rewritten is specified by searching for the destination context "r1" stored in the message described above in the node's own context ID in the node #1 context information section of the first sub-records within the context ID mapping table. FIG. 24 is a drawing showing the context ID mapping table of the RN 6*a* after the handover has been completed.

After that, according to the new table, the RN 6*a* relays the signaling messages and the user data between the AGW 3 and the UN 6*c* according to the procedure described in (C-I) through (C-IV) above.

When the RN 6*a* has completed a process to update the context ID mapping table and a process to change the path used for transmitting the signaling messages and the user data, the RN 6*a* transmits a confirmation message (indicated as a "Handover Confirm Ack") to the UN 6*c* (step S49).

After the handover target base station UN 6*c* has received the confirmation message from the core node at step S49 described above, the UN 6*c* notifies the handover source base station that the handover has been completed (indicated as a "Handover Complete") (step S50). The notification message is relayed to the handover source base station UN 6*b* by the RN 6*a* serving as the relay point between the handover target base station UN 6*c* and the handover source base station UN 6*b* (step S51).

When having received the handover completion message at step S51 described above, the handover source base station UN 6*b* releases the wireless resource, the user data buffer, the ID, and the like that have been secured for the user being the target of the handover, deletes the relevant table entries, and thus completes the handover process.

During the handover process described above, the RN 6*a* provides the function to relay the signaling messages and the user data between the handover source base station UN 6*b* and the handover target base station UN 6*b*. In that situation, the context IDs and the pieces of data path information that are individually supplied to the UN 6*b* and to the UN 6*c* for the relay purposes may be the same as one another. In other words, r3=r4; Ir3=Ir4; Pr3=Pr4; and Fr3=Fr4 may be satisfied. Furthermore, as for the user data, it is acceptable to configure the data to be directly transferred between the UN 6*b* and the UN 6*c* by having an arrangement in which Ir3=Iuc; Pr3=Puc; Fr3=Fuc; Ir4=Iub; Pr4=Pub; and Fr4=Fub are satisfied.

(2) Handover from the VBS 6 to the NBS 5

Figure 25:
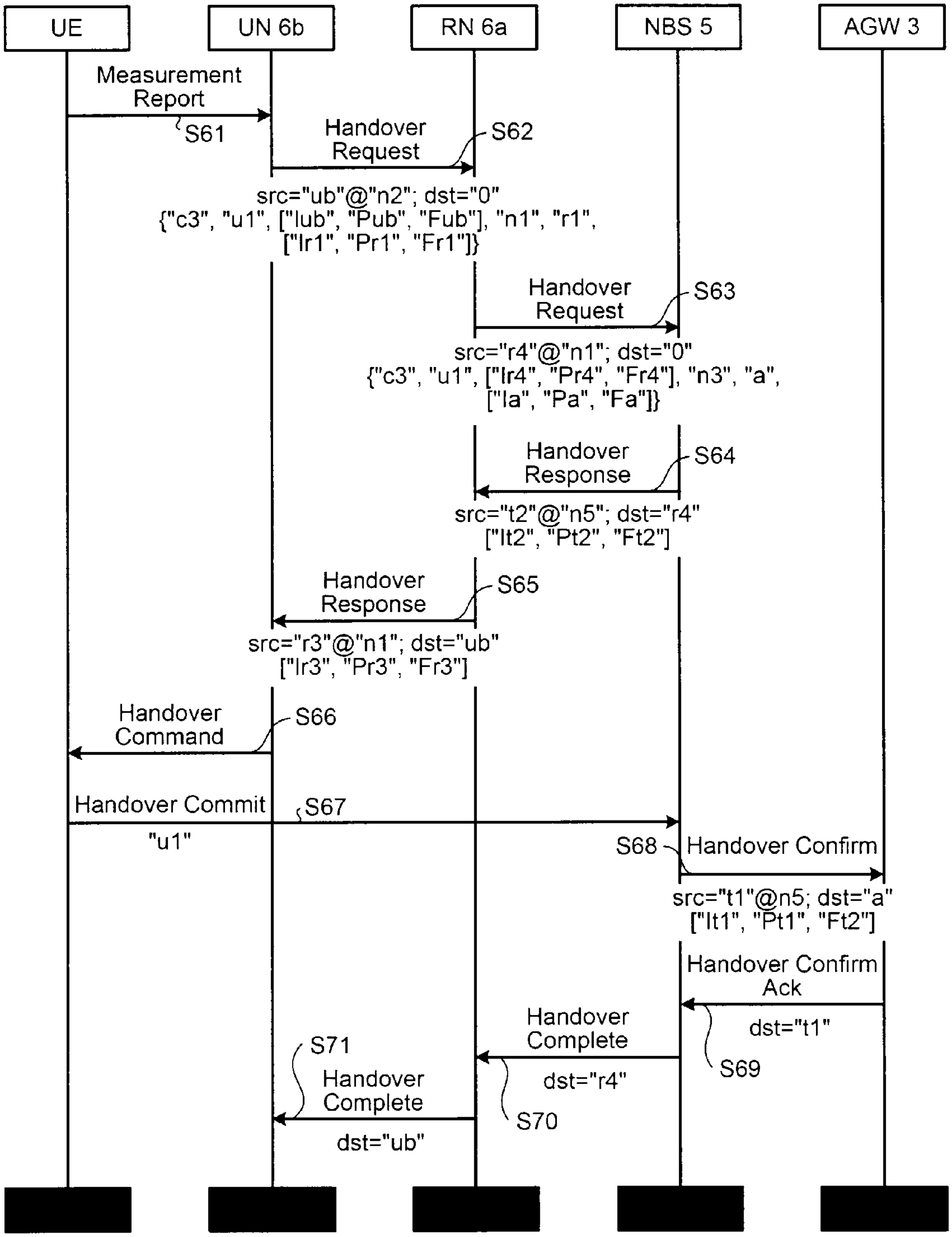
FIG. 25 is a diagram showing an example of an operational sequence that is performed when a handover is performed from the VBS to the NBS.

FIG. 25 is a diagram showing an operational sequence that is used when a handover is performed from the VBS 6 to the NBS 5. The UE is currently performing communication in a cell that is subordinate to the UN 6*b*. Also, it is assumed that, after the outgoing communication sequence has been performed, the context ID mapping tables have been generated in the UN 6*b* and in the RN 6*a* as shown in FIGS. 17 and 16, respectively. In the following sections, operations performed by the VBS 6 when a handover from the UN 6*b* to the NBS 5 is performed will be explained in detail, with reference to FIGS. 25 to 27.

The UE is located in a cell of which the UN 6*b* is in charge. Because the communication quality of the cell has degraded, the UE searches for a neighboring cell and notifies the UN 6*b* of the ID of a cell that has good communication quality and can be a handover candidate as well as a measured result of the communication quality thereof as measurement information (indicated as a "Measurement Report") (step S61).

Based on the measured result that has been received, the UN 6*b* first selects the cell (identified with the cell ID "c3") of which the NBS 5 is in charge as the handover target and determines the IP address and the destination port of the base station to which a handover request is to be transmitted, based on the ID "c3" of the handover target cell contained in the measurement information that has been received; however, as explained in the section above titled "(1) Handover between the UNs within the VBS 6", the UN 6*b* has only the information on the cell of its own and recognizes any other cell as a cell that is subordinate to a different core node. Thus, the UN 6*b* obtains the IP address and the destination port that are used as the destination of individual control messages for the RN 6*a*, which is the core node for the UN 6*b*, out of the path table (see FIG. 12).

Subsequently, the UN 6*b* assigns the context ID "ub" and the data path information [Iub, Pub, Fub] on the UN 6*b* side that are required by the handover target base station when signaling messages and data for the handover user are transmitted and received between the UN 6*b* and the handover target base station during the handover process and stores the context ID and the data path information as core node context information and adjacent node context information within the context ID mapping table shown in FIG. 21.

After that, the UN 6*b* stores the handover target cell ID "c3", the context ID "ub" of its own, the node ID "n2" of its own, and the data path information [Iub, Pub, Fub] for the handover target base station, as well as the node ID "n1", the context ID "r1", and the data path information [Ir1, Pr1, Fr1] of the core node RN 6*a* into a handover request message (indicated as a "Hanover Request"), and transmits the handover request message to the IP address and the destination port at the RN 6*a* that have been determined as described above (step S62).

When having received the handover request message at step S62 described above, the RN 6*a* first determines the handover target base station to which the message is to be transferred based on the ID "c3" of the handover target cell contained in the handover request message that has been received. The RN 6*a* refers to the cell ID/node ID mapping table shown in FIG. 6 and determines that the forwarding destination of the handover request is the base station identified with the node ID "n5". Further, the RN 6*a* refers to the path table shown in FIG. 4 and determines the destination IP address In, d, n5 and the destination port Pn, d, n5.

After that, the RN 6*a* stores the node ID "n2", the context ID "ub", and the data path information [Iub, Pub, Fub] of the handover source base station that are contained in the handover request message, as a node #1's node ID, a node #1's context ID, and a node #1's data path, respectively, in the node #1 context information of the second sub-record within the context ID mapping table stored therein (see FIG. 26). The RN 6*a* specifies the entries into which these pieces of information are stored by using the UE ID "u1" stored in the handover request message that has been received.

Also, for the purpose of operating as a relay point for the signaling messages and the user data that are transmitted and received between the UN 6*b* and the NBS 5, the RN 6*a* supplies the context ID "r3" and the data path information [Ir3, Pr3, Fr3] to the UN 6*b* and supplies the context ID "r4" and the data path information [Ir4, Pr4, Fr4] to the NBS 5. In this situation, the RN 6*a* stores the former as a node's own context ID and a node's own data path in the node #1 context information section of the second sub-record within the context ID mapping table (see FIG. 26). Further, the RN 6*a* stores the latter as a node's own context ID and a node's own data path in the node #2 context information section of the second sub-record within the same table.

Further, the RN 6*a* rewrites the node ID "n2", the context ID "ub", and the data path information [Iub, Pub, Fub] of the UN 6*b* that are contained in the received handover request message with the node ID "n1" of its own as well as the context ID "r4" and the data path information [Ir4, Pr4, Fr4] that have been supplied to the NBS 5 and transmits the handover request message to the destination IP address and the destination port of the NBS 5 that have been obtained as described above (step S63).

After having received the handover request message from the RN 6*a* at step S63 described above, the handover target base station NBS 5 extracts the node ID "n1", the context ID "r4", and the data path information [Ir4, Pr4, Fr4] of the handover source base station out of the message and stores the extracted result as an adjacent node's node ID, an adjacent node's context ID, and an adjacent node's data path, respectively, in the adjacent node context information within the context ID mapping table (see FIG. 27). The entry into which these parameters are stored is determined based on the UE ID "u1" that has been set in the handover request message, as described above.

Further, the NBS 5 extracts the node ID "n3", the context ID "a", and the data path information [Ia, Pa, Fa] of the core node from the handover request message and stores the extracted information as a core node's node ID, a core node's context ID, and a core node's data path, respectively, in the core node context information within the context ID mapping table.

Subsequently, the NBS 5 supplies a context ID "t2" and data path information [It2, Pt2, Ft2] on the NBS 5 side that are used when the NBS 5 transmits and receives signaling messages and transfer data to and from the handover source base station during the handover process. The NBS 5 then stores the supplied parameters as a node's own context ID and a node's own data path in the adjacent node context information within the context ID mapping table. Similarly, the NBS 5 supplies a context ID "t1" and data path information [It1, Pt1, Ft1] on the NBS 5 side to the core node for the purpose of transmitting and receiving signaling messages and user data after the handover process has been completed. The NBS 5 then stores the context ID and the data path information as a node's own context ID and a node's own data path in the core node context information. FIG. 27 is a drawing showing the context ID mapping table after the parameters extracted from the received handover request message and the parameters supplied by the NBS 5 have been set therein.

When the update of the context ID mapping table has been completed, the NBS 5 generates a handover response message (indicated as a "Handover Response"). In this situation, the NBS 5 sets the node's own context ID "t2" shown in the adjacent node context information stored in the table described above as the source context ID and sets the adjacent node's context ID "r4" shown in the adjacent node context information as the destination context ID. Further, the NBS 5 sets the node's own data path [It2, Pt2, Ft2] shown in the adjacent node context information into the handover response message and transmits the handover response message to the node identified with the node ID "n1". The NBS 5 obtains the IP address and the destination port that are used as the destination at the destination node, out of the path table (see FIG. 3) (step S64).

When the RN 6*a*, which is operating as the handover source base station for the handover target base station NBS 5, has received the handover response message from the NBS 5 at step S64 described above, the RN 6*a* extracts the context ID "t2" and the data path information [It2, Pt2, Ft2] of the NBS 5 out of the received message and stores the extracted information into the context ID mapping table stored therein. The positions of the entries in the table into which the extracted pieces of information are stored are the node #2's context ID and the node #2's data path in the node #2 context information section of the second sub-record in the record in which the node's own context ID in the node #2 context information section of the second sub-record matches the destination context ID "r4" contained in the handover response message.

After that, the RN 6*a* obtains the node's own context ID "r3" and the node #1's context ID "ub" out of the node #1 context information section of the second sub-record. The RN 6*a* then replaces the source context ID "t2" and the destination context ID "r4" contained in the received handover response message with the obtained pieces of information, respectively. Further, the RN 6*a* replaces the source node ID with the node ID "n1" of its own. In addition, the RN 6*a* replaces the data path information [It2, Pt2, Ft2] on the NBS 5 side contained in the handover response message with the data path information [Ir3, Pr3, Fr3] on the RN 6*a* side that has been stored as the node's own data path in the node #1 context information section described above. Subsequently, after rewriting the destination IP address and the destination port with the destination IP address Iv, d, n2 and the destination port Pv, d, n2 corresponding to individual control messages for the UN 6*b*, which is identified with the node #1's node ID "n2", the RN 6*a* transmits the handover response message (step S65).

When having received the handover response message from the RN 6*a* at step S65 described above, the handover source base station UN 6*b* extracts the node ID "n1", the context ID "r3", and the data path information [Ir3, Pr3, Fr3] of the RN 6*a* out of the message and stores the extracted information into the context ID mapping table stored therein. The positions of the entries in the table into which the extracted pieces of information are stored are the adjacent node's node ID, the adjacent node's context ID, and the adjacent node's data path in the record in which the node's own context ID in the adjacent node context information section matches the destination context ID "ub" contained in the handover response message. FIG. 21 is a drawing showing the context ID mapping table of the UN 6*b* after the parameters extracted from the received handover response message and the parameters stored when the handover request was transmitted at step S62 described above have been set therein.

According to the context ID mapping tables that have been generated through the procedures performed at steps S62 through S65 described above, the RN 6*a* relays the signaling messages and the user data between the handover source base station UN 6*b* and the handover target base station NBS 5 during the handover process in the manner described in (R-I) through (R-IV) above.

After the transfer path used for transferring the signaling messages and the user data during the handover process has been established between the handover source base station and the handover target base station, the handover source base station UN 6*b* transmits a handover execution command (indicated as a "Handover Command) to the UE (step S66).

When having received the handover execution command, the UE changes the connection target thereof from the UN 6*b* to the NBS 5 and, after a wireless connection has been established, the UE notifies the NBS 5 that the handover has been completed (indicated as a "Handover Commit") (step S67).

When having been notified by the UE that the handover has been completed at step S67 described above, the handover target base station NBS 5 conducts a search in the context ID mapping table (see FIG. 27) by using the UE ID stored in the received notification or by using the UE ID that has indirectly been derived from a wireless resource being used such as a reception frequency or a slot. The NBS 5 then extracts the core node's node ID "n3" and the core node's context ID "a" from the core node context information in the record that has been found in the search. Further, the NBS 5 obtains the IP address Ic, d, n3 and the destination port Pc, d, n3 out of the path table (see FIG. 3).

Subsequently, the NBS 5 sets the destination context ID "a", as well as the node's own context ID "t1" and the node's own data path [It1, Pt1, Ft1] in the core node context information that have been extracted from the record found in the search into a message (indicated as a "Handover Confirm") that has been transmitted by the UE to notify that the handover had been completed. Then the NBS 5 transmits the message to the IP address and the destination port described above (step S68).

When having received the handover completion notification from the UE at step S68 described above, the AGW 3 recognizes that the target UE "u1" and the destination node RN 6*a* of the signaling messages and the user data have completed the handover, based on the destination context ID "a" contained in the message. Thus, the AGW 3 changes the destination of the signaling messages and the user data thereafter as follows: The AGW 3 obtains the destination IP address Ic, d, n5 and the destination port Pc, d, n5 of the signaling messages, by referring to the path table (see FIG. 2) based on the source node ID "n5" of the handover completion message. Further, the AGW 3 extracts the data path information [It1, Pt1, Ft1] of the handover target node NBS 5 out of the handover completion message and obtains the IP address, the destination port, and the data flow identifier used as the destination of the user data. In addition, after changing the destination of the signaling messages and the user data, the AGW 3 transmits a confirmation message (indicated as a "Handover Confirm Ack") to the NBS 5 (step S69).

After the handover target base station NBS 5 has received the confirmation message from the core node at step S69 described above, the NBS 5 notifies the RN 6*a*, which is operating as the handover source base station, that the handover has been completed (indicated as a "Handover Complete") (step S70). The method used for transmitting the handover completion message from the NBS 5 to the UN 6*b* is explained in (R-II) above.

When having received the handover completion message from the handover target base station NBS 5 at step S70 described above, the RN 6*a* rewrites the destination context ID contained in the message with the context ID "ub" of the handover source base station UN 6*b* and transmits the message to the UN 6*b* (step S71). The RN 6*a* then releases the entries in the context ID mapping table and the user data buffer that have been secured for the UE for which the handover has been performed.

When having received the handover completion message at step S71 described above, the handover source base station UN 6*b* releases the wireless resource, the user data buffer, the ID, and the like that have been secured for the handover user, deletes the relevant table entries, and thus completes the handover process.

During the handover process described above, the RN 6*a* provides the function to relay the signaling messages and the user data between the handover source base station UN 6*b* and the handover target base station NBS 5. In that situation, the context IDs and the pieces of data path information that are individually supplied to the UN 6*b* and to the NBS 5 for the relay purposes may be the same as one another. In other words, r3=r4; Ir3=Ir4; Pr3=Pr4; and Fr3=Fr4 may be satisfied. Furthermore, as for the user data, it is acceptable to configure to transfer the user data directly between the UN 6*b* and the NBS 5 by having an arrangement in which Ir3=It2; Pr3=Pt2; Fr3=Ft2; Ir4=Iub; Pr4=Pub; and Fr4=Fub are satisfied.

(3) Handover from the NBS 5 to the VBS 6

Figure 28:
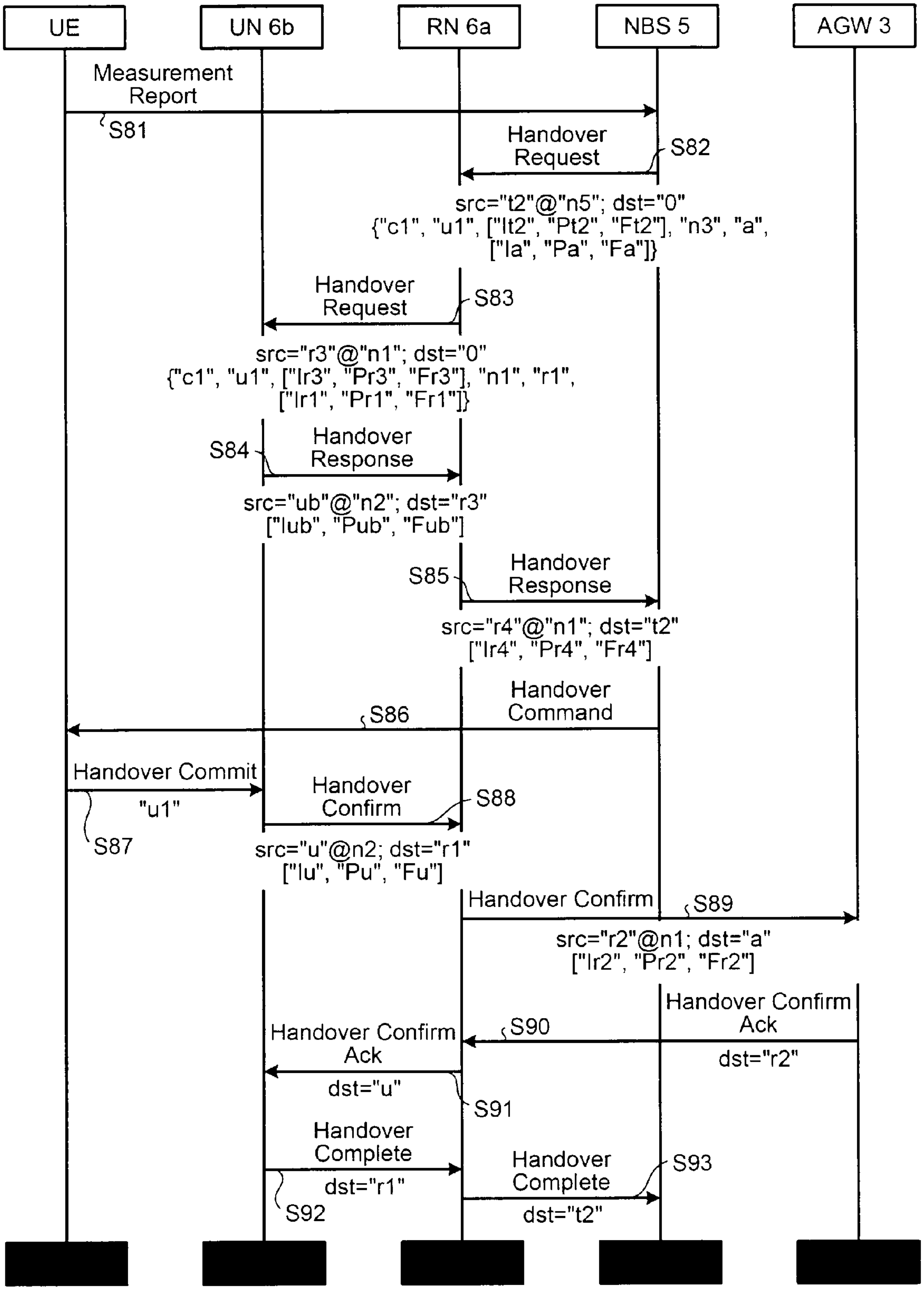
FIG. 28 is a diagram showing an example of an operational sequence that is performed when a handover is performed from the NBS to the VBS.

FIG. 28 is a diagram showing an operational sequence that is used when a handover is performed from the NBS 5 to the VBS 6. The UE is currently performing communication in a cell that is subordinate to the NBS 5. Also, after the outgoing communication sequence has been performed, the context ID "a" and the data path information [Ia, Pa, Fa] are assigned on the AGW 3 side, whereas the context ID "t1" and the data path information [It1, Pt1, Ft1] are assigned on the NBS 5 side, for the signaling process performed between the AGW 3 and the NBS 5. FIG. 29 is a drawing showing the record corresponding to the UE "u1" within the context ID mapping table stored in the NBS 5 before the handover is performed.

The UE is located in a cell of which the NBS 5 is in charge. When the communication quality of the cell has degraded, the UE searches for a neighboring cell and notifies the NBS 5 of the ID of a cell that has good communication quality and can be a handover candidate as well as a measured result of the communication quality thereof as measurement information (indicated as a "Measurement Report") (step S81).

Based on the measured result that has been received, the NBS 5 first selects the cell (identified with the cell ID "c1") of which the UN 6*b* is in charge as the handover target. The NBS 5 then refers to the cell ID/node ID mapping table (see FIG. 5) and searches for the ID "c1" of the handover target cell contained in the measurement information. Thus, based on the result of the search, the NBS 5 obtains the node ID "n1" of the base station to which a handover request is to be transmitted. Further, by referring to the path table (see FIG. 3), the NBS 5 determines the destination to which the handover request message for the base station "n1" is to be transmitted, as the IP address In, d, n1 and the destination port Pn, d, n1.

Subsequently, the NBS 5 assigns the context ID "t2" and the data path information [It2, Pt2, Ft2] on the NBS 5 side that are required by the handover target base station when signaling messages and data for the handover user are transmitted and received between the NBS 5 and the handover target base station during the handover process. Then the NBS 5 stores the context ID and the data path information together with the node ID "n1", the context ID "a", and the data path information [Ia, Pa, Fa] of the core node AGW 3 into the handover request message (indicated as a "Handover Request"). After that, the NBS 5 transmits the handover request message to the IP address and the destination port that have been determined as described above (step S82).

The NBS 5 stores the context ID and the data path information that have been supplied to the handover target base station during the handover of the UE "u1", as a node's own context ID and a node's own data path in the adjacent node context information within the context ID mapping table (see FIG. 29).

When having received the handover request message at step S82 described above, and when the handover request message has been transmitted from the outside of the VBS 6, and also, the destination context ID indicates that a new context should be generated (the context ID "0" is used for this purpose according to the first embodiment), the RN 6*a* adds an entry related to the handover user to the context ID mapping table. In the present example, while using the user ID "u1" of the handover user as a key, the RN 6*a* stores the node ID "n5", the content ID "t2", and the data path information [It2, Pt2, Ft2] of the handover source base station NBS 5 that are contained in the handover request message as a node #1's node ID, a node #1's context ID, and a node #1's data path in the node #1 context information section of the second sub-record in the entry described above. Further, the RN 6*a* stores the node ID "n3", the content ID "a", and the data path information [Ia, Pa, Fa] of the core node AGW 3 that are contained in the handover request message, as a node #2's node ID, a node #2's context ID, and a node #2's data path, respectively, in the node #2 context information section of the first sub-record in the entry described above.

After that, based on the ID "c1" of the handover target cell contained in the handover request message, the RN 6*a* determines the node ID "n2" of the handover target base station by using the cell ID/node ID mapping table (see FIG. 6). Further, by referring to the path table (see FIG. 4) based on the determined node ID, the RN 6*a* determines the destination IP address Iv, d, n2 and the destination port Pv, d, n2 to which the handover request message is to be transferred.

When having determined that the forwarding destination of the handover request is the base station identified with the node ID "n2", i.e., the UN 6*b* that is a UN included in the VBS 6, the RN 6*a* supplies the context ID "r4" and the data path information [Ir4, Pr4, Fr4] to the NBS 5, for the purpose of operating as a relay point for the signaling messages and the user data that are transmitted and received between the UN 6*b* and the NBS 5. Also, the RN 6*a* supplies the context ID "r3" and the data path information [Ir3, Pr3, Fr3] to the UN 6*b*. The RN 6*a* stores the former as a node's own context ID and a node's own data path in the node #1 context information section of the second sub-record within the context ID mapping table. Further, the RN 6*a* stores the latter as a node's own context ID and a node's own data path within the node #2 context information section of the second sub-record.

Further, for the purpose of receiving on behalf of the UN 6*b*, signaling messages and user data from the AGW 3, which serves as the core node of the NBS 5, after the handover has been performed, the RN 6*a* supplies the context ID "r2" and the data path information [Ir2, Pr2, Fr2] for the handover user to the AGW 3, and also, supplies the context ID "r1" and the data path information [Ir1, Pr1, Fr1] for the handover user to the UN 6*b*. The RN 6*a* stores the former as a node's own context ID and a node's own data path in the node #2 context information section of the first sub-record within the context ID mapping table. Further, the RN 6*a* stores the latter as a node's own context ID and a node's own data path in the node #1 context information section of the first sub-record.

After that, the RN 6*a* replaces the node ID "n5", the context ID "t2", and the data path information [It2, Pt2, Ft2] of the transmitting source that are contained in the handover request message received from the NBS 5 with the node ID "n1" of its own as well as the context ID "r3" and the data path information [Ir3, Pr2, Fr3] for the UN 6*b*. Further, the RN 6*a* replaces the node ID "n3", the context ID "a", and the data path information [Ia, Pa, Fa] of the AGW 3, which serves as the core node of the NBS 5, with the node ID "n1" of its own as well as the context ID "r1" and the data path information [Ir1, Pr1, Fr1] for the UN 6*b*.

The RN 6*a* then transmits the handover request message to the destination IP address Iv, d, n2 and the destination port Pv, d, n2 that have been obtained as described above (step S83).

After having received the handover request message from the RN 6*a* at step S83 described above, the handover target base station UN 6*b* extracts the node ID "n1", the context ID "r3", and the data path information [Ir3, Pr3, Fr3] of the handover source base station out of the message. Then the UN 6*b* stores the extracted result as an adjacent node's node ID, an adjacent node's context ID, and an adjacent node's data path, respectively, in the adjacent node context information section within the context ID mapping table. The entry into which these parameters are stored is determined based on the UE ID "u1" that has been set in the handover request message described above. In the present example, because the destination context ID of the handover request message is new (i.e., the ID="0"), the entry for the UE ID "u1" is newly generated in the context ID mapping table.

Further, the UN 6*b* extracts the node ID "n1", the context ID "r1", and the data path information [Ir1, Pr1, Fr1] of the core node from the handover request message and stores the extracted result as a core node's node ID, a core node's context ID, and a core node's data path, respectively, in the core node context information within the context ID mapping table.

Subsequently, the UN 6*b* supplies the context ID "ub" and the data path information [Iub, Pub, Fub] on the UN 6*b* side that are used when the UN 6*b* transmits and receives signaling messages and user data to and from the handover source base station during the handover process. The UN 6*b* then stores these parameters as a node's own context ID and a node's own data path, respectively, in the adjacent node context information within the context ID mapping table. Similarly, the UN 6*b* supplies the context ID "u" and the data path information [Iu, Pu, Fu] on the UN 6*b* side to the RN 6*a*, which serves as the core node, for the purpose of transmitting and receiving signaling messages and user data after the handover has been completed. The UN 6*b* then stores the context ID and the data path information as a node's own context ID and a node's own data path in the core node context information within the same table. Through these processes, the UN 6*b* obtains a context ID mapping table as shown in FIG. 30.

After the context ID mapping table has been updated, the UN 6*b* generates a handover response message (indicated as a "Handover Response"). In the present example, the UN 6*b* sets the node's own context ID "ub" in the adjacent node context information stored in the updated table as the source context ID, and also, sets the adjacent node's context ID "r3" in the adjacent node context information as the destination context ID. After that, the UN 6*b* sets the node's own data path [Iub, Pub, Fub] in the adjacent node context information and transmits the handover request response to the node identified with the node ID "n1", i.e., the RN 6*a* (step S84). In this situation, the UN 6*b* obtains the IP address Iv, d, n1 and the destination port Pv, d, n1 of the RN 6*a* out of the path table (see FIG. 12).

When having received the handover response message from the UN 6*b* at step S84 described above, the RN 6*a* extracts the context ID "ub" and the data path information [Iub, Pub, Fub] of the source out of the received message and stores the extracted result as a node #2's context ID and node #2's data path information in the node #2 context information section of the second sub-record within the context ID mapping table. Also, the RN 6*a* stores the node ID "n2" of the UN 6*b* as a node #1's node ID in the context information section. Through these steps described above, the RN 6*a* has obtained a context ID mapping table as shown in FIG. 31.

When having updated the context ID mapping table, the RN 6*a* replaces the node ID, the context ID, and the data path information of the message source that are contained in the handover response message with the node ID "n1", the context ID "r4", and the data path information [Ir4, Pr4, Fr4] of its own, respectively. Further, the RN 6*a* replaces the destination context ID with the context ID "t2" of the NBS 5. Further, by using the path table (see FIG. 4), the RN 6*a* obtains the IP address In, d, n5 and the destination port Pn, d, n5 for transmitting individual control messages to the NBS 5. The RN 6*a* transmits the handover response message that has been rewritten to the IP address and the destination port that have been obtained for the transmitting purposes as described above (step S85).

When having received the handover response message from the RN 6*a* at step S85 described above, the handover source base station NBS 5 extracts the node ID "n1", the context ID "r4", and the data path information [Ir4, Pr4, Fr4] of the RN 6*a* out of the message and stores the extracted result as an adjacent node's node ID, an adjacent node's context ID, and an adjacent node's data path, respectively, in the adjacent node context information section within the context ID mapping table stored therein.

According to the context ID mapping table that has been generated through the procedures performed at steps S82 through S85 described above, the RN 6*a* relays the signaling messages and the user data between the handover source base station NBS 5 and the handover target base station UN 6*b* during the handover process as described in (R-I) through (R-IV) above.

After the transfer path used for transferring the signaling messages and the user data during the handover process has been established between the handover source base station and the handover target base station, the handover source base station NBS 5 transmits a handover execution command (indicated as a "Handover Command"), to the UE (step S86).

When having received the handover execution command, the UE changes the connection target thereof from the NBS 5 to the UN 6*b* and, after a wireless connection has been established, the UE notifies the UN 6*b* that the handover has been completed (indicated as a "Handover Commit") (step S87).

When having been notified by the UE that the handover has been completed at step S87 described above, the handover target base station UN 6*b* conducts a search in the context ID mapping table (see FIG. 30) by using the UE ID stored in the received notification or by using the UE ID that has indirectly been derived from a wireless resource being used such as a reception frequency or a slot. The UN 6*b* then extracts the core node's node ID "n1" and the core node's context ID "r1" from the core node context information in the record that has been found in the search. Further, the UN 6*b* obtains the IP address Iv, d, n1 and the destination port Pv, d, n1 out of the path table (see FIG. 12).

Subsequently, the UN 6*b* sets the destination context ID "r1" as well as the node's own context ID "u" and the node's own data path [Iu, Pu, Fu] that are in the core node context information extracted from the record found in the search, into the message (indicated as a "Handover Confirm") that has been transmitted by the UE to notify that the handover had been completed and transmits the message to the IP address and the destination port described above (step S88).

When having received the handover completion message at step S88 described above, the RN 6*a* extracts the node ID "n2", the context ID "u", and the data path information [Iu, Pu, Fu] of the source out of the message. Then the RN 6*a* stores the extracted information as a node #1's node ID, a node #1's context ID, and a node #1's data path, respectively, in the node #1 context information section of the first subrecord within the context ID mapping table stored therein (see FIG. 31). FIG. 32 is a drawing showing the context ID mapping table that has been updated and stored in the RN 6*a*.

Subsequently, the RN 6*a* extracts the forwarding destination node ID "n3" for the handover completion message out of the node #2 context information section of the first subrecord. Also, the RN 6*a* obtains the IP address Ic, d, n3 and the destination port Pc, d, n3 that are used as the destination of the message out of the path table (see FIG. 4). In addition, the RN 6*a* extracts the node's own context ID "r2", the node's own data path information [Ir2, Pr2, Fr2], and the node #2's context ID "a" from the context information section. Further, the RN 6*a* replaces the source context ID "u", the source data path information [Iu, Pu, Fu], and the destination context ID "r1" that are contained in the handover completion message with the extracted pieces of information respectively. Then the RN 6*a* transmits the handover completion message to the IP address and the destination port that have been obtained as described above (step S89).

When having received the handover completion message at step S89 described above, the AGW 3 recognizes that the target UE "u1" and the destination node NBS 5 of the signaling messages and the user data have completed the handover, based on the destination context ID "a" contained in the message. Thus, the AGW 3 changes the destination of the signaling messages and the user data thereafter as follows: The AGW 3 extracts the node ID "n1" and the context ID "r2" of the transmitting source from the handover completion message. Also, the AGW 3 obtains the destination IP address Ic, d, n1 and the destination port Pc, d, n1 of the signaling message and further obtains the signaling destination context ID "r2". The AGW 3 obtains the IP address and the destination port by searching for the extracted node ID in the path table (see FIG. 2). In addition, the AGW 3 extracts the data path information [Ir2, Pr2, Fr2] that is stored in the handover completion message. The AGW 3 uses the obtained pieces of information as a new destination IP address, a new destination port, and a new data flow identifier of the user data.

By using the context ID mapping table that has been generated by performing the processes at steps S82 through S89 described above, the RN 6*a* relays the signaling messages and the user data between the AGW 3 and the UN 6*b* as described in (C-I) through (C-II) and (C-III) through (C-IV) above.

After having changed the destination of the signaling messages and the user data, the AGW 3 transmits a confirmation message (indicated as a "Handover Confirm Ack") to the RN 6*a* (step S90).

The RN 6*a* receives the confirmation message from the AGW 3 at step S90 described above and relays the message to the UN 6*b* (step S91).

After the handover target base station UN 6*b* has received the confirmation message from the RN 6*a*, which serves as the core node, at step S91 described above, the UN 6*b* notifies the RN 6*a* that the handover has been completed (indicated as a "Handover Complete") (step S92). The handover completion message is relayed to the NBS 5 by the RN 6*a* (step S93). At this time, the context information of the handover source base station NBS 5 becomes unnecessary in the context ID mapping table (see FIG. 32) stored in the RN 6*a*. Thus, the contents of the second sub-record in the entry corresponding to the handover UE are erased. The context ID mapping table stored in the RN 6*a* after the handover process has been completed is shown in FIG. 16.

When having received the handover completion message at step S93 described above, the handover source base station NBS 5 releases the wireless resource, the user data buffer, the ID, and the like that have been secured for the handover user, deletes the relevant table entries, and thus completes the handover process.

During the handover process described above, the RN 6*a* provides the function to relay the signaling messages and the user data between the handover source base station NBS 5 and the handover target base station UN 6*b*. In that situation, the context IDs and the pieces of data path information that are individually supplied to the NBS 5 and to the UN 6*b* for the relay purposes may be the same as one another. In other words, r3=r4; Ir3=Ir4; Pr3=Pr4; and Fr3=Fr4 may be satisfied. Furthermore, as for the user data, it is acceptable to configure to transfer the user data directly between the UN 6*b* and the NBS 5 by having an arrangement in which Ir3=It2; Pr3=Pt2; Fr3=Ft2; Ir4=Iub; Pr4=Pub; and Fr4=Fub are satisfied.

As described above, according to the first embodiment, it is configured such that the signaling messages and the user data for the plurality of base stations are relayed by the representative base station and so that the plurality of base stations are not recognized by the elements other than the representative base station. With this arrangement, it is possible to have the plurality of base stations virtually regarded as one base station by the core network device, and the base station accommodating efficiency of the core network device can be improved.

Figure 33:
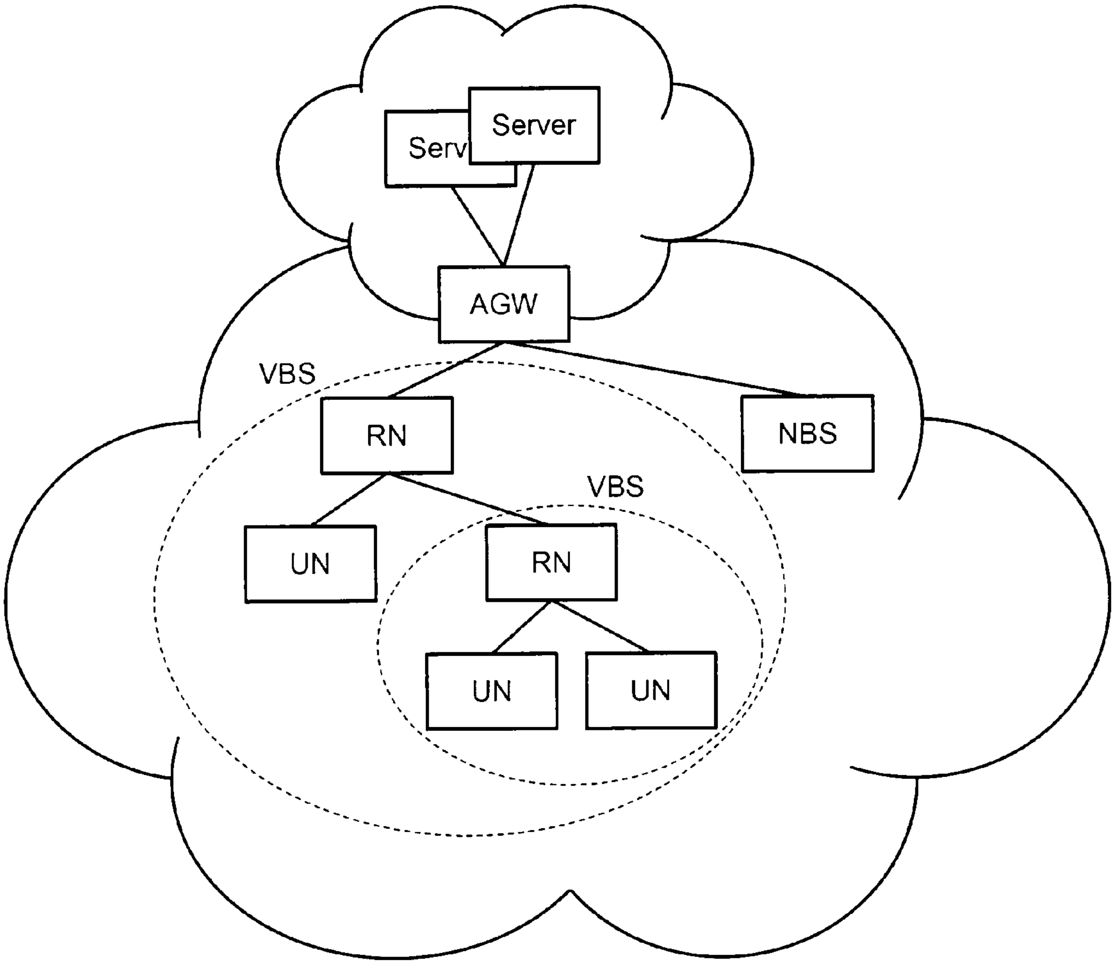
FIG. 33 is a diagram showing another exemplary configuration of the wireless communication system according to the first embodiment of the present invention.

Further, according to the first embodiment, it is possible to have the plurality of base stations virtually regarded as one base station by base stations other than the representative base station. Thus, as shown in FIG. 33 for example, it is possible to construct a hierarchical base station network by allowing any one of the member base stations included in the virtual base station to structure another virtual base station. Consequently, it is possible to ensure scalability even if the number of base stations becomes extremely large.

Furthermore, the core network performs the state monitoring process for the base stations only between the core network and the representative base station. Thus, because the state of the member base stations is notified to the core network as the state of the cells of the virtual base station, it is possible to dynamically activate or shut down each of the member base stations. In case of a base station provided in one's home or the like, a user himself/herself can freely turn on and off the power source of the base stations.

Second Embodiment

According to the first embodiment described above, the one RN performs the common control signaling message processing such as the paging process and the individual control signaling message processing such as the call control process and the handover process for each UE, as well as the user data relay process. In contrast, in the following sections, another embodiment in which one RN is provided for each of different types of signaling messages and user data will be explained.

Figures 34, 35:
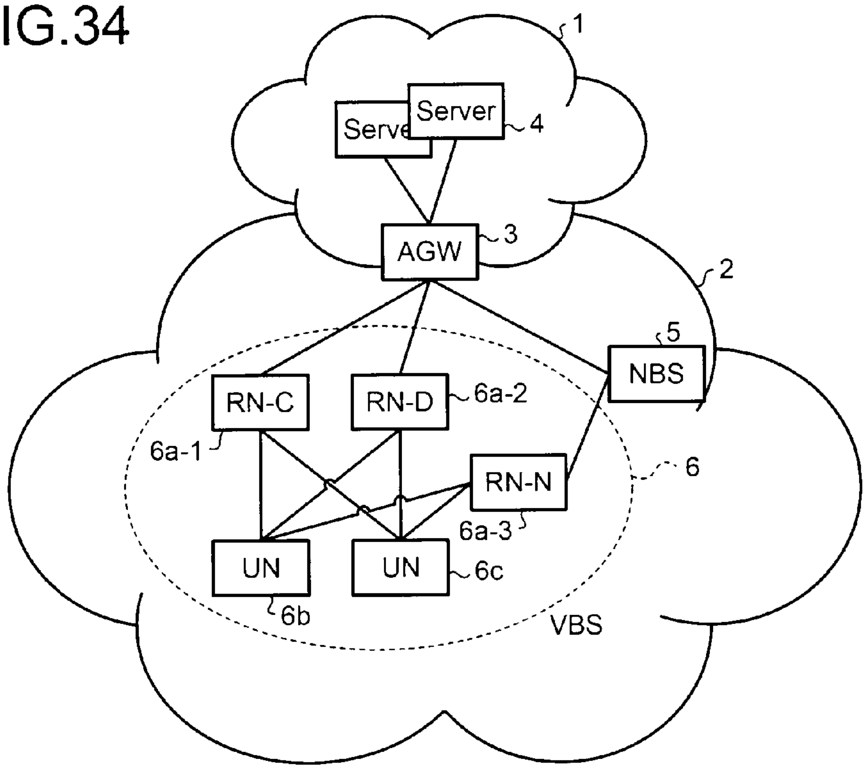
FIG. 34 is a diagram showing an exemplary configuration of a wireless communication system according to a second embodiment of the present invention.
FIG. 35 is a drawing showing an example of a path table of an RN-C.

FIG. 34 is a diagram showing an exemplary configuration of a wireless communication system according to a second embodiment of the present invention. RN-C 6*a*-1, RN-D 6*a*-2, and RN-N 6*a*-3 are representative base stations. The RN-C 6*a*-1 is in charge of processes to activate/shut down the virtual base station VBS 6 and processes related to the state monitoring process, the paging process, and the like that are performed by the core network 1. The RN-D 6*a*-2 is in charge of transmitting and receiving signaling messages and user data to and from the core network 1 in relation to the call control/mobility control for each of the UEs. The RN-N 6*a*-3 is in charge of transmitting and receiving signaling messages and user data to and from adjacent base stations of the VBS 6 in relation to the mobility control for each of the UEs. Each of these RNs may provide only the functions of an RN. Alternatively, each of these RNs may provide the functions of a UN (i.e., the functions of a regular base station), in addition to the functions of an RN. The operations performed by each of the RNs are the same in either one of these options. Thus, in the following sections, each of the RNs is assumed to be a dedicated device.

<Network Settings>

Like in the first embodiment described above, for the purpose of hiding the presence of the UNs 6*b* and 6*c* included in the VBS 6 from the AGW 3 and the NBS 5, the network setting is configured so that the cells of which the UNs 6*b* and 6*c* are in charge are regarded by the AGW 3 and the NBS 5 as the cells of the VBS 6. In the following sections, node IDs of the RN-C 6*a*-1, the RN-D 6*a*-2, and the RN-N 6*a*-3 are n1-1, n1-2, n1-3, respectively. The other node IDs are the same as the ones used in the first embodiment described above.

(1) Correspondent Node Information

In the second embodiment, the RN is separated into three RNs that are namely the RN-C, the RN-D, and the RN-N. However, for the purpose of having all of the three RNs and the UNs 6*b* and 6*c* virtually recognized as one base station by the AGW 3 and the NBS 5, the same node ID "n1" is used to identify the RN-C, the RN-D, and the RN-N for the AGW 3 and the NBS 5. Also, the path tables of the AGW 3 and the NBS 5 are the same as those in the first embodiment and are shown in FIGS. 2 and 3, respectively.

FIG. 35 is a path table of the RN-C 6*a*-1. Because the RN-C 6*a*-1 is in charge of the common control signaling message processing, with respect to the AGW 3, which serves as the core node, only the destination IP address and the destination port for common control messages are stored in the table. Similarly, also with respect to the UNs, only the destination IP address and the destination port for common control signaling messages for each of the UNs are stored in the table. Because the path table contains the destination information for the other RNs according to the second embodiment, the RN-C/RN-D/RN-N are added as node types. The path table of the RN-C 6*a*-1 stores therein the destination information for the RN-D 6*a*-2 and the RN-N 6*a*-3. Further, because the adjacent nodes are dealt with only by the RN-N 6*a*-3, the path table of the RN-C 6*a*-1 contains no destination information for the adjacent nodes.

FIG. 36 is a path table of the RN-D 6*a*-2. Because the RN-D 6*a*-2 is in charge of the individual control signaling message processing, with respect to the AGW 3 serving as the core node, only the destination IP address and the destination port for individual control messages are stored in the table. Similarly, also with respect to the UNs, only the destination IP address and the destination port for individual control messages for each of the UNs are stored in the table. In addition, the path table of the RN-D 6*a*-2 stores therein the destination information for the RN-C 6*a*-1 and the RN-N 6*a*-3. Further, because the adjacent nodes are dealt with only by the RN-N 6*a*-3, the path table of the RN-D 6*a*-2 contains no destination information for the adjacent nodes.

FIG. 37 is a path table of the RN-N 6*a*-3. Because the RN-N 6*a*-3 is in charge of the mobility control, the table stores therein no information for the core node, i.e., the AGW 3. Instead, the table stores therein destination information for the adjacent base station NBS 5. With respect to the UNs, because handover processes are performed with the UNs as a part of the mobility control process, the path table stores therein the destination IP addresses and the destination ports for individual control messages. In addition, the destination IP addresses and the destination ports for common control messages are provided on the assumption that they are used when information is exchanged between the adjacent base stations and the UNs. However, the destination IP addresses and the destination ports for common control messages are not used in the second embodiment.

FIG. 38 is a path table of each of the UNs 6*b* and 6*c*. According to the second embodiment, because the RN is separated into the three RNs that are namely the RN-C, RN-D, and RN-N, the destination information for each of the RNs is stored in the path table.

(2) Adjacent Cell Information

The cell ID/node ID mapping tables are the same as those according to the first embodiment described above (see FIGS. 5 to 8). It should be noted, however, that the cell ID/node ID mapping tables managed by the RNs are generated or updated by the RN-C 6*a*-1 when the UNs are activated and are managed by the RN-N 6*a*-3, as explained in the description of dynamic configurations of the VBS 6 below.

(3) Location Registration Area Information

The mapping tables showing the location area IDs and the delivery destination nodes used for the paging deliveries are the same as those according to the first embodiment described above (see FIGS. 9 and 10). It should be noted, however, that the RN-C 6*a*-1 manages this mapping table (see FIG. 10) according to the second embodiment.

<Dynamic Configurations of the VBS>

It is the RN-C 6*a*-1 that provides a function to manage the devices in the VBS 6 for the core network. Thus, in the procedure to activate the VBS 6, the function of the RN 6*a* according to the first embodiment is provided by the RN-C 6*a*-1.

(1) Activation of the RN-D/N

After the RN-C 6*a*-1 is activated, the RN-C 6*a*-1 waits until the RN-D 6*a*-2 and the RN-N 6*a*-3 are activated. While the RN-C 6*a*-1 is waiting, even if any of the UNs are activated, the RN-C 6*a*-1 accepts no connections therefrom. It is assumed that the RN-D 6*a*-2 and the RN-N 6*a*-3 each store therein the information about the RN-C 6*a*-1 to which each of the RNs is connected when being activated.

(2) Participation of the UNs

After the RN-D 6*a*-2 and the RN-N 6*a*-3 have been activated, the RN-C 6*a*-1 accepts connections with the UNs. Like in the first embodiment, after the RN-C 6*a*-1 takes the procedure for allowing the UNs to participate the VBS 6, the RN-C 6*a*-1 notifies the RN-D 6*a*-2 and the RN-N 6*a*-3 of information about the UNs that is required when the RN-D 6*a*-2 and the RN-N 6*a*-3 generate the path tables. When a UN newly participates and it is necessary to update the cell ID/node ID mapping table the RN-C 6*a*-1 notifies the RN-N 6*a*-3 of update information of the cell ID/node ID mapping table.

(3) Withdrawals of the UNs

Like in the first embodiment, the RN-C 6*a*-1 takes the procedure for allowing the UNs to withdraw. When one or more of the UNs withdraw and it is necessary to update any of the path tables and the cell ID/node ID mapping tables managed by the RN-D 6*a*-2 and the RN-N 6*a*-3, the RN-C 6*a*-1 notifies the RN-D 6*a*-2 and the RN-N 6*a*-3 of the updates.

(4) State Monitoring Process for the VBS 6

The RN-C 6*a*-1 performs the state monitoring process like in the first embodiment.

<Location Registration>

The RN-D 6*a*-2 plays the role of the RN 6*a* in the location registration process described in the first embodiment. It should be noted, however, that the node ID of the RN-D 6*a*-2 should be indicated as "n1" to the AGW 3, which serves as the core node, and should be indicated as "n1-2" to the UN 6*b*, which is one of the nodes included in the VBS 6. In other words, in the response to the location registration request at step S3 in the location registration sequence shown in FIG. 11, the UN 6*b* is notified of the response after the node ID "n1-2" is added to the context ID for the UN 6*b* that has been assigned by the RN-D 6*a*-2. When the location registration request is transmitted at step S4, the AGW 3 is notified of the location registration request after the node ID "n1" is added to the context ID for the AGW 3 that has been assigned by the RN-D 6*a*-2.

<Outgoing Communication>

The RN-D 6*a*-2 plays the role of the RN 6*a* in the outgoing communication process described in the first embodiment. The operation to ensure that the node ID shown to the AGW 3 is different from the node ID shown to the UN 6*b* is the same as the operation performed during the location registration process described above.

<Incoming Communication>

The RN-C 6*a*-1 plays the role of the RN 6*a* in the incoming communication process described in the first embodiment.

<Handovers>

Like in the first embodiment, three situations such as a handover between the UNs within the VBS 6, a handover from the VBS 6 to the NBS 5, and a handover from the NBS 5 to the VBS 6 will be explained in detail below.

(1) Handover Between the UNs Within the VBS 6

The UE has performed the outgoing communication sequence and is currently performing communication with the UN 6*b* while being subordinate to the UN 6*b*. It is assumed that, with respect to the handover UE, the UN 6*b* and the RN-D 6*a*-2 have the entries shown in FIGS. 39 and 16 stored in the context ID mapping tables, respectively. FIG. 17 is the context ID mapping table of the UN 6*b* according to the first embodiment. The context ID mapping table shown in FIG. 39 is different from the table shown in FIG. 17 in that the core node's node ID shown in the core node context information section is listed as "n1-2", which is the node ID of the RN-D 6*a*-2 for the UNs within the VBS 6.

Figure 40:
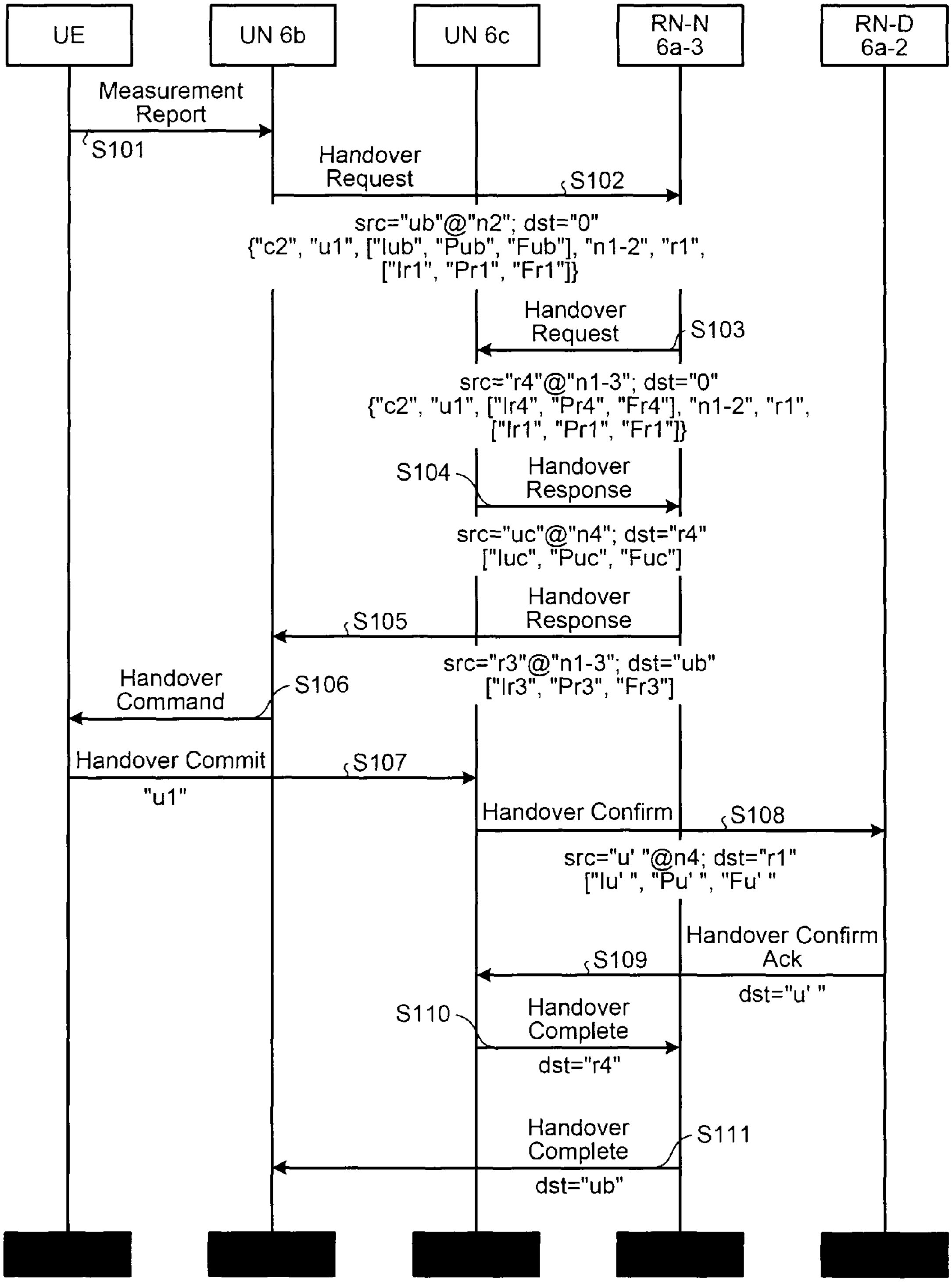
FIG. 40 is a diagram showing an example of an operational sequence that is performed when a handover is performed between UNs within a VBS according to the second embodiment.

FIG. 40 is a diagram showing an operational sequence that is used when a handover is performed between the UNs within the VBS 6 according to the second embodiment. The handover source base station is the UN 6*b*, whereas the handover target base station is the UN 6*c*.

When the communication quality of the cell of which the UN 6*b* is in charge has degraded, the UE searches for a neighboring cell and notifies the UN 6*b* of the ID of a cell that has good communication quality and can be a handover candidate as well as a measured result of the communication quality thereof as measurement information (indicated as a "Measurement Report") (step S101). Based on the measured result that has been received, the UN 6*b* first selects the cell (identified with the cell ID "c2") of which the UN 6*c* is in charge as the handover target. Subsequently, the UN 6*b* determines the IP address and the destination port of the base station to which a handover request is to be transmitted, based on the ID "c2" of the handover target cell contained in the measured result; however, the UN 6*b* has only the information about the cell of its own in the cell ID/node ID mapping table (see FIG. 7). Thus, the UN 6*b* recognizes that the handover target cell is a cell that is subordinate to a different core node and determines an IP address Iv, d, n1-3 and a destination port Pv, d, n1-3 that are used as the destination of the handover request for the mobility control core node RN-N 6*a*-3, by referring to the path table shown in FIG. 38.

Subsequently, the UN 6*b* assigns the context ID "ub" and the data path information [Iub, Pub, Fub] on the UN 6*b* side that are used when signaling messages and user data are transmitted and received between the UN 6*b* and the handover target base station UN 6*c* during the handover process. The UN 6*b* then stores these pieces of information into the adjacent node context information section within the context ID mapping table (see FIG. 39). After that, the UN 6*b* stores the handover target cell ID "c2", the context ID "ub" of its own for the handover target base station, the node ID "n2" of its own, and the data path information [Iub, Pub, Fub], as well as the node ID "n1-2", the context ID "r1", and the data path information [Ir1, Pr1, Fr1] of the core node RN-D 6*a*-2 into a handover request message (indicated as a "Hanover Request"). Then the UN 6*b* transmits the handover request message to the IP address and the destination port at the RN-N 6*a*-3 that have been determined as described above (step S102).

When having received the handover request message at step S102 described above, the RN-N 6*a*-3 first determines the handover target base station to which the message is to be transferred based on the ID "c2" of the handover target cell contained in the handover request message that has been received. For this purpose, the RN-N 6*a*-3 refers to the cell ID/node ID mapping table (see FIG. 6). According to the table, it is understood that the handover target cell "c2" is the cell of the node ID "n4". Thus, the RN-N 6*a*-3 further refers to the path table (see FIG. 37) and determines the IP address Iv, d, n4 and the destination port Pv, d, n4 as the destination of the handover request message.

After that, the RN-N 6*a*-3 stores the node ID "n2", the context ID "ub", the data path information [Iub, Pub, Fub] of the handover source base station that are contained in the handover request message as a node #1's node ID, a node #1's context ID, and a node #1's data path, respectively, in the node #1 context information section of the second sub-record within the context ID mapping table stored therein. Similarly, the RN-N 6*a*-3 stores the node ID "n4" as the node #2's node ID in the node #2 context information section of the second sub-record, to be used as the node ID of the handover target base station. The RN-N 6*a*-3 specifies the entries into which these pieces of information are stored by using the UE ID stored in the handover request message.

Also, for the purpose of operating as a relay point for the signaling messages and the user data that are transmitted and received between the UN 6*b* and the UN 6*c*, the RN-N 6*a*-3 assigns a context ID "r3" and data path information [Ir3, Pr3, Fr3] to the UN 6*b* and stores the context ID and the data path information as a node's own context ID and a node's own data path in the node #1 context information section of the second sub-record within the context ID mapping table, respectively. Similarly, the RN-N 6*a*-3 assigns the context ID "r4" and the data path information [Ir4, Pr4, Fr4] to the UN 6*c* and stores the context ID and the data path information as a node's own context ID and a node's own data path in the node #2 context information section of the second sub-record within the context ID mapping table, respectively. Further, the RN-N 6*a*-3 rewrites the node ID "n2", the context ID "ub", and the data path information [Iub, Pub, Fub] of the UN 6*b* that are contained in the received handover request message with the node ID "n1-3" of its own as well as the context ID "r4" and the data path information [Ir4, Pr4, Fr4] that have been supplied to the UN 6*c*. Then the RN-N 6*a*-3 transmits the handover request message to the destination IP address and the destination port of the UN 6*c* obtained as described above (step S103).

After having received the handover request message from the RN-N 6*a*-3 at step S103 described above, the handover target base station UN 6*c* extracts the node ID "n1-3", the context ID "r4", and the data path information [Ir4, Pr4, Fr4] of the handover source base station out of the message. Then the UN 6*c* stores the extracted result as an adjacent node's node ID, an adjacent node's context ID, and an adjacent node's data path, respectively, in the adjacent node context information section within the context ID mapping table. The entry into which these parameters are stored is determined based on the UE ID "u1" that has been set in the handover request message, as described above.

Further, the UN 6*c* extracts the node ID "n1-2", the context ID "r1", and the data path information [Ir1, Pr1, Fr1] of the core node from the handover request message. Then the UN 6*c* stores the extracted result as a core node's node ID, a core node's context ID, and a core node's data path, respectively, in the core node context information section within the context ID mapping table.

Subsequently, the UN 6*c* assigns the context ID "uc" and the data path information [Iuc, Puc, Fuc] on the UN 6*c* side that are used when the UN 6*c* transmits and receives signaling messages and user data to and from the handover source base station during the handover process. The UN 6*c* then stores the assigned parameters as a node's own context ID and a node's own data path, respectively, in the adjacent node context information section within the context ID mapping table. Similarly, the UN 6*c* assigns the context ID "u'" and the data path information [Iu', Pu', Fu'] to the core node for the purpose of transmitting and receiving signaling messages and user data to and from the core node after the handover has been completed. The UN 6*c* then stores the context ID and the data path information as a node's own context ID and a node's own data path in the core node context information section, respectively. FIG. 41 is a drawing showing the context ID mapping table of the UN 6*c* after the parameters extracted from the received handover request message and the parameters supplied by the UN 6*c* have been stored therein.

When the update of the context ID mapping table has been completed, the UN 6*c* generates a handover response message (indicated as a "Handover Response"). In this situation, the UN 6*c* sets the context ID "uc" for the handover source base station as the source context ID and sets the context ID "r4" on the handover source base station side obtained from the handover request message as the destination context ID. After that, the UN 6*c* sets the data path information [Iuc, Puc, Fuc] assigned for the handover source base station into the handover response message and transmits the handover response message to the RN-N 6*a*-3 (step S104).

When having received the handover response message from the UN 6*c* at step S104 described above, the RN-N 6*a*-3 extracts the context ID "uc" and the data path information [Iuc, Puc, Fuc] of the UN 6*c* out of the received message and stores the extracted result into the context ID mapping table stored therein. The positions of the entries into which the extracted pieces of information are stored are the node #2's context ID and the node #2's data path in the node #2 context information section of the second sub-record in the record in which the node's own context ID in the node #2 context information section of the second sub-record matches the destination context ID "r4" contained in the handover response message.

After that, the RN-N 6*a*-3 obtains the node's own context ID "r3" and the node #1's context ID "ub" out of the node #1 context information section of the second sub-record within the record that has been found in the search. The RN-N 6*a*-3 then rewrites the source context ID "uc" and the destination context ID "r4" contained in the received handover response message with the obtained pieces of information, respectively. Further, the RN-N 6*a*-3 rewrites the data path information [Iuc, Puc, Fuc] on the UN 6*c* side contained in the message with the data path information [Ir3, Pr3, Fr3] on the RN-N 6*a*-3 side that has been stored as the node's own data path in the node #1 context information section. Subsequently, the RN-N 6*a*-3 obtains the destination IP address Iv, d, n2 and the destination port Pv, d, n2 corresponding to individual control messages for the UN 6*b*, which is identified with the node #1's node ID "n2", out of the path table (see FIG. 37). The RN-N 6*a*-3 then transmits the handover response message (step S105). FIG. 42 is a drawing showing the context ID mapping table of the RN-N 6*a*-3 at the point in time when the process at step S105 has been completed.

When having received the handover response message from the RN-N 6*a*-3 at step S105 described above, the handover source base station UN 6*b* extracts the node ID "n1-3", the context ID "r3", and the data path information [Ir3, Pr3, Fr3] of the RN-N 6*a*-3 out of the message and stores the extracted result into the context ID mapping table stored therein. The positions of the entries in the table into which the extracted pieces of information are stored are the adjacent node's node ID, the adjacent node's context ID, and the adjacent node's data path in the record in which the node's own context ID in the adjacent node context information section matches the destination context ID "ub" contained in the handover response message. FIG. 43 is a drawing showing the context ID mapping table of the UN 6*b* after the parameters extracted from the handover response message and the parameters stored when the handover request was transmitted at step S102 described above have been set therein.

According to the context ID mapping tables that have been generated through the procedures performed at steps S102 through S105 described above, the handover source base station UN 6*b* and the handover target base station UN 6*c* transmit and receive the signaling messages and transfer the user data during the handover process, according to the procedure described in (R-I) through (R-IV) in the first embodiment. It should be noted, however, that the RN-D 6*a*-2 plays the role of the RN 6*a* in the procedure.

After the transfer path used for transferring the signaling messages and the user data during the handover process has been established between the handover source base station UN 6*b* and the handover target base station UN 6*c* as described above, the handover source base station UN 6*b* transmits a handover execution command (indicated as a "Handover Command") to the UE (step S106).

When having received the handover execution command, the UE changes the connection target base station thereof from the UN 6*b* to the UN 6*c* and, after a wireless connection has been established, the UE notifies the UN 6*c* that the handover has been completed (indicated as a "Handover Commit") (step S107).

When having been notified by the UE that the handover has been completed at step S107 described above, the handover target base station UN 6*c* conducts a search in the context ID mapping table (see FIG. 41) by using the UE ID stored in the received notification or by using the UE ID that has indirectly been derived from a wireless resource being used such as a reception frequency or a slot. The UN 6*c* then obtains the core node's node ID "n1-2" and the core node's context ID "r1" from the core node context information in the record that has been found in the search. Further, the UN 6*c* obtains the IP address Iv, d, n1-2 and the destination port Pv, d, n1-2 out of the path table (see FIG. 38).

Subsequently, the UN 6*c* sets the destination context ID "r1", as well as the node's own context ID "u'" and the node's own data path [Iu', Pu', Fu'] in the core node context information that have been extracted from the record found in the search into the message (indicated as a "Handover Confirm") that has been transmitted by the UE to notify that the handover had been completed. Then the UN 6*c* transmits the message to the IP address and the destination port described above (step S108).

When having received the handover completion notification from the UE at step S108 described above, the RN-D 6*a*-2 extracts the node ID "n4", the context ID "u'", and the data path information [Iu', Pu', Fu'] of the handover target base station UN 6*c* out of the handover completion message. The RN-D 6*a*-2 then rewrites the node #1's node ID, the node #1's context ID, and the node #1's data path that are listed in the node #1 context information section of the first sub-record within the context ID mapping table (see FIG. 16) with the extracted pieces of information, respectively. The record that is to be rewritten as thus is specified by searching for the destination context "r1" stored in the handover completion notification in the node's own context ID stored in the node #1 context information section of the first sub-records within the table. FIG. 44 is a drawing showing the context ID mapping table of the RN-D 6*a*-2 after the handover has been completed.

After that, according to the new table, the RN-D 6*a*-2 relays the signaling messages and the user data between the AGW 3 and the UN 6*c* according to the procedure described in (C-I) through (C-IV) in the first embodiment. It should be noted, however, that the RN-D 6*a*-2 plays the role of the RN 6*a* in the procedure.

As appreciated from FIGS. 16, 42, and 44, the RN-D 6*a*-2 does not use the second sub-records, whereas the RN-N 6*a*-3 does not use the first sub-records. The reason is that the RN-D 6*a*-2 relays only the signaling messages and the user data between the AGW 3 and the UNs, whereas the RN-N 6*a*-3 relays only the signaling messages and the user data between the adjacent base stations, i.e., between the UNs. However, as explained in the section titled "Handover from the VBS 6 to the NBS 5" below, there is a situation in which the RN-N 6*a*-3 uses the first sub-records. Thus, the structure of the tables is not changed. Also, no context ID mapping table is managed in the RN-C 6*a*-1 because RN-C 6*a*-1 does not deal with user contexts.

When the RN-D 6*a*-2 has completed a process to update the entries in the context ID mapping table corresponding to the handover UE and a process to change the path used for transmitting the signaling messages and the user data to the handover target base station UN 6*c*, the RN-D 6*a*-2 transmits a confirmation message (indicated as a "Handover Confirm Ack") to the UN 6*c* (step S109).

After the handover target base station UN 6*c* has received the confirmation message from the RN-D 6*a*-2 at step S109 described above, the UN 6*c* notifies, via the RN-N 6*a*-3, the handover source base station UN 6*b* that the handover has been completed (indicated as a "Handover Complete") (steps S110 and S111). At the same time, being triggered by the relaying of the message, the RN-N 6*a*-3 recognizes that the handover from the UN 6*b* to the UN 6*c* has been completed, releases the context ID, the data path information, the data buffer, and the like that have been secured for relaying the signaling and the user data between the UN 6*b* and the UN 6*c*, and deletes the entries corresponding to the handover user from the context ID mapping table.

When having received the handover completion message at step S111 described above, the handover source base station UN 6*b* releases the wireless resource, the user data buffer, the ID, and the like that have been secured for the handover user, deletes the relevant table entries, and thus completes the handover process.

During the relay process of the signaling messages and the user data between the handover source base station UN 6*b* and the handover target base station UN 6*c* described above, the RN-N 6*a*-3 individually assigns the context IDs and the pieces of data path information to the UN 6*b* and to the UN 6*c*; however, the context IDs and the pieces of data path information may be the same as one another. In other words, r3=r4; Ir3=Ir4; Pr3=Pr4; and Fr3=Fr4 may be satisfied. Furthermore, as for the user data, it is acceptable to configure to transfer the data directly between the UN 6*b* and the UN 6*c* by having an arrangement in which Ir3=Iuc; Pr3=Puc; Fr3=Fuc; Ir4=Iub; Pr4=Pub; and Fr4=Fub are satisfied.

(2) Handover From the VBS 6 to the NBS 5

As described in the section titled "Handover between the UNs within the VBS 6" above, the UE has performed the outgoing communication sequence and is currently performing communication with the UN 6*b* while being subordinate to the UN 6*b*. It is assumed that, with respect to the handover UE, the UN 6*b* and the RN-D 6*a*-2 have the entries shown in FIGS. 39 and 16 stored in the context ID mapping tables, respectively.

Figure 45:
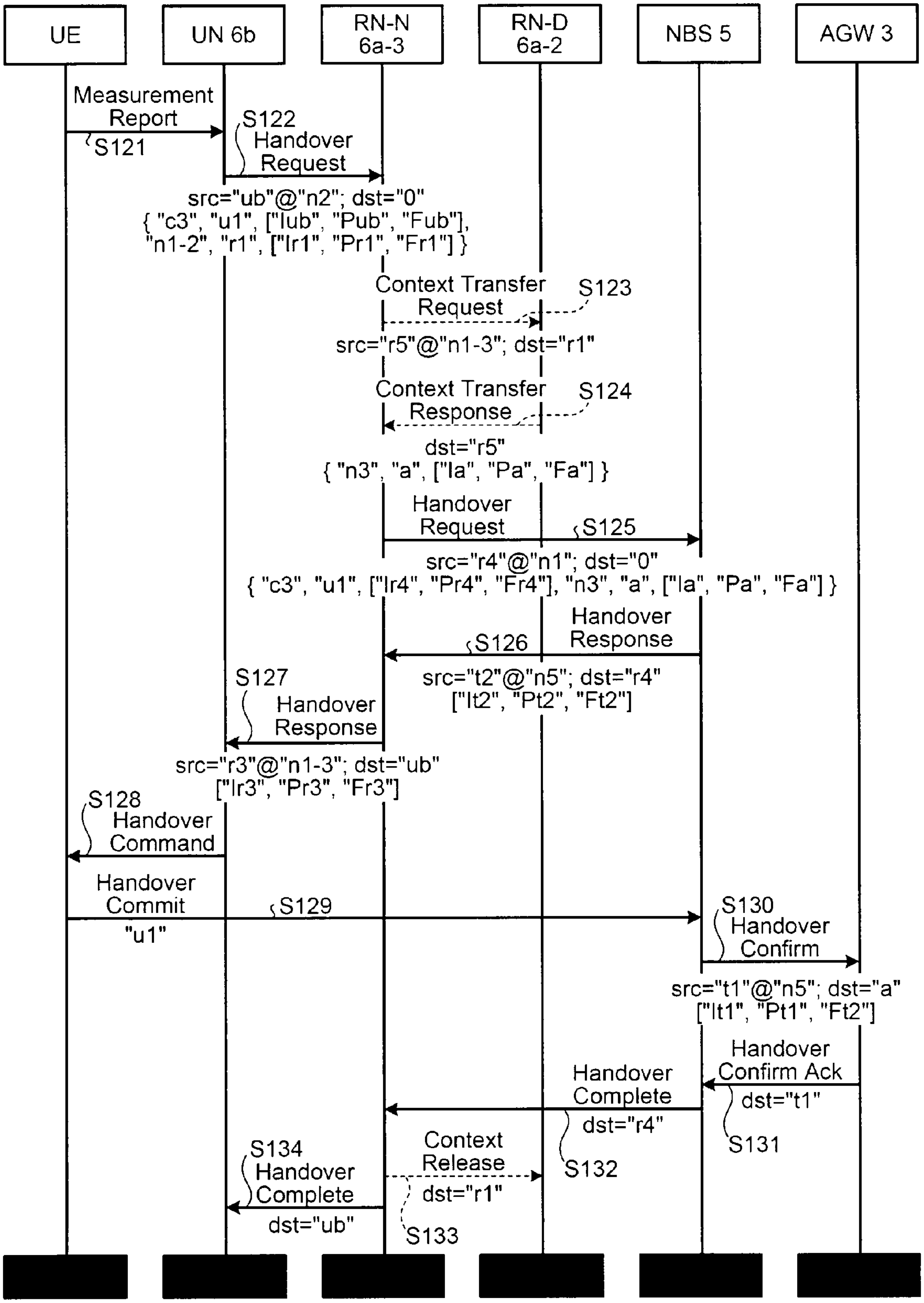
FIG. 45 is a diagram showing an example of an operational sequence that is performed when a handover is performed from the VBS to an NBS according to the second embodiment.

FIG. 45 is a diagram showing an operational sequence that is used when a handover is performed from the VBS 6 to the NBS 5 according to the second embodiment. The handover source base station is the UN 6*b*, whereas the handover target base station is the NBS 5.

Because the communication quality of the cell of which the UN 6*b* is in charge has degraded, the UE searches for a neighboring cell and notifies the UN 6*b* of the ID of a cell that has good communication quality and can be a handover candidate as well as a measured result of the communication quality thereof as measurement information (indicated as a "Measurement Report") (step S121).

Based on the measured result that has been received, the UN 6*b* first selects the cell (identified with the cell ID "c3") of which the NBS 5 is in charge as the handover target and determines the IP address and the destination port of the base station to which a handover request is to be transmitted based on the ID "c3" of the handover target cell contained in the measurement information; however, the UN 6*b* has only the information about the cell of its own in the cell ID/node ID mapping table (see FIG. 7). Thus, the UN 6*b* recognizes that the handover target cell is a cell that is subordinate to a different core node and determines the IP address Iv, d, n1-3 and the destination port Pv, d, n1-3 that are used as the destination of the handover request for the mobility control core node RN-N 6*a*-3, by referring to the path table shown in FIG. 39.

Subsequently, the UN 6*b* assigns the context ID "ub" and the data path information [Iub, Pub, Fub] on the UN 6*b* side that are used when signaling messages and user data are transmitted and received between the UN 6*b* and the handover target base station NBS 5 during the handover process. Then the UN 6*b* stores the context ID and the data path information into the adjacent node context information section within the context ID mapping table (see FIG. 39). After that, the UN 6*b* stores the handover target cell ID "c3", the context ID "ub" of its own, the node ID "n2" of its own, and the data path information [Iub, Pub, Fub] for the handover target base station, as well as the node ID "n1-2", the context ID "r1", and the data path information [Ir1, Pr1, Fr1] of the core node RN-D 6*a*-2 into a handover request message (indicated as a "Hanover Request"). Then the UN 6*b* transmits the handover request message to the IP address and the destination port at the RN-N 6*a*-3 that have been determined as described above (step S122).

When having received the handover request message at step S122 described above, the RN-N 6*a*-3 first determines the handover target base station to which the message is to be transferred based on the ID "c3" of the handover target cell contained in the handover request message. For this purpose, the RN-N 6*a*-3 refers to the cell ID/node ID mapping table (see FIG. 6). According to the table, it is appreciated that the handover target cell "c3" is the cell of the node ID "n5". Further, the RN-N 6*a*-3 refers to the path table (see FIG. 37) and determines the IP address In, d, n5 and the destination port Pn, d, n5 that are used as the destination of the handover request message.

After that, the RN-N 6*a*-3 stores the node ID "n2", the context ID "ub", and the data path information [Iub, Pub, Fub] of the handover source base station that are contained in the handover request message, as the node #1's node ID, the node #1's context ID, and the node #1's data path, respectively, in the node #1 context information section of the second sub-record within the context ID mapping table stored therein. At the same time, the RN-N 6*a*-3 stores the node ID "n5" that has been derived from the cell ID as the node #2's node ID in the node #2 context information section of the second sub-record, to be used as the node ID of the handover target base station. Further, for the purpose of relaying the signaling messages and the user data that are transmitted and received between the UN 6*b* and the NBS 5, the RN-N 6*a*-3 assigns the context ID "r3" and the data path information [Ir3, Pr3, Fr3] to the UN 6*b* and assigns the context ID "r4" and the data path information [Ir4, Pr4, Fr4] to the NBS 5. Further, the RN-N 6*a*-3 stores the former as a node's own context ID and a node's own data path in the node #1 context information section of the second sub-record within the context ID mapping table. Also, the RN-N 6*a*-3 stores the latter as a node's own context ID and a node's own data path in the node #2 context information section of the second sub-record.

Because the node type of the handover target base station NBS 5 is an adjacent node, the RN-N 6*a*-3 determines that the handover request message should be related to the outside of the VBS 6. When a handover is performed to a base station on the outside of the VBS 6, the signaling messages and the user data between the AGW 3 and the UN 6*b* that are currently relayed by the RN-D 6*a*-2 will be directly transmitted and received between the AGW 3 and the NBS 5. Thus, it is necessary to notify the NBS 5 of the context ID and the data path information for the handover UE that are used by the AGW 3. Thus, with respect to the handover UE, the RN-N 6*a*-3 inquires about the context ID and the data path information on the AGW 3 side that are managed by the RN-D 6*a*-2 (step S123).

In this situation, in an inquiry message (indicated as a "Context Transfer Request") transmitted from the RN-N 6*a*-3 to the RN-D 6*a*-2, the RN-N 6*a*-3 sets a context ID "r5" that is newly assigned on the RN-N 6*a*-3 side as the source context ID, sets the node ID "n1-3" of its own as the source node ID, and sets the context ID "r1" on the RN-D 6*a*-2 side that has been received from the UN 6*b* at step S122 described above as the destination context ID. Further, the RN-N 6*a*-3 determines the destination IP address and the destination port as Iv, c, n1-2 and Pv, c, n1-2, respectively, which are the destination of common control messages for the RN-D 6*a*-2. (The reason is that this inquiry is used only for transferring the data, and not for establishing a session regarding the handover UE between the RN-N 6*a*-3 and the RN-D 6*a*-2). The RN-N 6*a*-3 stores the assigned context ID "r5" as the node's own context ID in the node #1 context information section of the first sub-record in the entry that corresponds to the UE within the context ID mapping table. Further, the RN-N 6*a*-3 stores the node ID "n1-2" and the context ID "r1" of the RN-D 6*a*-2, which is the destination of the inquiry message, as a node #1's node ID and a node #1's context ID, respectively, in the node #1 context information section.

When having received the inquiry message from the RN-N 6*a*-3 at step S123 describe above, the RN-D 6*a*-2 conducts a search in the context ID mapping table (see FIG. 16) for a record in which the node's own context ID listed in the node #1 context information section of the first sub-record matches the destination context ID "r1" contained in the message. The RN-D 6*a*-2 then refers to the node #2 context information section of the first sub-record in the record found in the search and obtains the context ID "a" and the data path information [Ia, Pa, Fa] on the AGW 3 side as well as the node ID "n3" of the AGW 3 corresponding to the UE context. After that, the RN-D 6*a*-2 conducts a search in the path table (see FIG. 36) for the source node ID "n1-3" of the inquiry message and obtains the IP address Iv, c, n1-3 and the destination port Pv, c, n1-3 used as the destination of a response message. (The reason why the IP address and the destination port serving as the destination of common control messages are used is explained above in the description of the operation to transmit the inquiry message from the RN-N 6*a*-3 to the RN-D 6*a*-2.) The RN-D 6*a*-2 then returns the obtained context information on the AGW 3 side to the RN-N 6*a*-3 (step S124).

The RN-N 6*a*-3 extracts the context ID “a” and the data path information [Ia, Pa, Fa] on the AGW 3 side and the node ID “n3” of the AGW 3 from the response message (indicated as a “Context Transfer Response”) that has been received at step S124 described above. Further, the RN-N 6*a*-3 stores the extracted pieces of information as a node #2's context ID, a node #2's data path, and a node #2's node ID, respectively, in the node #2 context information section of the first sub-record in the entry corresponding to the handover UE within the context ID mapping table. Further, the RN-N 6*a*-3 rewrites the core node context information section (i.e., the context ID “r1”, the data path information [Ir1, Pr1, Fr1], and the node ID “n1-2” of the RN-D 6*a*-2) of the handover request message received from the UN 6*b* at step S122 described above. In addition, the RN-N 6*a*-3 rewrites the context ID “ub” and the data path information [Iub, Pub, Fub] on the UN 6*b* side and the node ID “n2” of the UN 6*b* that are contained in the response message, with the context ID “r4” and the data path information [Ir4, Pr4, Fr4] that have been assigned by the RN-N 6*a*-3 for the NBS 5 and the node ID “n1” of the RN-N 6*a*-3 for the adjacent base stations, respectively. The RN-N 6*a*-3 then transmits the response message to the destination IP address and the destination port at the NBS 5 that have been obtained as described above (step S125).

After having received the handover request message from the RN-N 6*a*-3 at step S125 described above, the handover target base station NBS 5 extracts the node ID “n1”, the context ID “r4”, and the data path information [Ir4, Pr4, Fr4] of the handover source base station out of the message. Then the NBS 5 stores the extracted result as an adjacent node's node ID, an adjacent node's context ID, and an adjacent node's data path, respectively, in the adjacent node context information within the context ID mapping table. The entry into which these parameters are stored is determined based on the UE ID “u1” that has been set in the handover request message, as described above.

Further, the NBS 5 extracts the node ID “n3”, the context ID “a”, and the data path information [Ia, Pa, Fa] of the core node from the handover request message and stores the extracted result as a core node's node ID, a core node's context ID, and a core node's data path, respectively, in the core node context information within the context ID mapping table.

Subsequently, the NBS 5 assigns the context ID “t2” and the data path information [It2, Pt2, Ft2] on the NBS 5 side that are used when the NBS 5 transmits and receives signaling messages and transfer data to and from the handover source base station during the handover process. The NBS 5 then stores the assigned parameters as a node's own context ID and a node's own data path, respectively, in the adjacent node context information within the context ID mapping table. Similarly, the NBS 5 assigns the context ID “t1” and the data path information [It1, Pt1, Ft1] on the NBS 5 side to the AGW 3 for the purpose of transmitting and receiving signaling messages and user data to and from the AGW 3 after the handover has been finished. The NBS 5 then stores the context ID and the data path information as a node's own context ID and a node's own data path in the core node context information. As a result, like in the first embodiment, the NBS 5 has obtained the entry corresponding to the handover UE as shown in FIG. 27 in the context ID mapping table.

When the update of the context ID mapping table has been completed, the NBS 5 generates a handover response message (indicated as a “Handover Response”). In this situation, the NBS 5 sets the node's own context ID “t2” shown in the adjacent node context information stored in the context ID mapping table described above as the source context ID and sets the adjacent node's context ID “r4” shown in the adjacent node context information as the destination context ID. Further, the NBS 5 sets the node's own data path [It2, Pt2, Ft2] shown in the adjacent node context information into the handover response message and transmits the handover response message to the node identified with the node ID “n1” (step S126). The NBS 5 obtains In, d, n1 and Pn, d, n1 as the IP address and the destination port, respectively, that are used as the destination at the node ID “n1” out of the path table (see FIG. 3).

When having received the handover response message from the NBS 5 at step S126 described above, the RN-N 6*a*-3 extracts the context ID “t2” and the data path information [It2, Pt2, Ft2] of the NBS 5 out of the received message and stores the extracted information into the context ID mapping table stored therein. The positions of the entries in the table into which the extracted pieces of information are stored are the node #2's context ID and the node #2's data path in the node #2 context information section of the second sub-record in the record in which the node's own context ID in the node #2 context information section of the second sub-record matches the destination context ID “r4” contained in the received message.

After that, the RN-N 6*a*-3 obtains the node's own context ID “r3” and the node #1's context ID “ub” out of the node #1 context information section of the second sub-record in the matching record found in the search described above. The RN-N 6*a*-3 then rewrites the source context ID “t2” and the destination context ID “r4” contained in the handover response message with the obtained pieces of information, respectively. Further, the RN-N 6*a*-3 rewrites the source node ID with the node ID “n1-3” of its own within the VBS 6.

In addition, the RN-N 6*a*-3 rewrites the data path information [It2, Pt2, Ft2] on the NBS 5 side contained in the handover response message with the data path information [Ir3, Pr3, Fr3] on the RN-N 6*a*-3 side that has been stored as the node's own data path in the node #1 context information section of the second sub-record. Subsequently, after rewriting the destination IP address and the destination port with the destination IP address Iv, d, n2 and the destination port Pv, d, n2 at the UN 6*b*, which is identified with the node #1's node ID “n2”, the RN-N 6*a*-3 transmits the handover response message (step S127). At this point in time, the RN-N 6*a*-3 has stored therein the information that is required for relaying the signaling messages and the user data between the NBS 5 and the UN 6*b*, in the entry corresponding to the handover UE as shown in FIG. 46 within the context ID mapping table.

The operation performed at steps S128 through S132 above is the same as the operation performed at steps S66 through S70 shown in FIG. 25 explained in the section titled “(2) Handover from the VBS 6 to the NBS 5” in the first embodiment. Thus, the explanation thereof will be omitted. It should be noted, however, that the context ID mapping table obtained by the UN 6*b* at the point in time when the process at step S127 has been completed is different in terms of the node ID of the RN-N 6*a*-3 serving as the relay node and is shown in FIG. 43.

When having received the handover completion message from the handover target base station NBS 5 at step S132 described above, the RN-N 6*a*-3 first conducts a search in the context ID mapping table (see FIG. 46) for a record in which the node's own context ID in the node #2 context information section of the second sub-record matches the destination context ID "r4" contained in the message. The RN-N 6a-3 then obtains the node ID "n1-2" and the context ID "r1" of the RN-D 6a-2 from the node #1's node ID and the node #1's context ID, respectively, in the node #1 context information section of the first sub-record in the record that has been found in the search. Further, the RN-N 6a-3 transmits a message (indicated as a "Context Release") requesting that the relay process between the AGW 3 and the UN 6b performed by the RN-D 6a-2 with respect to the handover UE should be stopped and that the context should be released, to the destination IP address Iv, c, n1-2 and the destination port Pv, c, n1-2 corresponding to common control messages that have been obtained by referring to the path table (see FIG. 35) based on the node ID "n1-2" of the RN-D 6a-2 (step S133).

Subsequently, the RN-N 6a-3 transfers the handover completion message received from the NBS 5 to the UN 6b according to the procedure described in (R-II) above (step S134). At the same time, the RN-N 6a-3 releases the entries in the context ID mapping table, the user data buffer, the context ID, and the like that have been secured for the handover UE.

When having received the context release message from the RN-N 6a-3 at step S133 described above, the RN-D 6a-2 conducts a search in the context ID mapping table (see FIG. 16) for a record in which the node's own context ID in the node #1 context information section of the first sub-record matches the destination context ID "r1" contained in the message. The RN-D 6a-2 then stops the relay process between the AGW 3 and the UN with respect to the UE corresponding to the record that has been found in the search and releases the relevant entries in the context ID mapping table, the user data buffer, the context ID, and the like.

When having received the handover completion message at step S134 described above, the handover source base station UN 6b releases the wireless resource, the user data buffer, the ID, and the like that have been secured for the handover user, deletes the relevant table entries, and thus completes the handover process.

During the handover process described above, the RN-N 6a-3 provides the function to relay the signaling messages and the user data between the handover source base station UN 6b and the handover target base station NBS 5. In that situation, the context IDs and the pieces of data path information that are individually supplied to the UN 6b and to the NBS 5 for the relay purposes may be the same as one another. In other words, r3=r4; Ir3=Ir4; Pr3=Pr4; and Fr3=Fr4 may be satisfied. Furthermore, as for the user data, it is acceptable to configure the data to be directly transferred between the UN 6b and the NBS 5 by having an arrangement in which Ir3=It2; Pr3=Pt2; Fr3=Ft2; Ir4=Iub; Pr4=Pub; and Fr4=Fub are satisfied.

(3) Handover From the NBS 5 to the VBS 6

The UE is currently performing communication in a cell that is subordinate to the NBS 5. Also, after the outgoing communication sequence has been performed, for the purpose of transmitting and receiving the signaling messages and the user data between the AGW 3 and the NBS 5, the context ID "a" and the data path information [Ia, Pa, Fa] have been assigned on the AGW 3, whereas the context ID "t1" and the data path information [It1, Pt1, Ft1] have been assigned on the NBS 5 side. In this situation, as explained in the section titled "(3) Handover from the NBS 5 to the VBS 6" in the first embodiment, the entry corresponding to the handover UE within the context ID mapping table stored in the NBS 5 is shown in FIG. 29.

Figure 47:
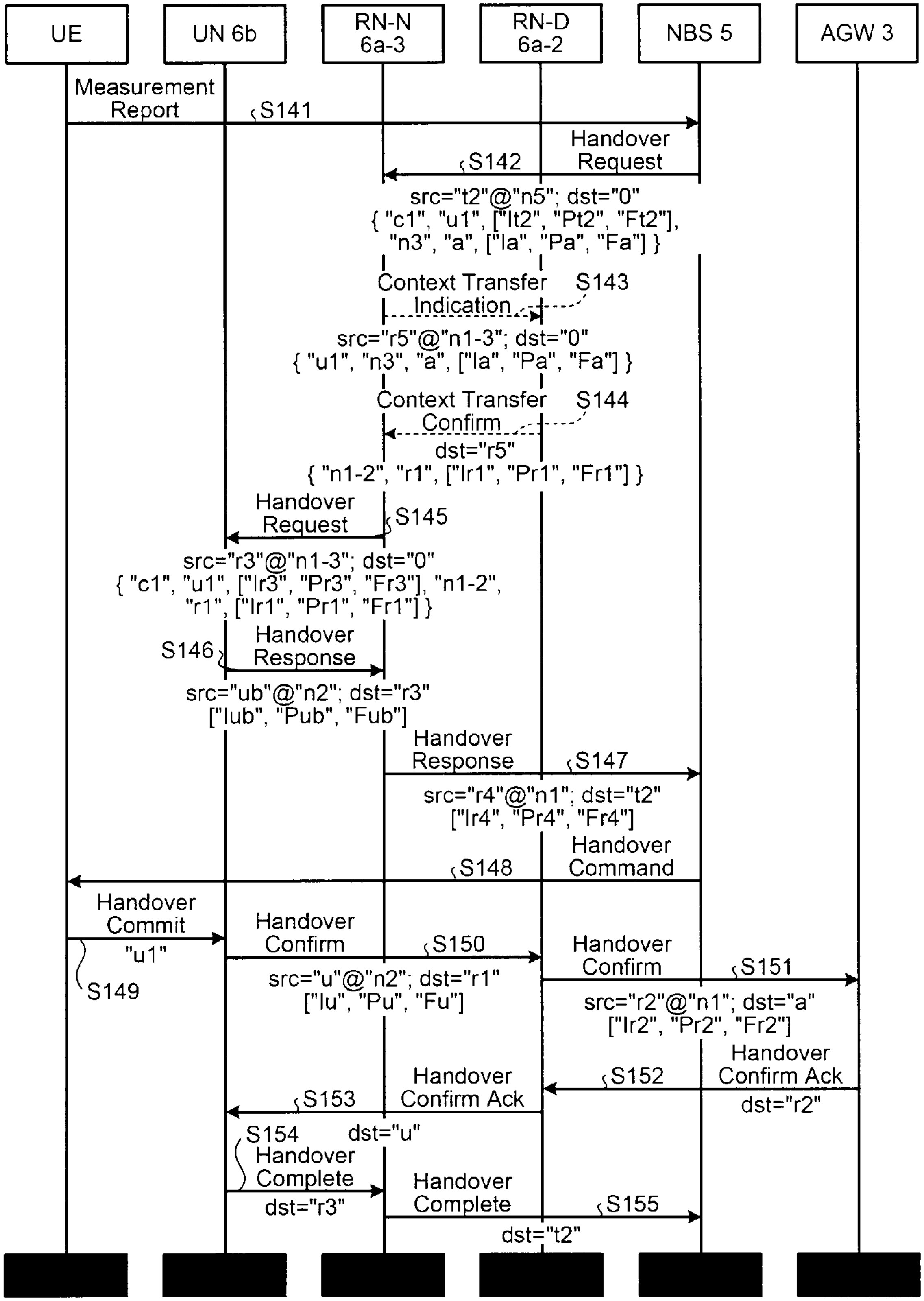
FIG. 47 is a diagram showing an example of an operational sequence that is performed when a handover is performed from the NBS to the VBS according to the second embodiment.

FIG. 47 is a diagram showing an operational sequence that is used when a handover is performed from the NBS 5 to the VBS 6 according to the second embodiment. The handover source base station is the NBS 5, whereas the handover target base station is the UN 6b.

Because the communication quality of the cell of which the NBS 5 is in charge has degraded, the UE searches for a neighboring cell and notifies the NBS 5 of the ID of a cell that has good communication quality and can be a handover candidate as well as a measured result of the communication quality thereof as measurement information (indicated as a "Measurement Report") (step S141).

Based on the measured result that has been received, the NBS 5 first selects the cell (identified with the cell ID "c1") of which the UN 6b is in charge as the handover target. The NBS 5 then refers to the cell ID/node ID mapping table (see FIG. 5) and searches for the ID "c1" of the handover target cell contained in the measurement information and obtains the node ID "n1" of the base station to which a handover request is to be transmitted. Further, by referring to the path table (see FIG. 3), the NBS 5 determines the destination IP address In, d, n1 and the destination port Pn, D, n1 to transmit a handover request message to the base station identified with the node ID "n1".

Subsequently, the NBS 5 assigns the context ID "t2" and the data path information [It2, Pt2, Ft2] on the NBS 5 side that are used when signaling messages and user data are transmitted and received between the NBS 5 and the handover target base station during the handover process. The NBS 5 then stores the context ID and the data path information together with the node ID "n3", the context ID "a", and the data path information [Ia, Pa, Fa] of the core node AGW 3 into a handover request message (indicated as a "Handover Request") and transmits the handover request message to the IP address and the destination port that have been determined as described above (step S142). In this situation, the NBS 5 stores the context ID and the data path information that have been assigned with respect to the handover UE, as a node's own context ID and a node's own data path in the adjacent node context information within the context ID mapping table (see FIG. 29).

When having received the handover request message at step S142 described above, because the destination context ID contained in the message indicates that a new context should be generated (when the context ID is "0", it means that a new context should be generated, according to the second embodiment), the RN-N 6a-3 first generates a context corresponding to the handover UE. For this purpose, the RN-N 6a-3 first extracts the UE ID "u1" of the handover UE from the handover request message and adds an entry (i.e., a record) in which the UE ID is a key to the context ID mapping table. The RN-N 6a-3 then extracts the node ID "n5", the content ID "t2", and the data path information [It2, Pt2, Ft2] of the handover source base station out of the handover request message and stores the extracted pieces of information as a node #1's node ID, a node #1's context ID, and a node #1's data path, respectively, in the node #1 context information section of the second sub-record in the newly added record.

Subsequently, the RN-N 6a-3 extracts the ID "c1" of the handover target cell from the handover request message and obtains the node ID "n2" of the handover target base station by referring to the cell ID/node ID mapping table (see FIG. 6). Further, when the RN-N 6a-3 has determined that the handover source base station (identified with the node ID "n5") is a base station on the outside of the VBS 6, whereas the handover target base station (identified with the node ID "n2") is a base station within the VBS 6, by referring to the path table (see FIG. 37), the RN-N 6a-3 prepares for the following two relay processes: a relay process performed by the RN-N 6a-3 to relay the signaling messages and the user data between the handover source base station NBS 5 and the handover target base station UN 6b during the handover process; and another relay process performed by the RN-D 6a-2 to relay the signaling messages and the user data between the core node AGW 3 and the handover target base station UN 6b after the handover process has been completed.

For this purpose, the RN-N 6a-3 first transmits a message (indicated as a "Context Transfer Indication") to the RN-D 6a-2 to request that the RN-D 6a-2 should perform the process to relay the signaling messages and the user data between the AGW 3 and the UN 6b (step S143). In this situation, the RN-N 6a-3 extracts the ID "u1" of the handover UE as well as the node ID "n3", the context ID "a", and the data path information [Ia, Pa, Fa] of the core node AGW 3 that are required when the RN-D 6a-2 generates a context ID mapping table and performs the relay process, out of the handover request message received from the handover source base station NBS 5 at step S142 described above, and sets the extracted pieces of information into the message to be transmitted. The RN-N 6a-3 stores these extracted pieces of core node information as the node #1's node ID and the node #1's context ID in the node #1 context information section of the first sub-record in the record corresponding to the handover UE within the context ID mapping table. The data path information [Ia, Pa, Fa] of the core node AGW 3 is only needed by the RN-D 6a-2, which performs the relay process of the user data to and from the AGW 3. Thus, after the data path information is provided for the RN-D 6a-2 at step S143, the RN-N 6a-3 does not need the data path information. Accordingly, the RN-N 6a-3 does not store the data path information into the context ID mapping table. For the purpose of being able to identify the context when the RN-N 6a-3 receives a response message from the RN-D 6a-2 in response to the transmitted message, the RN-N 6a-3 newly assigns a context ID "r5" and sets the newly assigned context as the source context ID of the message transmitted at step S143 described above. The RN-N 6a-3 also stores the assigned context ID as a node's own context ID in the node #2 context information section of the first sub-record.

As explained in the section titled "(2) Handover from the VBS 6 to the NBS 5" above, the signaling message transmitted from the RN-N 6a-3 to the RN-D 6a-2 at step S143 is transmitted to the destination IP address Iv, c, n1-2 and the destination port Pv, c, n1-2 corresponding to common control messages for the RN-D 6a-2.

When having received the relay process request message with respect to the handover UE from the RN-N 6a-3 at step S143 described above, the RN-D 6a-2 adds a record in which the UE ID "u1" extracted from the message is a key to the context ID mapping table. After that, the RN-D 6a-2 stores the node ID "n3", the context ID "a", and the data path information [Ia, Pa, Fa] of the AGW 3 that have been extracted from the message, as a node #2's node ID, a node #2's context ID, and a node #2's data path, respectively, in the node #2 context information section of the first sub-record in the added record. Further, the RN-D 6a-2 assigns the context ID "r2" and the data path information [Ir2, Pr2, Fr2] on the RN-D 6a-2 side for the purpose of performing the relay process with the AGW 3 while using the context ID and the data path and stores the context ID and the data path information as a node's own context ID and a node's own data path in the context information section described above. Similarly, the RN-D 6a-2 also assigns the context ID "r1" and the data path information [Ir1, Pr1, Fr1] on the UN 6b side that performs the relay process with the AGW 3 and stores the context ID and the data path information as a node's own context ID and a node's own data path, respectively, in the node #1 context information section of the sub-record described above. Also, the RN-D 6a-2 notifies the RN-N 6a-3 of the context ID and the data path information as a response (indicated as a "Context Transfer Confirm") to the message described above (step S144).

The RN-D 6a-2 transmits the response message at step S144 described above to the destination IP address Iv, c, n1-3 and the destination port Pv, c, n1-3 corresponding to common control messages for the RN-N 6a-3, like the request message transmitted at step S143 described above. Further, the node ID "n1-2" of the source RN-D 6a-2 is provided in the response message because an application usage as explained below is possible: For example, in the case where there are a plurality of RN-Ds and where the RN-N 6a-3 transmits the request message to a default RN-D or to a randomly-selected RN-D at step S143 described above, the response message transmitted in response to the request message may be transmitted from another RN-D that is selected in consideration of distribution of loads or the like, and not from the RN-D that has received the request message.

When having received the response message from the RN-D 6a-2 at step S144 described above, the RN-N 6a-3 extracts the context ID "r1" and the data path information [Ir1, Pr1, Fr1] that have been assigned to the UN 6b by the RN-D 6a-2 as well as the node ID "n1-2" of the RN-D 6a-2, out of the message. The RN-N 6a-3 then stores the extracted result as a node #2's context ID, a node #2's data path, and a node #2's node ID, respectively, in the node #2 context information section of the first sub-record within the context ID mapping table. Also, the RN-N 6a-3 assigns the context ID "r4" and the data path information [Ir4, Pr4, Fr4] to the NBS 5 for the purpose of performing the process to relay the signaling messages and the user data between the handover source base station NBS 5 and the handover target base station UN 6b. In addition, the RN-N 6a-3 assigns the context ID "r3" and the data path information [Ir3, Pr3, Fr3] to the UN 6b. The RN-N 6a-3 stores the former as a node's own context ID and a node's own data path in the node #1 context information section of the second sub-record within the context ID mapping table. Further, the RN-N 6a-3 stores the latter as a node's own context ID and a node's own data path within the node #2 context information section of the second sub-record. Thus, the RN-N 6a-3 has completed the generating process of the required contexts. The RN-N 6a-3 rewrites the core node context information contained in the handover request message received at step S142 with the context information on the RN-D 6a-2 side, rewrites the context information of the handover source base station with the context information that has been created by the RN-N 6a-3 for the UN 6b, and transmits the handover request message to the UN 6b serving as the handover target base station (step S145).

The operation performed at steps S146 through S149 is the same as the operation performed at steps S84 through S87 shown in FIG. 28 explained in the section titled "(3) Handover from the NBS 5 to the VBS 6" in the first embodiment. Thus, the explanation thereof will be omitted. It should be noted, however, that the entries corresponding to the handover UE are stored in the respective context ID mapping tables, in the UN 6b as shown in FIG. 43 at the point in time when the process at step S145 has been completed; in the RN-N 6a-3 as shown in FIG. 48 at the point in time when the process at step S146 has been completed; and in the NBS 5 as shown in FIG. 27 at the point in time when the process at step S147 has been completed.

When having been notified by the UE that the handover has been completed at step S149 described above, the handover target base station UN 6*b* conducts a search in the context ID mapping table (see FIG. 43) by using the UE ID stored in the notification or by using the UE ID that has indirectly been derived from a wireless resource being used such as a reception frequency or a slot. The UN 6*b* then extracts the core node's node ID "n1-2" and the core node's context ID "r1" from the core node context information in the record that has been found in the search. Further, the UN 6*b* obtains the IP address Iv, d, n1-2 and the destination port Pv, d, n1-2 out of the path table (see FIG. 38).

Subsequently, the UN 6*b* sets the destination context ID "r1", as well as the node's own context ID "u" and the node's own data path [Iu, Pu, Fu] in the core node context information that have been extracted from the record found in the search, into a message (indicated as a "Handover Confirm") that has been transmitted by the UE to notify that the handover had been completed and transmits the message to the IP address and the destination port described above (step S150).

When having received the handover completion message at step S150 described above, the RN-D 6*a*-2 extracts the node ID "n2", the context ID "u", and the data path information [Iu, Pu, Fu] of the source out of the message. The RN-D 6*a*-2 then stores the extracted result as a node #1's node ID, a node #1's context ID, and a node #1's data path, respectively, in the node #1 context information section of the first sub-record within the context ID mapping table stored therein. FIG. 49 is a drawing showing the context ID mapping table that has been updated and stored in the RN-D 6*a*-2.

Subsequently, the RN-D 6*a*-2 extracts the forwarding destination node ID "n3" for the handover completion message out of the node #2 context information section of the first sub-record. Also, the RN-D 6*a*-2 obtains the IP address Ic, d, n3 and the destination port Pc, d, n3 that are used as the destination of the message out of the path table (see FIG. 36). In addition, the RN-D 6*a*-2 extracts the node's own context ID "r2", the node's own data path information [Ir2, Pr2, Fr2], and the node #2's context ID "a" from the context information section. Further, the RN-D 6*a*-2 rewrites the source context ID "u", the source data path information [Iu, Pu, Fu], and the destination context ID "r1" that are contained in the handover completion message with the extracted pieces of information respectively and transmits the handover completion message to the IP address and the destination port that have been obtained as described above (step S151). The node ID "n1", which is used for the nodes on the outside of the VBS 6, is used as the source node ID of the handover completion message.

When having received the handover completion message at step S151 described above, the AGW 3 recognizes that the target UE "u1" and the destination node NBS 5 of the signaling messages and the user data have completed the handover process, based on the destination context ID "a" contained in the message and changes the destination of the signaling messages and the user data thereafter in the following manner: The AGW 3 extracts the node ID "n1" and the context ID "r2" of the source from the handover completion message. Also, the AGW 3 obtains the destination IP address Ic, d, n1 and the destination port Pc, d, n1 of the signaling messages. In addition, the AGW 3 extracts the data path information [Ir2, Pr2, Fr2] that is stored in the handover completion message. The AGW 3 uses the obtained pieces of information as a new destination IP address, a new destination port, and a new data flow identifier of the user data.

The RN-D 6*a*-2 thereafter relays the signaling messages and the user data between the AGW 3 and the UN 6*b* according to the procedure described in (C-I) through (C-IV) described in the first embodiment.

After having changed the destination of the signaling messages and the user data, the AGW 3 transmits a confirmation message (indicated as a "Handover Confirm Ack") to the RN-D 6*a*-2 (step S152).

The RN-D 6*a*-2 receives the confirmation message from the AGW 3 at step S152 described above and relays the message to the UN 6*b* (step S153).

After the handover target base station UN 6*b* has received the confirmation message from the RN-D 6*a*-2 at step S153 described above, the UN 6*b* transmits a message indicating that the handover has been completed (indicated as a "Handover Complete") to the RN-N 6*a*-3 (step S154). The transmitted message is relayed to the NBS 5 by the RN-N 6*a*-3 (step S155). At this time, the context information of the handover source base station NBS 5 becomes unnecessary in the context ID mapping table of the RN-N 6*a*-3 (see FIG. 48). Thus, the entry corresponding to the handover UE is deleted. The user data buffer used for transferring the user data between the NBS 5 and the UN 6*b* is also released.

When having received the handover completion message at step S155 described above, the handover source base station NBS 5 releases the wireless resource, the user data buffer, the ID, and the like that have been secured for the handover user, deletes the relevant table entries, and thus completes the handover process.

During the handover process described above, the RN-N 6*a*-3 provides the function to relay the signaling messages and the user data between the handover source base station NBS 5 and the handover target base station UN 6*b*. In that situation, the context IDs and the pieces of data path information that are individually supplied to the NBS 5 and to the UN 6*b* for the relay purposes may be the same as one another. In other words, r3=r4; Ir3=Ir4; Pr3=Pr4; and Fr3=Fr4 may be satisfied. Furthermore, as for the user data, it is acceptable to configure the data to be directly transferred between the UN 6*b* and the NBS 5 by having an arrangement in which Ir3=It2; Pr3=Pt2; Fr3=Ft2; Ir4=Iub; Pr4=Pub; and Fr4=Fub are satisfied.

As explained above, according to the second embodiment, the plurality of RNs are respectively provided for the different types of signaling messages and user data to be processed during, for example, the common control signaling message processing such as the paging process, the individual control signaling message processing such as the call control process and the handover process for each UE, as well as the user data relay process. With this arrangement, it is possible to add one or more RNs according to the number of UNs that need to be virtually regarded as one base station and to avoid the situation in which the RNs become a bottleneck in terms of the level of performance. Distributing the loads related to the RN processing among the plurality of RNs is especially effective when the RNs each also have the functions of a regular base station, i.e., the functions of a UN.

Third Embodiment

According to the first and the second embodiments described above, the same node (such as the RN or the RN-D/RN-N) performs the process to relay both the signaling messages and the user data. However, during the process to relay the user data, there is no need to change the relaying method by interpreting the contents of the received messages, unlike the signaling messages used in the handover process. Thus, it is possible to adopt a device as an independent device dedicated for relaying the user data so that it is possible to control, as necessary, the relaying method from a node relaying the signaling messages. According to a third embodiment of the present invention, an example will be explained in which the RN manages the user contexts and relays the signaling messages, whereas a dedicated device (hereinafter, a "U-Proxy") relays the user data.

Control exercised by the RN over the relay process performed by the U-Proxy includes: starting a process to relay the user data; changing the relay destination; and stopping the relay process. In the following sections, these different types of control will be explained. The control exercised by the RN over the U-Proxy is possible even if there is a plurality of RNs like in the second embodiment. Thus, the U-Proxy controlling method explained below does not limit the scope to which the present invention is applicable.

<Starting the Relay Process>

FIG. 15 is a diagram showing the outgoing communication sequence according to the first embodiment. At steps S5, S6, S8, and S9 in FIG. 15, user data relay paths are formed between the AGW 3 and the UN 6*b*.

Figure 50:
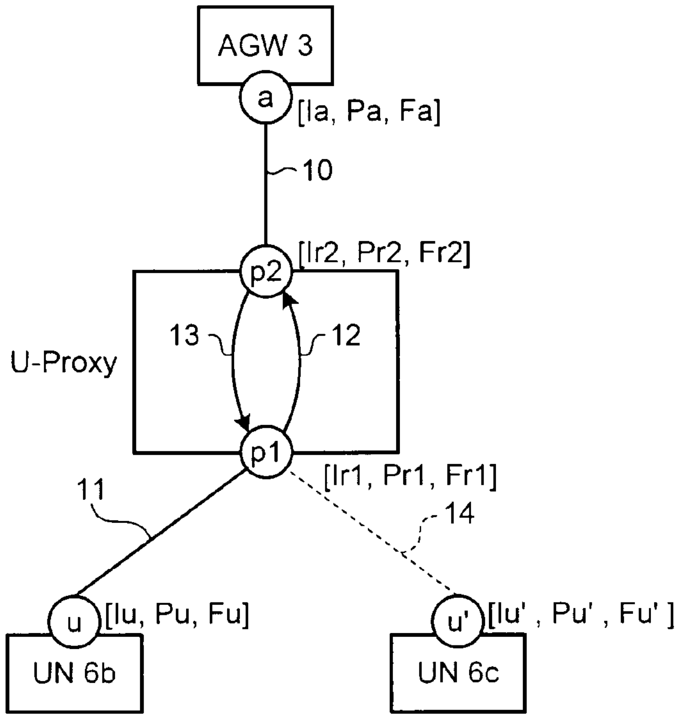
FIG. 50 is a diagram showing examples of user data relay paths.

FIG. 50 is a diagram showing the details of the user data relay paths formed at these steps. At each of the ends of path 10 to 14, a context ID and data path information that have been assigned to the path by the corresponding one of the nodes are written. For example, at an end of the path 10 on the AGW 3 side, the context ID "a" assigned by the AGW 3 is written in the circle, whereas the data path information [Ia, Pa, Fa] is written nearby. In the following sections, a method used by the RN 6*a* for establishing user data relay paths between "the AGW 3 and the UN 6*b* via the U-Proxy" will be explained in detail, with reference to FIGS. 15 and 50 to 53.

Figure 51:
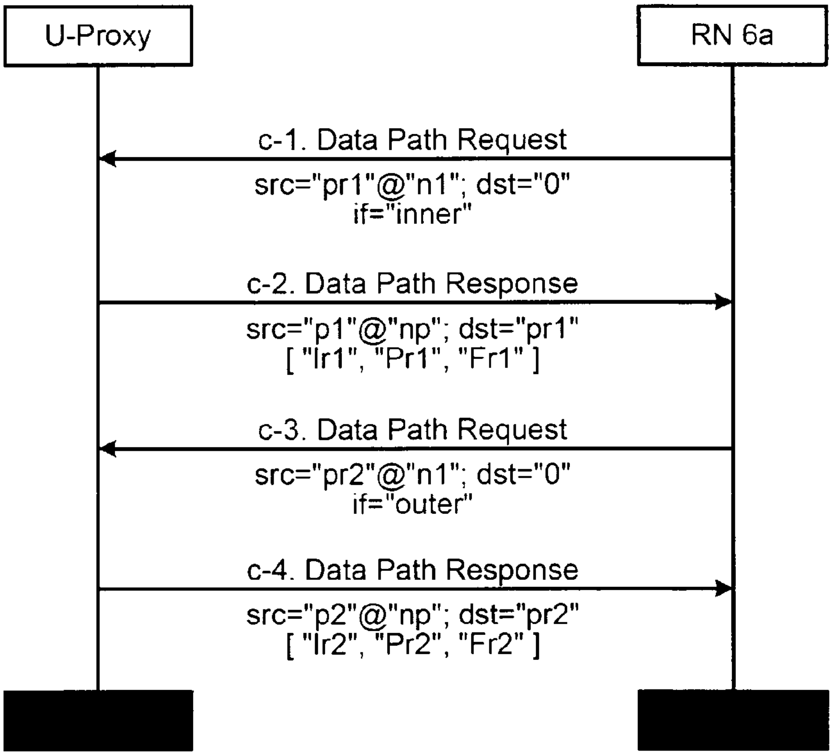
FIG. 51 is a diagram showing an example of an operational sequence for setting user data paths that are required to relay user data between "an AGW 3 and a UN 6*b*" into a U-Proxy.
Figure 53:
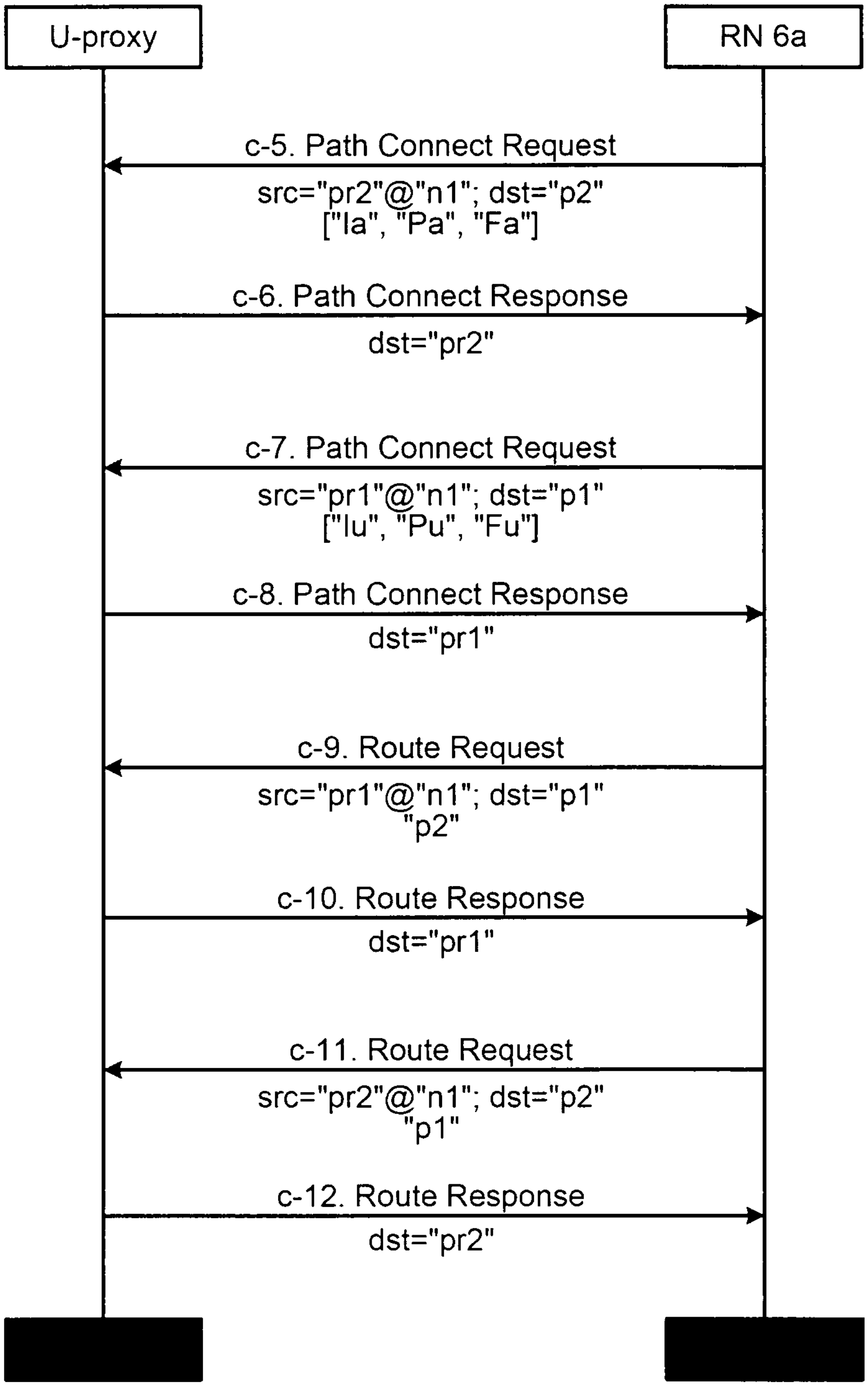
FIG. 53 is a diagram showing an example of a method used by the RN for establishing a user data relay path between "the AGW 3 and the UN 6*b* via the U-Proxy".

First, when the RN 6*a* has received the user data path information [Ia, Pa, Fa] that has been assigned by the AGW 3 at step S15 in the outgoing communication sequence shown in FIG. 15, the RN 6*a* sets a user data path into the U-Proxy, the user data path being required during the user data relay process between "the AGW 3 and the UN 6*b*" according to an operational sequence shown in FIG. 51 in the manner described below.

(c-1) The RN 6*a* transmits a "Data Path Request" message to the U-Proxy and requests the data path information for the UN 6*b*. Depending on the structure of the wireless access network, there is a possibility that the IP address used on the outside of the VBS 6 may be different from the IP address used on the inside of the VBS 6. Thus, according to the third embodiment, the "Data Path Request" message is provided with a parameter "if" used for specifying which one of the IP address systems is being used. In the present example, "inner" is specified so as to indicate that the IP address for the inside of the VBS 6 used by the UN 6*b* is assigned. In addition, the RN 6*a* also assigns a source context ID "pr1" to the message and uses the assigned context ID thereafter for identifying which data path information relates to each message transmitted from the U-Proxy. In the following sections, the node ID of the U-Proxy is assumed to be "np".

(c-2) When the U-Proxy is requested by the RN 6*a* to obtain the data path information at step (c-1), the U-Proxy assigns the data path information [Ir1, Pr1, Fr1] for the inside of the VBS 6 and a context ID "p1" associated with the data path and notifies the RN 6*a* of the data path information and the context ID by transmitting a "Data Path Response" message.

(c-3) In the same manner as described at step (c-1), the RN 6*a* requests data path information for the AGW 3 from the U-Proxy. In this situation, the RN 6*a* sets "outer" to the parameter "if" in the "Data Path Request" message so as to indicate that the IP address for the outside of the VBS 6 used by the AGW 3 is assigned. Also, the RN 6*a* assigns a context ID "pr2" to the context.

(c-4) In the same manner as at step (c-2), the U-Proxy assigns data path information [Ir2, Pr2, Fr2] and a context ID "p2" for the AGW 3 and notifies the RN 6*a* of the data path information and the context ID.

In the outgoing communication sequence shown in FIG. 15, the data path information [Ir2, Pr2, Fr2] for the AGW 3 is not necessary until the process at step S19 is started; however, according to the third embodiment, an arrangement is made so that the pieces of data path information for the both sides are obtained immediately after step S15 for enabling the U-Proxy to determine at an early stage whether there is a resource available. With this arrangement, even when the data path information on the UN 6*b* side has been obtained immediately after step S15, and an error has occurred due to lack of resource immediately before step S19 in an attempt to obtain the data path information for the AGW 3 side, it is possible to avoid a situation where the processes performed at step S16 through S18 are wasted.

As a result of the processes performed at steps (c-1) through (c-4) described above, the user data paths [Ir1, Pr1, Fr1] (the context ID "p1") and [Ir2, Pr2, Fr2] (the context ID "p2") that are used for relaying the user data between "the AGW 3 and the UN 6*b*" have been generated in the U-Proxy, as shown in FIG. 50. The RN 6*a* stores the data path information that has been generated in the U-Proxy into the context ID mapping table, together with the context ID thereof and the context ID within the U-Proxy corresponding to the data path information. FIG. 16 is a drawing showing the context ID mapping table of the RN 6*a* according to the first embodiment. In contrast, for example, a context ID mapping table of the RN 6*a* according to the third embodiment is shown in FIG. 52. More specifically, the node #1 context information section of the first sub-record in the record corresponding to the UE ID "u1" is an area for storing therein the context information related to the UN 6*b*. As the node's own data path in the same information section, the data path information [Ir1, Pr1, Fr1] for the UN 6*b* that has been assigned by the U-Proxy is stored together with the context IDs "pr1" and "p1" that have respectively been assigned by the RN 6*a* and the U-Proxy corresponding on the data path information. For the purpose of specifying the context ID uniquely in the case where there is a plurality of U-Proxies, the context ID on the U-Proxy side is stored together with the node ID "np" of the U-Proxy. In contrast, the node #2 context information section of the same sub-record is an area for storing therein the context information related to the AGW 3. As the node's own data path in the same information section, the data path information [Ir2, Pr2, Fr2] for the AGW 3 that has been assigned by the U-Proxy is stored together with the context IDs "pr2" and "p2" that have respectively been assigned by the RN 6*a* and the U-Proxy corresponding on the data path information.

After that, the RN 6*a* performs the process at step S16 in the outgoing communication sequence (see FIG. 15) and notifies the UN 6*b* of the data path information [Ir1, Pr1, Fr1] on the UN 6*b* side that has been obtained. Subsequently, at step S18, when the RN 6*a* has received the bearer setting response from the UN 6*b* and has received the user data path information [Iu, Pu, Fu] on the UN 6*b* side, the RN 6*a* generates user data relay paths as described below, according to the operational sequence shown in FIG. 53.

(c-5) The RN 6*a* notifies the U-Proxy of the data path information [Ia, Pa, Fa] that has been obtained from the AGW 3 by transmitting a "Path Connect Request" message and requests that data path should be connected to the data path for the AGW 3 that has been secured within the U-Proxy. In the message, the RN 6*a* uses the context ID "p2" on the U-Proxy side to specify the data path secured within the U-Proxy.

(c-6) The U-Proxy connects the data path secured by using the context ID "p2" to the data path on the AGW 3 side that has been specified by the RN 6*a* and forms the path 10 shown in FIG. 50. After the path has been formed, the U-Proxy transmits a "Path Connect Response" message as a response to the RN 6*a*.

(c-7) In the same manner as at step (c-5), the RN 6*a* notifies the U-Proxy of the data path information [Iu, Pu, Fu] that has been obtained from the UN 6*b* and requests that the data path should be connected to the data path for the UN 6*b* within the U-Proxy.

(c-8) In the same manner as at step (c-6), the U-Proxy connects the data path on the U-Proxy side to the data path on the UN 6*b* side and forms a path 11 shown in FIG. 11.

(c-9) The RN 6*a* transmits a "Route Request" message to the U-Proxy and requests that the data received through the user data path between "the AGW 3 and the U-Proxy" that have been connected at steps (c-5) and (c-6) described above should be relayed to the user data path between "the U-Proxy and the UN 6*b*" that have been connected at steps (c-7) and (c-8) described above.

(c-10) The U-Proxy forms therein a path 13 that connects together the path 10 and the path 11 shown in FIG. 50 and establishes a relay path from the AGW 3 to the UN 6*b*. After having established the relay path, the U-Proxy returns a "Route Response" message to the RN 6*a*, as a response.

(c-11) In the same manner as at step (c-9), the RN 6*a* requests the U-Proxy that the data received through the user data path between "the U-Proxy and the UN 6*b*" should be relayed to the user data path between "the AGW 3 and the U-Proxy".

(c-12) In the same manner as at step (c-10), the U-Proxy forms therein a path 12 that connects together the path 10 and the path 11 shown in FIG. 50 and establishes a relay path from the UN 6*b* to the AGW 3.

As a result of the processes performed at steps (c-5) through (c-12), the user data relay paths between "the AGW 3 and the UN 6*b*" in both directions have been established, and the U-Proxy starts relaying the user data.

<Changing the Relay Destination>

Figure 54:
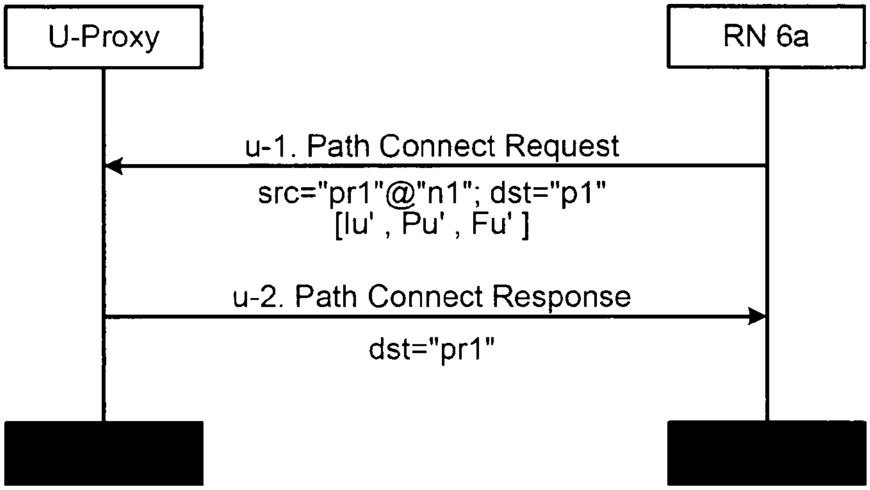
FIG. 54 is a diagram showing an example of a method used by the RN for changing the user data relay path between "the AGW 3 and the UN 6*b* via the U-Proxy" to another user data relay path between "the AGW 3 and a UN 6*c* via the U-Proxy".

FIG. 20 is a diagram showing the handover sequence from the UN 6*b* to the UN 6*c* within the VBS 6 (according to the first embodiment). At steps S48 and S49, the user data relay path between "the AGW 3 and the UN 6*b*" needs to be changed to a user data relay path between "the AGW 3 and the UN 6*c*". In the following sections, a method used by the RN 6*a* for changing the user data relay path between "the AGW 3 and the UN 6*b* via the U-Proxy" to the user data relay path between "the AGW 3 and the UN 6*c* via the U-Proxy" will be explained in detail, with reference to FIGS. 20, 50, and 54. In this handover sequence, the process to generate/release relay paths for transferring the signaling messages and the user data in relation to the handover process needs to be performed not only between "the AGW 3 and the UN 6*b*", but also between "the UN 6*b* and the UN 6*c*"; however, in the following explanation, a focus will be placed only on the process to change the user data relay destination from the path between "the AGW 3 and the UN 6*b*" to the path between "the AGW 3 and the UN 6*c*".

Before the handover process is started, as shown in FIG. 50, the user data relay path between "the AGW 3 and the UN 6*b*" has been formed with "the path 10→the path 13→the path 11" and "the path 11→the path 12→the path 10". When having received data path information [Iu', Pu', Fu'] from the handover target base station UN 6*c* at step S48 shown in FIG. 20, the RN 6*a* changes the user data relay path to the user data relay path between "the AGW 3 and the UN 6*c*" according to an operational sequence shown in FIG. 54 in the manner described below.

(u-1) The RN 6*a* transmits a "Path Connect Request" message to the U-Proxy and notifies the U-Proxy of the data path information [Iu', Pu', Fu'] that has been received from the handover target base station UN 6*c*. Also, together with the notification process, the RN 6*a* sets the context ID "p1" within the U-Proxy as the destination context ID of the notification message and requests that the path that is currently connected to the UN 6*b* should be connected to the UN 6*c*.

(u-2) The U-Proxy connects the user data path identified with the context ID "p1" to the user data path to the UN 6*c* that has been received at step (u-1), so that the path 11 is changed to a path 14 shown in FIG. 50. After the path has been changed, the U-Proxy transmits a "Data Path Response" message to the RN 6*a* as a response.

As a result of the processes performed at steps (u-1) and (u-2), the user data relay path between "the AGW 3 and the UN 6*b*" has been changed to the user data relay path that is formed with "the path 10→the path 13→the path 14" and "the path 14→the path 12→the path 10" shown in FIG. 50.

<Stopping the Relay Process>

Figure 55:
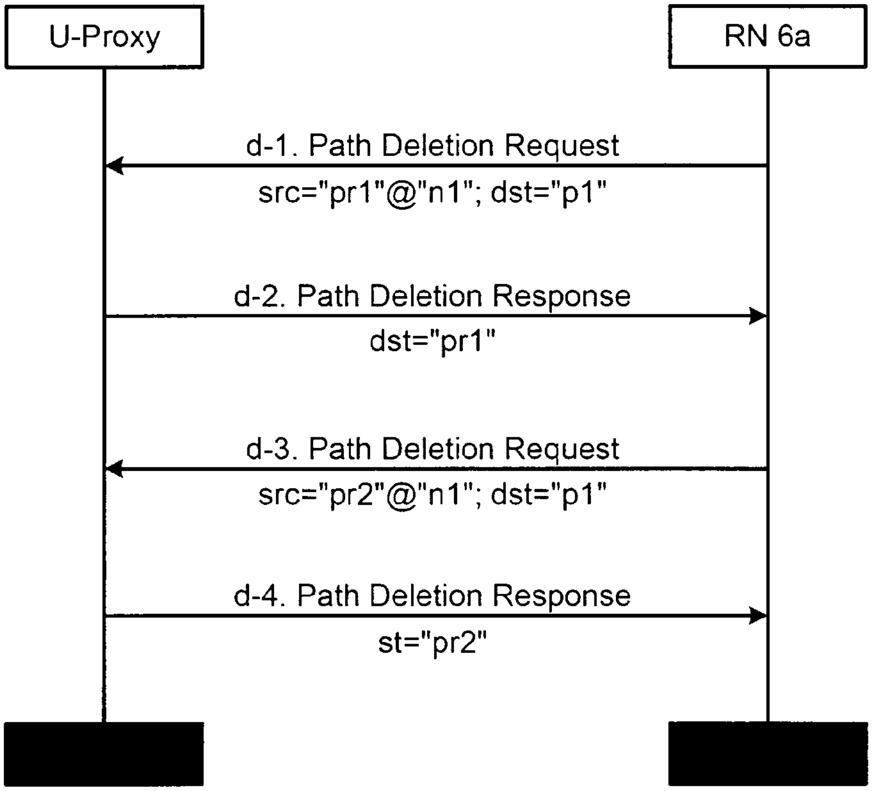
FIG. 55 is a diagram showing an example of a method used by the RN for releasing the user data relay path between "the AGW 3 and the UN 6*b* via the U-Proxy".

FIG. 25 is a diagram showing the handover sequence from the UN 6*b* on the inside of the VBS 6 to the NBS 5 on the outside of the VBS 6 (according to the first embodiment). The user data relay path between "the AGW 3 and the UN 6*b*" is released at steps S70 and S71. In the following sections, a method used by the RN 6*a* for releasing the user data relay path between "the AGW 3 and the UN 6*b* via the U-Proxy" will be explained in detail, with reference to FIGS. 25, 50, and 55. In this handover sequence, the process to generate/release relay paths for transferring the signaling messages and the user data in relation to the handover process needs to be performed not only between "the AGW 3 and the UN 6*b*", but also between "the UN 6*b* and the NBS 5"; however, in the following explanation, a focus will be placed only on the process to stop the user data relay process between "the AGW 3 and the UN 6*b*".

Before the handover process is started, as shown in FIG. 50, the user data relay path between "the AGW 3 and the UN 6*b*" has been formed with "the path 10→the path 13→the path 11" and "the path 11→the path 12→the path 10". When having received the handover completion notification from the handover target base station NBS 5 at step S70 in FIG. 25, the RN 6*a* releases the user data relay path between "the AGW 3 and the UN 6*b*" according to an operational sequence shown in FIG. 55 in the manner described below.

(d-1) The RN 6*a* transmits a "Path Deletion Request" message to the U-Proxy and requests that the user data path corresponding to the context ID "p1" should be released.

(d-2) The U-Proxy releases the data path information [Ir1, Pr1, Fr1] associated with the context ID "p1" and disconnects the path 11, the path 13, and the path 12 shown in FIG. 50 from one another. After the paths have been disconnected from one another, the U-Proxy transmits a "Path Deletion Response" message to the RN 6*a* as a response.

(d-4) In the same manner as at step (d-2), the U-Proxy releases the data path information [Ir2, Pr2, Fr2] and disconnects the path 10 shown in FIG. 50.

As a result of the processes performed at steps (d-1) through (d-4), the user data relay path between "the AGW 3 and the UN 6*b*" has been released, and the relaying of the user data has been stopped.

As explained above, according to the third embodiment, the RN relays only the signaling messages so that the RN controls the U-Proxy, as necessary, and causes the U-Proxy to relay the user data in the process of the relaying. In other words, an arrangement is made so that the node that relays the signaling messages is separated from the node that relays the user data. With this arrangement, it is possible to distribute the load related to the management of ending points of the signaling messages and the user contexts and the load related to the relay process of the user data, which usually has a high transmission rate. In addition, it is possible to use a plurality of devices including one or more RNs and one or more U-Proxies to relay the signaling messages and the user data. As a result, it is possible to install relaying nodes the quantity of which is in compliant with the number of UNs included in the VBS and to thus achieve excellent scalability.

INDUSTRIAL APPLICABILITY

As explained above, the wireless communication system according to an aspect of the present invention is suitable for a communication system having an architecture in which base stations are disposed so as to be subordinate to a gateway device that is provided between a core network and a wireless access network.

The invention claimed is:

1. A wireless communication system including a gateway device that connects a core network and a wireless access network, wherein the wireless access network comprises a virtual base station that includes at least one representative base station connected to the gateway device and a plurality of unrepresentative base stations that are subordinate to the representative base station, presence of the unrepresentative base stations is hidden from the gateway device and an adjacent base station that is located adjacent to the virtual base station, the representative base station is activated before the unrepresentative base stations are activated, and until a predetermined activation procedure is completed between the representative base station and each of the unrepresentative base stations, the representative base station causes a cell of the unrepresentative base stations connected thereto to be in a communication-disabled state.

2. The wireless communication system according to claim 1, wherein the presence of the unrepresentative base stations is hidden from the gateway device and the adjacent base station by causing each of the unrepresentative base stations that are subordinate to the representative base station to transmit and receive a control message and user data to and from the gateway device and the adjacent base station via the representative base station.

3. The wireless communication system according to claim 2, wherein one or more representative base stations are provided depending on types of the control message and the user data.

4. The wireless communication system according to claim 3, wherein the representative base station transmits and receives the control message to and from the gateway device and the adjacent base station on behalf of each of the unrepresentative base stations, and a node, which is different from the representative base station, transmits and receives the user data to and from the gateway device and the adjacent base station on behalf of each of the unrepresentative base stations.

5. The wireless communication system according to claim 4, wherein the node, which is different from the representative base station, is one of the unrepresentative base stations.

6. The wireless communication system according to claim 4, wherein the node, which is different from the representative base station, is a dedicated device that has a function of transmitting and receiving the user data on behalf of each of the unrepresentative base stations.

7. The wireless communication system according to claim 2, wherein the representative base station transmits and receives the control message to and from the gateway device and the adjacent base station on behalf of each of the unrepresentative base stations, and a node, which is different from the representative base station, transmits and receives the user data to and from the gateway device and the adjacent base station on behalf of each of the unrepresentative base stations.

8. The wireless communication system according to claim 7, wherein the node, which is different from the representative base station, is one of the unrepresentative base stations.

9. The wireless communication system according to claim 7, wherein the node, which is different from the representative base station, is a dedicated device that has a function of transmitting and receiving the user data on behalf of each of the unrepresentative base stations.

10. The wireless communication system according to claim 1, wherein the representative base station further has a function of performing wireless communication with a mobile terminal.

11. The wireless communication system according to claim 1, wherein the representative base station includes cells, of which the unrepresentative base stations are respectively in charge, as cells of its own.

12. The wireless communication system according to claim 1, wherein each of the unrepresentative base stations sets the representative base station as a node information of a connection target thereof.

13. The wireless communication system according to claim 1, wherein the representative base station manages a cell ID and a location area ID that are to be assigned to a cell, of which any of the unrepresentative base stations connected thereto is in charge, and when the predetermined activation procedure is performed, the representative base station assigns the cell ID and the location area ID to the unrepresentative base station.

14. The wireless communication system according to claim 1, wherein upon completion of the predetermined activation procedure, the representative base station causes a cell, of which the unrepresentative base station is in charge, to be in a communication-enabled-state.

15. The wireless communication system according to claim 14, wherein upon recognition of a shut down of the unrepresentative base station or an abnormality in the unrepresentative base station, the representative base station causes a cell, of which the unrepresentative base station is in charge, to be in the communication-disabled-state.

16. The wireless communication system according to claim 1, wherein a state of the virtual base station is monitored on the core network side while the representative base station within the virtual base station is used as a target to be monitored.

* * * * *